US012686014B2

(12) United States Patent
Fitzgerald et al.

(10) Patent No.: US 12,686,014 B2
(45) Date of Patent: Jul. 21, 2026

(54) CO-LOCATED SENSORS IN A SORTING FACILITY

(71) Applicant: AMP Robotics Corporation, Louisville, CO (US)

(72) Inventors: Jacob Fitzgerald, Wheat Ridge, CO (US); Jason M. Calaiaro, Denver, CO (US); Carter J. Schultz, Lafayette, CO (US); Cameron D. Douglas, Boston, MA (US); Matthew J. Koos, Lakewood, CO (US); Carson C. Potter, Denver, CO (US); Amanda M. Marrs, Seattle, WA (US); Matanya B. Horowitz, Golden, CO (US)

(73) Assignee: AMP Robotics Corporation, Louisville, CO (US)

( * ) Notice: Subject to any disclaimer, the term of this patent is extended or adjusted under 35 U.S.C. 154(b) by 0 days.

(21) Appl. No.: 18/598,776

(22) Filed: Mar. 7, 2024

(65) Prior Publication Data

US 2024/0299989 A1     Sep. 12, 2024

Related U.S. Application Data

(60) Provisional application No. 63/450,889, filed on Mar. 8, 2023.

(51) Int. Cl.
| | |
|---|---|
| *B07C 5/34* | (2006.01) |
| *B03B 9/06* | (2006.01) |
| *B07C 5/342* | (2006.01) |
| *B07C 5/36* | (2006.01) |
| *B30B 9/30* | (2006.01) |
| *B30B 15/30* | (2006.01) |
| *B65G 43/02* | (2006.01) |

(Continued)

(52) U.S. Cl.
CPC .............. *B03B 9/06* (2013.01); *B07C 5/3412* (2013.01); *B07C 5/3422* (2013.01); *B07C 5/361* (2013.01); *B07C 5/363* (2013.01); *B30B 9/3007* (2013.01); *B30B 15/30* (2013.01); *B65G 43/02* (2013.01); *B65G 43/10* (2013.01); *G05B 19/4185* (2013.01); *G06Q 10/30* (2013.01); *B65G 2203/041* (2013.01); *B65G 2207/30* (2013.01); *G06T 5/60* (2024.01); *G06V 10/16* (2022.01)

(58) Field of Classification Search
CPC ........ B07C 5/3422; B07C 5/361; B07C 5/363
See application file for complete search history.

(56) References Cited

U.S. PATENT DOCUMENTS

| | | | |
|---|---|---|---|
| 5,649,785 A | 7/1997 | Djerf | |
| 10,481,069 B2 * | 11/2019 | Sharpe | ............... G01N 15/1404 |

(Continued)

*Primary Examiner* — Joseph C Rodriguez
(74) *Attorney, Agent, or Firm* — Van Pelt, Yi & James LLP

(57)     ABSTRACT

Co-located sensors in a sorting facility are disclosed, including: a first sensor associated with a first field of view, and wherein the first sensor is located in a sorting facility; a second sensor associated with a second field of view, wherein the second field of view is adjacent to or overlaps with the first field of view, and wherein the second sensor is located in the sorting facility; and one or more processors configured to: receive a first image including a first set of objects from the first sensor; receive a second image including a second set of objects from the second sensor; and evaluate the first image and the second image to determine a sorting decision with respect to a target object.

16 Claims, 55 Drawing Sheets

(51) Int. Cl.
　　*B65G 43/10*　　　　(2006.01)
　　*G05B 19/418*　　　(2006.01)
　　*G06Q 10/30*　　　 (2023.01)
　　*G06T 5/60*　　　　(2024.01)
　　*G06V 10/10*　　　 (2022.01)

(56)　　　　　　　　References Cited

U.S. PATENT DOCUMENTS

| | | | |
|---|---|---|---|
| 10,839,474 | B2 | 11/2020 | Lukka |
| 11,135,620 | B2 | 10/2021 | Parr |
| 11,858,008 | B2 * | 1/2024 | Durack ................. B07C 5/3425 |
| 11,867,608 | B2 * | 1/2024 | Hunt ..................... G01N 33/24 |
| 2007/0012604 | A1 | 1/2007 | Basford |
| 2007/0260466 | A1 | 11/2007 | Casella |
| 2007/0278139 | A1 | 12/2007 | Cowling |
| 2009/0242355 | A1 | 10/2009 | Webster |
| 2009/0250384 | A1 | 10/2009 | Valerio |
| 2012/0048974 | A1 | 3/2012 | Gitschel |
| 2012/0078531 | A1 * | 3/2012 | Lo ....................... G01N 15/1434<br>702/21 |
| 2014/0148944 | A1 | 5/2014 | Bailey |
| 2019/0030571 | A1 | 1/2019 | Horowitz |
| 2019/0217342 | A1 | 7/2019 | Parr |
| 2019/0299255 | A1 * | 10/2019 | Chaganti ............ G06F 18/2431 |
| 2021/0118154 | A1 | 4/2021 | Oberpriller |
| 2021/0174039 | A1 * | 6/2021 | Edwards ............ G06K 7/10861 |
| 2022/0055071 | A1 * | 2/2022 | Sharma ................... B07C 5/342 |
| 2022/0105545 | A1 | 4/2022 | Douglas |
| 2022/0106129 | A1 | 4/2022 | Douglas |
| 2024/0109103 | A1 * | 4/2024 | Kumar ................... B07C 5/342 |
| 2024/0299986 | A1 * | 9/2024 | Fitzgerald ............. G06Q 10/30 |

* cited by examiner

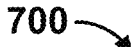

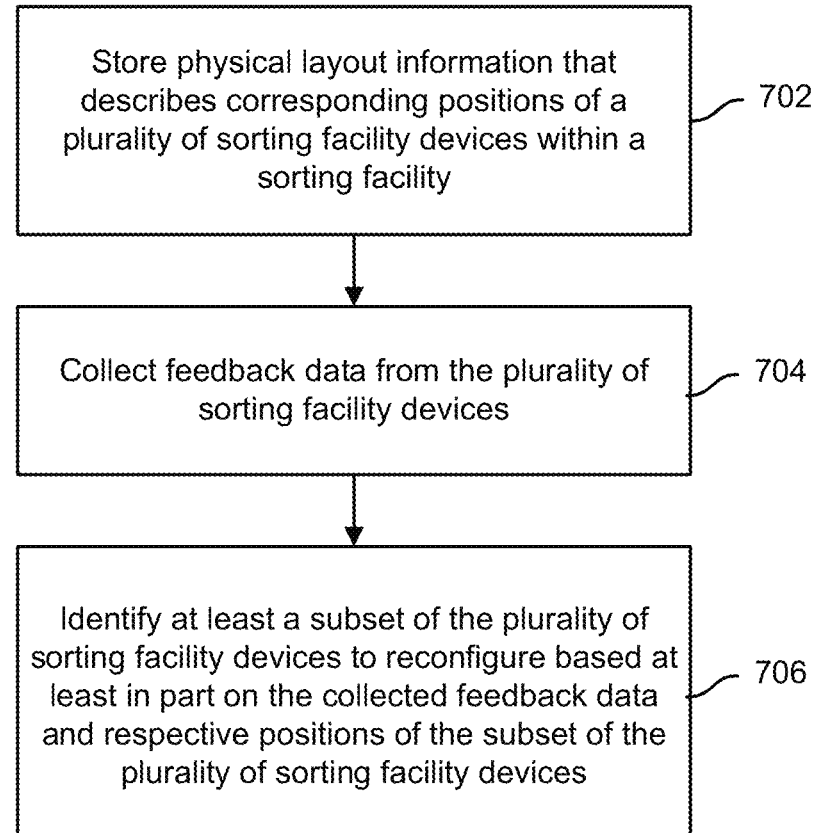

Store physical layout information that describes corresponding positions of a plurality of sorting facility devices within a sorting facility — 702

Collect feedback data from the plurality of sorting facility devices — 704

Identify at least a subset of the plurality of sorting facility devices to reconfigure based at least in part on the collected feedback data and respective positions of the subset of the plurality of sorting facility devices — 706

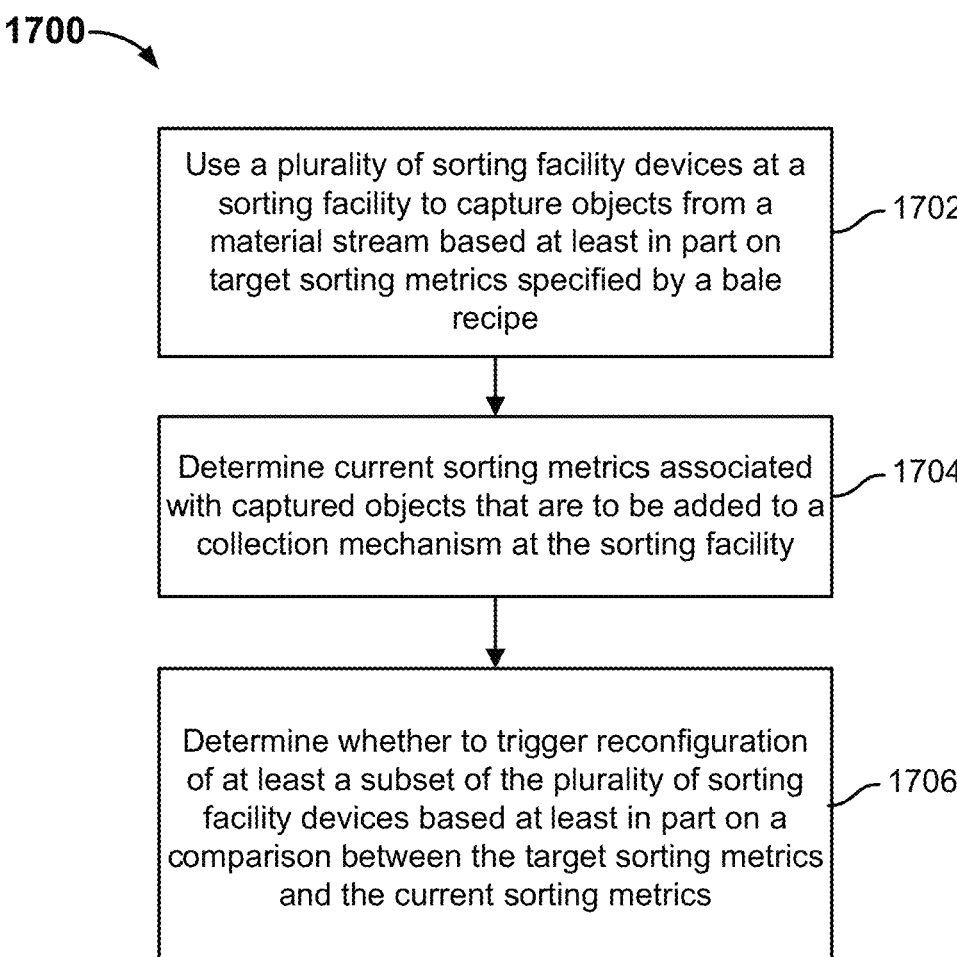

Use a plurality of sorting facility devices at a sorting facility to capture objects from a material stream based at least in part on target sorting metrics specified by a bale recipe ⟋ 1702

Determine current sorting metrics associated with captured objects that are to be added to a collection mechanism at the sorting facility ⟋ 1704

Determine whether to trigger reconfiguration of at least a subset of the plurality of sorting facility devices based at least in part on a comparison between the target sorting metrics and the current sorting metrics ⟋ 1706

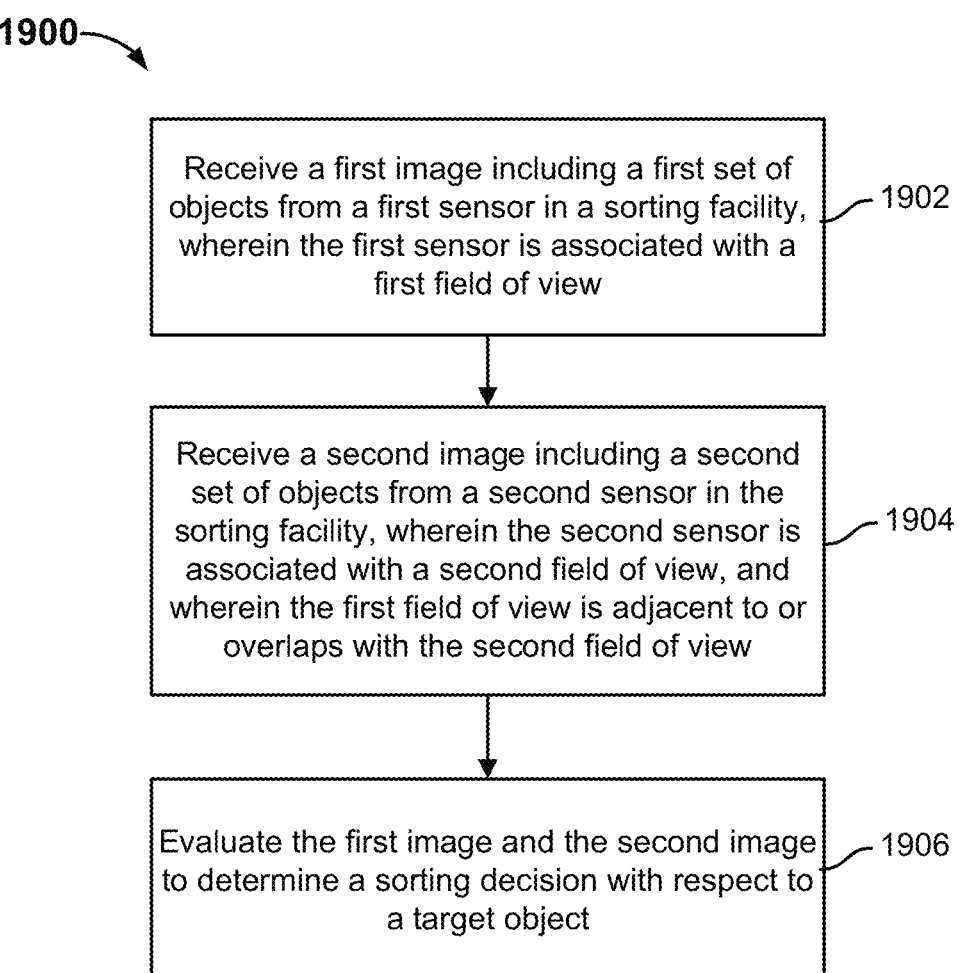

Receive a first image including a first set of objects from a first sensor in a sorting facility, wherein the first sensor is associated with a first field of view — 1902

Receive a second image including a second set of objects from a second sensor in the sorting facility, wherein the second sensor is associated with a second field of view, and wherein the first field of view is adjacent to or overlaps with the second field of view — 1904

Evaluate the first image and the second image to determine a sorting decision with respect to a target object — 1906

Collect sorting results feedback data from a
first sorting facility, wherein the first sorting
facility is associated with a second sorting
facility                                          ⌐ 2302

Reconfigure a set of sorting facility devices
located in the second sorting facility based at
least in part on the collected sorting results
feedback data                                     ⌐ 2304

MAP   BALING   REDUCER   E-STOP   AXON   LOGIN

SSI Reducer

Status: Running

SSI Fault: CLEAR   Msg: OK

Warning: CLEAR   Msg: OK

| Signal Name | State |
|---|---|
| Heartbeat | LOW |
| E-stop Active | CLEAR |
| Control Mode | REMOTE |
| HPU OK | OK |
| Ok to Start | WAIT |
| HPU Motors On | ON |
| Reducer On | ON |
| Upper Photoeye | CLEAR |
| Lower Photoeye | CLEAR |
| Ok to Load | OK |
| Shaft 1 Direction | Forward |
| Shaft 2 Direction | Stopped |

Controls

Start/Stop: Start Stop

Fault: Clear Trigger

Operating Speed -5 -1 48 +1 +5

Rotation Pattern

Rotation Pattern Custom ▾

Forward Rotation Pattern Run Time -1 8 +1

Reverse Rotation Pattern Run Time -1 4 +1

Metrics

| Metric Name | Value |
|---|---|
| Average Shaft Load (%) | 38 |
| Shaft 1 Pressure (PSI) | 1165 |
| Shaft 2 Pressure (PSI) | 125 |
| Shaft 1 Recent Jam Count | 0 |
| Shaft 2 Recent Jam Count | 0 |

FIG. 29

MAP BALING REDUCER E-STOP AXON LOGIN

Plant EStop Status

CLEAR

Baler Status

CLEAR

| Device Name: | Status: |
|---|---|
| BCC_Cabinet | CLEAR |
| Bunker_East | CLEAR |
| Bunker_NE_Button | CLEAR |
| BK-05_Button | CLEAR |
| CB-01_North_Button | CLEAR |
| CB-01_West_Pull_Cord | CLEAR |
| CB-02_North_Button | CLEAR |
| CB-02_South_Pull_Cord | CLEAR |
| Baler_MC_Cabinet | CLEAR |
| Baler_Console | CLEAR |
| Baler_Wire_Tie-er | CLEAR |

Sort Status

FIG. 30

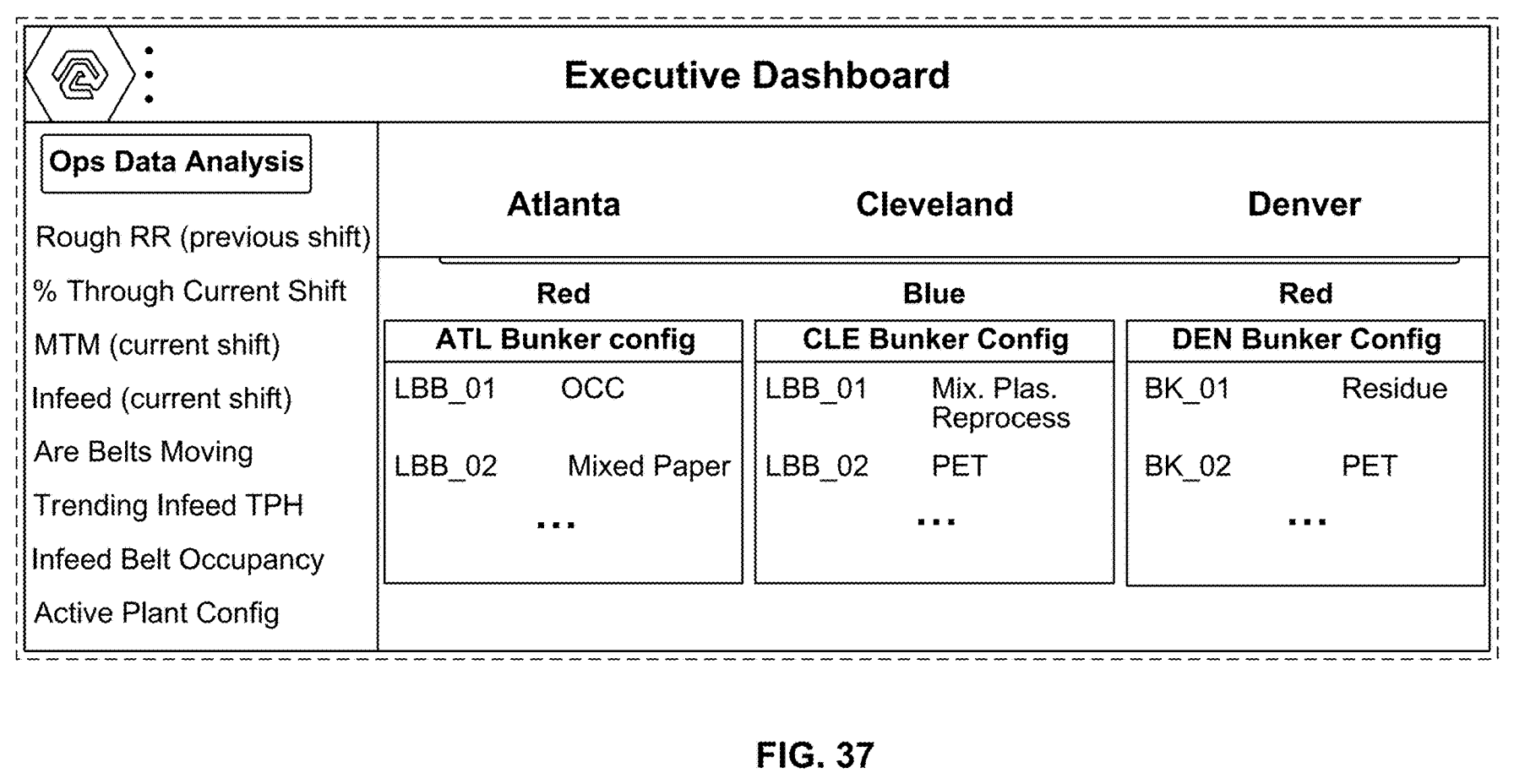

Executive Dashboard

| Atlanta | Cleveland | Denver |
|---|---|---|

Ops Data Analysis

Rough RR (previous shift)

% Through Current Shift

MTM (current shift)

Infeed (current shift)

Are Belts Moving

Trending Infeed TPH

Infeed Belt Occupancy

Active Plant Config

Red

| ATL Bunker config | |
|---|---|
| LBB_01 | OCC |
| LBB_02 | Mixed Paper |
| ... | |

Blue

| CLE Bunker Config | |
|---|---|
| LBB_01 | Mix. Plas. Reprocess |
| LBB_02 | PET |
| ... | |

Red

| DEN Bunker Config | |
|---|---|
| BK_01 | Residue |
| BK_02 | PET |
| ... | |

FIG. 37

Ops Overview

Legend: ☐ Infeed ☐ Baled ☐ Downtime ☐ Compacted (Chart x-axis timestamps: 7/17/2022 06:00 through 7/18/2022 06:00 in one-hour increments)

Baled Material

| Material | Weight (Tons) | Unsellable (Tons) | Sellable (Tons) | Value |
|---|---|---|---|---|
| Colored HDPE | 2.4 | 0 | 2.4 | $1,612 |
| Mixed Paper | 8 | 0 | 8 | $399 |
| Natural HDPE | 1.6 | 0 | 1.6 | $848 |
| OCC | 24.1 | 0 | 24.1 | $2,340 |
| PET | 9.2 | 0 | 9.2 | $6,008 |
| PreZero | 1.2 | 0 | 1.2 | $61 |
| Thermoforms | 4.7 | 0 | 4.7 | $1,958 |

Compactors

| Date | Weight (Tons) | Quantity |
|---|---|---|
| 2022-07-17 | 56 | 8 |
| 2022-07-18 | 7 | 1 |

FIG. 38

CO-LOCATED SENSORS IN A SORTING FACILITY

CROSS REFERENCE TO OTHER APPLICATIONS

This application claims priority to U.S. Provisional Patent Application No. 63/450,889 entitled RECONFIGURABLE SORTING FACILITY filed Mar. 8, 2023 which is incorporated herein by reference for all purposes.

BACKGROUND OF THE INVENTION

A heterogeneous stream of materials such as recyclables, for example, are received and sorted at a sorting facility to separate out a portion that can be further processed (e.g., recycled) and the remaining residue that cannot be repurposed. Accuracy in the sorting process improves the quality of the sorting (e.g., by minimizing the amount of residue that cannot be further processed that enters into the collection of objects that can be further processed) and therefore, the value of the collection of sorted objects. However, given that a sorting facility includes a complex set of inter-dependent machines, it is typically laborious to manually retune machines to optimize their performance in response to events such as detected jams within the facility or other external circumstances. As such, dynamic reconfiguration of a sorting facility would be desirable.

BRIEF DESCRIPTION OF THE DRAWINGS

Various embodiments of the invention are disclosed in the following detailed description and the accompanying drawings.

FIG. 7 is a flow diagram showing an embodiment of a process for dynamically reconfiguring devices at a sorting facility in response to feedback data that is collected from the devices.

FIG. 17 is a flow diagram showing an embodiment of a process for dynamic bale creation.

FIG. 19 is a flow diagram showing an embodiment of a process for using co-located sensors to determine a sorting decision.

FIG. 29 is a diagram showing an example user interface that presents information related to a reducer at a sorting facility.

FIG. 30 is a diagram showing an example user interface that presents information related to the status of cords within a sorting facility.

FIG. 37 is a diagram showing an example user interface that shows a consolidated view of current sorting statistics across three different sorting facilities.

FIG. 38 is a diagram showing an example user interface that presents the operation overview of a sorting facility.

DETAILED DESCRIPTION

Figure 1:
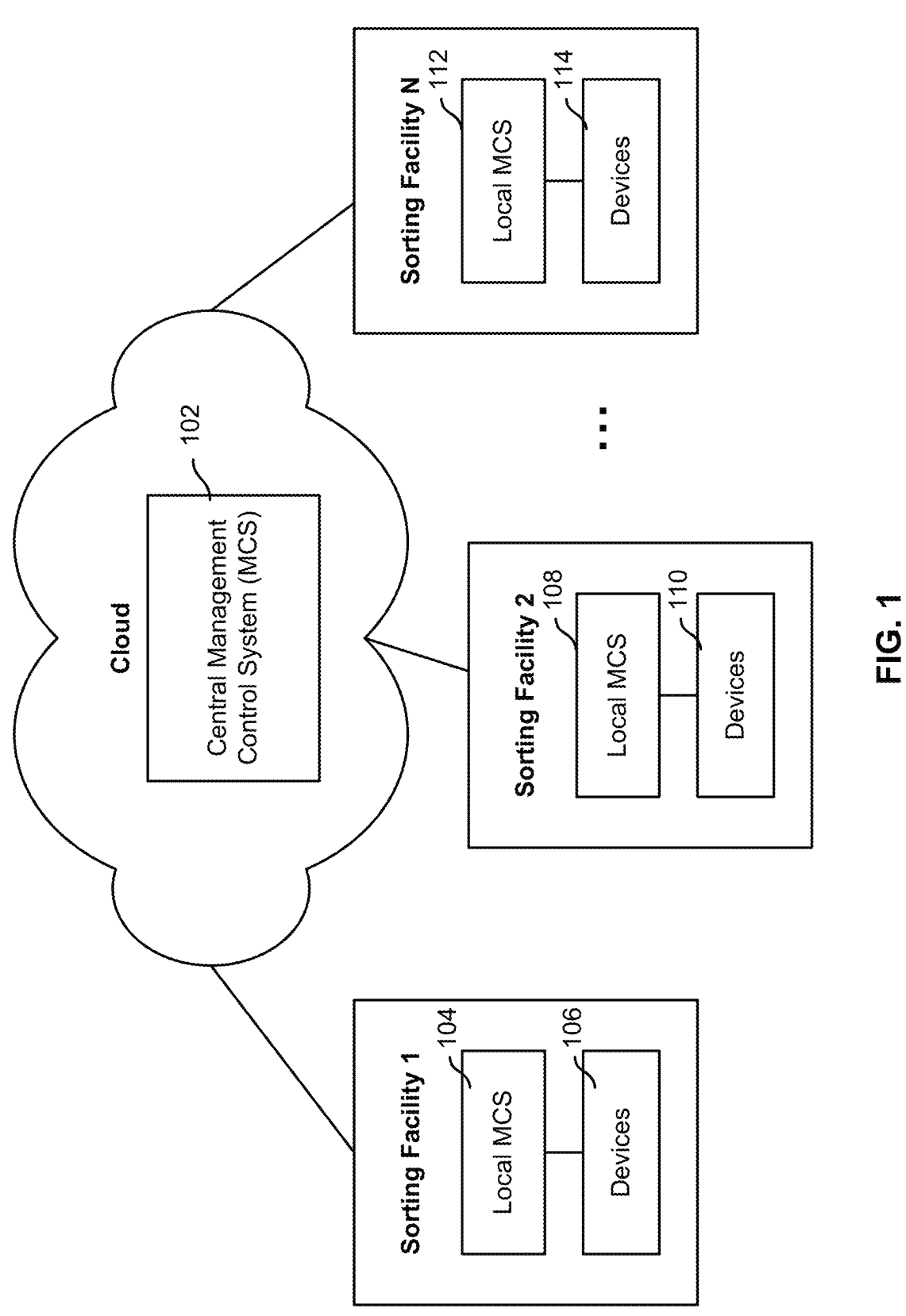
FIG. 1 is a diagram showing an embodiment of a central, cloud-based management control system that is configured to communicate with local instances of the MCS that are situated across different sorting facilities.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a reconfigurable sorting facility are described herein. Physical layout information that describes corresponding positions of a plurality of sorting facility devices with a sorting facility is stored. The positions of sorting facility devices comprise where the sorting facility devices (e.g., sensors, sorting devices, processors, conveyor devices, etc.) are located within the sorting facility (e.g., in which sorting lines) and/or relative to each other (e.g., what is the sequence of sorting facility devices within each sorting line and/or the distance between sorting facility devices within each sorting line). Feedback data is collected from the plurality of sorting facility devices. Examples of feedback data include sensor feedback, motor and component data, statistics regarding captured target objects, statistics associated with detected purity rates, whether a jam has been detected, etc. A subset of the plurality of sorting facility devices is identified to reconfigure based at least in part on the collected feedback data and respective positions of the subset of the plurality of sorting facility devices. The collected feedback data can be used to reconfigure (e.g., the sorting parameters and suppression parameters of) at least some sorting facility devices to effect desired sorting results. For example, feedback data that is collected at downstream sorting facility devices can be used to programmatically reconfigure upstream sorting facility devices and vice versa within the single sorting facility based on the known positions of the devices to achieve desired sorting goals, and without physically modifying the layout of the sorting facility. In some embodiments, the feedback data collected at a first sorting facility can also be used to reconfigure sorting devices located at a second sorting facility (e.g., that is related to the first sorting facility).

Embodiments of dynamic bale creation are described herein. A plurality of sorting facility devices at a sorting facility is used to capture target objects from a material stream based at least in part on target sorting metrics associated with a bale recipe. Current actual sorting metrics associated with captured objects removed from the material that are to be added to a baler are determined. For example, the current composition (e.g., the current mass and percentage breakdown of material types) of objects within a bunker that is to be emptied into a baler is determined by real-time tracking of sensed images of the material stream throughout the sorting facility and the objects that are captured into the bunker. Whether reconfiguration of at least a subset of a plurality of sorting facility devices within the sorting facility is to be triggered is determined based at least in part on a comparison between the targeting sorting metrics associated with a bale recipe associated with the bale and the current actual sorting metrics. For example, the bale recipe describes a desired composition of material type or chemistries within a bale.

Embodiments of co-located sensing within a sorting facility are described herein. A first image of a first set of objects is obtained from a first sensor associated with a first field of view. A second set of sensed data (e.g., a second image) of a second set of objects is obtained from a second sensor with a second field of view. The first field of view is adjacent or overlapping with the second field of view. The first image and the second image are evaluated to determine a sorting operation to be performed on a first target object. For example, the first and second sensors are located proximate to one another within a sorting facility and therefore have adjacent if not overlapping fields of view. The images of objects (e.g., that are being transported along conveyor device(s) within the sorting facility) that are respectively captured by the first and second sensors can be evaluated together to determine whether/how to perform a sorting (e.g., capture) operation on an object that appears in at least one of the images.

Embodiments of centralized control of multiple sorting facilities are described herein. Sorting results feedback data is collected from a first sorting facility, which is associated with a second sorting facility. A set of sorting facility devices located in the second sorting facility is reconfigured based at least in part on the collected sorting results feedback data from the first sorting facility. In a first example, the first and second sorting facilities are associated in that they are part of the same logical set of sorting facilities and in which a first material stream that is sorted by one sorting facility may inform how another, parallel sorting facility should perform sorting on a second material stream. In a second example, the first and second sorting facilities are associated in that one of the sorting facilities provides pre-sorting on a material stream and the output of the pre-sorting is then transported to another sorting facility for further (e.g., more refined or rigorous) sorting. In this latter configuration, the pre-sort sorting facility can be thought of as a "spoke" or a "satellite" facility and the secondary sorting facility can be thought of as a "hub" or "main" facility.

FIG. 1 is a diagram showing an embodiment of a central, cloud-based management control system that is configured to communicate with local instances of the MCS that are situated across different sorting facilities. As shown in FIG. 1, central management control system (MCS) 102 is executing at a cloud service, comprising one or more servers that are remote to the local instances of the MCS that are physically located and executing at different, respective sorting facilities. As shown in FIG. 1, local MCS 104 is located at Sorting Facility 1, local MCS 108 is located at Sorting Facility 2, and local MCS 112 is located at Sorting Facility N. At each sorting facility (e.g., Sorting Facility 1, Sorting Facility 2, . . . , Sorting Facility N), each local instance of the MCS may be implemented as one or more processors executing in one or more physical nodes (e.g., computing devices). In the example shown in FIG. 1, central MCS 102 in the cloud may be connected to each sorting facility via a wide area network (WAN) such as the Internet.

As will be described in further detail below, each local instance of the MCS (e.g., local MCS 104, local MCS 108, and local MCS 112) comprises a control system application that programmatically monitors and tracks the performance of the local sorting facility devices (e.g., devices 106 of Sorting Facility 1, devices 110 of Sorting Facility 2, and devices 114 of Sorting Facility N) and dynamically reconfigures the sorting facility devices in response to monitored events (e.g., sorting metrics, detected jams, anticipated input material sources, etc.). Furthermore, each local instance of the MCS can also surface the monitored real-time events and performance at user interfaces to operator(s) of the sorting facility to keep the operators apprised of the facility's operations. The user interfaces provided by the local MCS can also receive inputs from the sorting facility's operator(s) to which the local MCS can respond by dynamically reconfiguring at least some devices at the sorting facility. As such, each local MCS instance supports optimization for each individual facility, and enables operators to analyze production data and update and configure a facility to ensure maximum performance based on layout, sensor capabilities, sorting capabilities, infeed parameters, and desired bale consistency, for example, for the facility.

As will be described in further detail below, central MCS 102 can communicate with each local instance of the MCS (e.g., local MCS 104, local MCS 108, and local MCS 112) and manage multiple sorting facilities and their devices (e.g., devices 106 of Sorting Facility 1, devices 110 of Sorting Facility 2, and devices 114 of Sorting Facility N). In some embodiments, central MCS 102 can perform the capabilities of any of the local instances of the MCS, only remotely. In some embodiments, the sorting facilities that are being managed by central MCS 102 have dependencies upon each other or are similarly situated (e.g., configured with similar types of sorting facility devices). In some embodiments, central MCS 102 aggregates feedback from (e.g., the local MCS of) one or more of the sorting facilities that it manages and can, in response to the aggregated feedback, instruct another set of sorting facilities to reconfigure its sorting parameters based on such dependencies. Central MCS 102 can also access remote third-party cloud services and push the received service responses to one or more of the managed facilities.

The distributed capabilities of the multi-facility MCS implementation as described in FIG. 1 enables an operator to both monitor and control production across one or more sorting facilities, and ensure optimal operation. Each sorting facility may be connected to a common artificial intelligence (AI) platform which is implemented by central MCS 102 and/or the local MCS instances, which generate machine learning models based on data from one or more sorting facilities. In some embodiments, central MCS 102 manages the distribution of updated machine learning models, software, and other configuration information, ensuring consistency of operation across facilities. At a broader scale, networking multiple sorting facilities networked together as shown in FIG. 1 enables a system-wide view of material flows that allows one or more facility operators to adjust infeed, pricing, and bale mix parameters, etc., based on the larger view.

While FIG. 1 shows an example of a multi-facility MCS implementation in which each sorting facility's local MCS communicates with central MCS 102, in other examples, a facility's local MCS may provide a control plane to the facility's local devices without communicating with other remote instances of the MCS.

Figure 2:
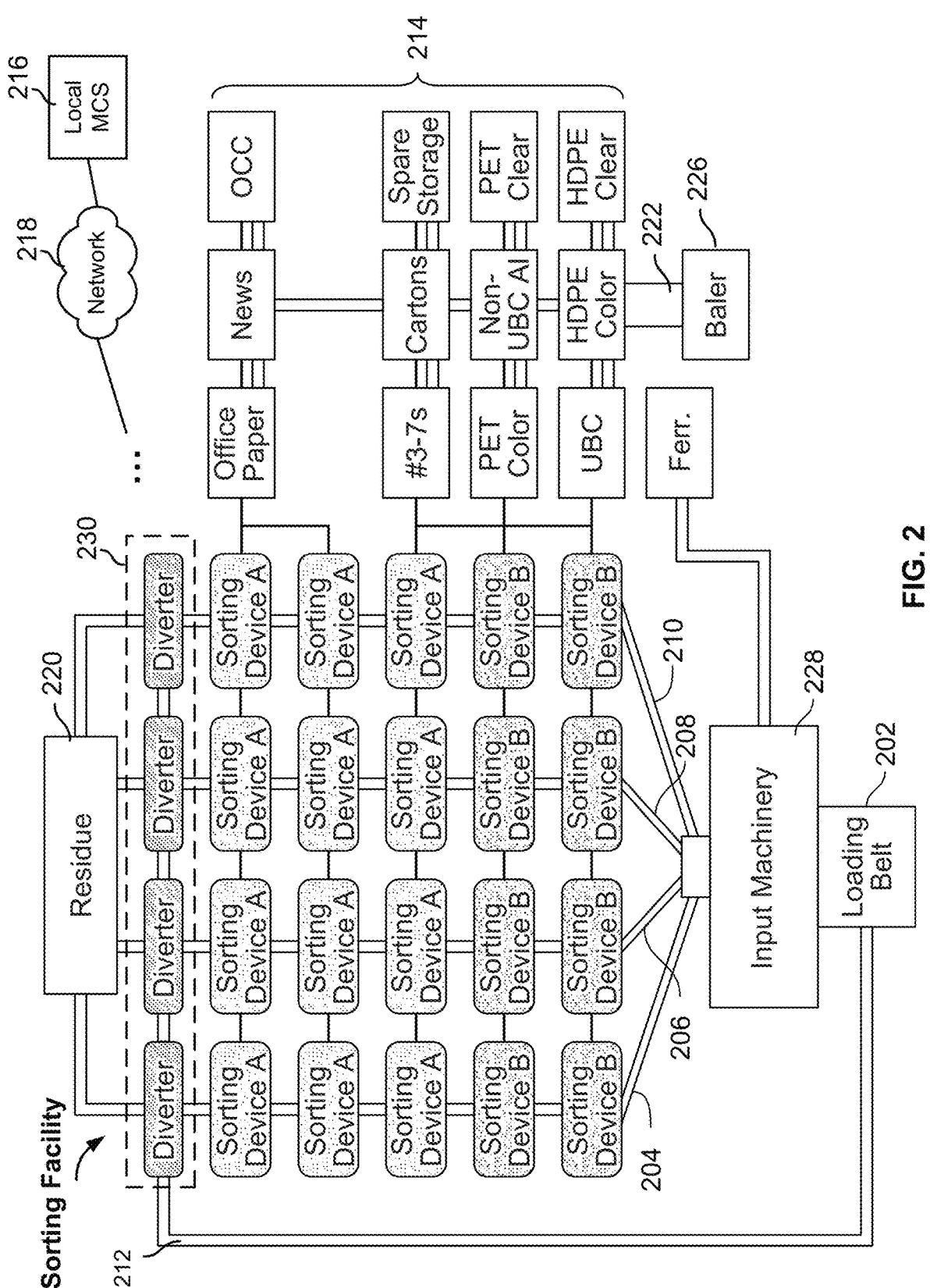
FIG. 2 is a diagram showing an example of a sorting facility in accordance with some embodiments.

FIG. 2 is a diagram showing an example of a sorting facility in accordance with some embodiments. In some embodiments, any of Sorting Facility 1, Sorting Facility 2, . . . , and Sorting Facility N can be implemented with the example of FIG. 2. The example sorting facility of FIG. 2 describes a set of physical machines and conveyance systems, at least some of which are networked with sensors and processors configured to leverage machine learning techniques to identify objects among the sensed images and to enable the physical components to efficiently sort through a material stream to capture target objects. In various embodiments, a "target object" is an object that matches a set of target object criteria. Generally, a "target" object is an object that is desirable to capture for subsequent processing or resale. As will be described in further detail below, material streams are input at the sorting facility, which sorts through the streams to capture target materials and output bales (e.g., compressed units) of captured objects.

In FIG. 2, the example sorting facility includes multiple, parallel sorting lines. FIG. 2 shows a bird's eye view of four parallel sorting lines (sorting lines 204, 206, 208, and 210) that fan out from a common source, loading belt 202, and also fan back into a common recirculation conveyor, recirculation conveyor 212. Adding parallel sorting lines to a sorting facility will significantly increase recovery throughput through parallelized/simultaneous sorting activity. Furthermore, each of the sorting lines can be implemented using a series of modular sorting units, which can reduce costs and improve consistency of material sortation. Generally, a sorting facility device (e.g., input machinery, a sensor device, a conveyor device, a sorting device, a bunker, a baler, a residue compactor) that receives an object earlier in the sorting line than another sorting facility device is referred to as being "upstream" of the latter sorting facility device. Similarly, the latter sorting facility device is referred to as being "downstream" of the former sorting device.

Each sorting device is coupled to/in communication with a sensor device (e.g., a vision sensor) and local MCS 216 over network 218 (e.g., which is implemented as a local area network (LAN) such as WiFi) that is configured to, using trained machine learning models, detect and characterize the objects that are being moved towards it by a conveyor device. Local MCS 216 can be implemented as a single physical node (e.g., computing device) using one or more processors that execute computer instructions and where the sorting facility devices communicate with the single node over network 218. Alternatively, local MCS 216 can be implemented as a network of two or more physical nodes (e.g., computing devices) comprising one or more processors to execute computer instructions and where the network of two or more physical nodes is distributed throughout the facility. In the event where there is a distributed network of physical nodes that form local MCS 216, any number of networked vision sensors and physical nodes of local MCS 216 can be included in logical groupings that are sometimes referred to as "machine learning (ML) vision subsystems." For example, each ML vision subsystem comprises a processor configured to execute machine learning models for object identification, and includes memory, networking capabilities, and a high-resolution camera. A processor of a physical node implementing local MCS 216 can determine the location of (e.g., a bounding box around or a mask around) each object that is detected within an image captured by a vision sensor and/or apply machine learning to a detected object to determine one or more characterizations about the object. Example characterizations include a material type, a shape, a size, a mass, a priority, a condition, a form factor, a color, a polymer, and/or a brand.

In the specific example that is shown in FIG. 2, prior to being transported and spread across sorting lines 204, 206, 208, and 210, an input load ("infeed") of raw materials is loaded onto input machinery 228 to be preprocessed by common preprocessing components like a reducer/shredder (e.g., to reduce the size of larger objects) and a magnet (e.g., to screen out ferrous materials from entering the sorting lines). After metal removal, the infeed material can pass over a screen (not shown) of input machinery 228. The screen allows fine material (e.g., broken glass, small metal and plastic fragments, dirt, rocks, other shredded material, etc.) to fall through to be transported away on a trash conveyor (not shown) of input machinery 228. Once the material passes through the fines screen, optionally, a (e.g., vision) sensor is used to identify non-desirable materials (e.g., trash) and provides an initial residue sort using an initial sorting device (e.g., an array of air jets). The sorted residue material is discarded onto a trash conveyor that transports the non-desirable materials to residue 220. The input machinery equipment used for preprocessing that is described herein is merely an example and in practice, any type of preprocessing equipment (e.g., magnet, shredder, screens, etc.) and in any sequence can be used to preprocess the stream of materials at any point within or in advance of a sorting line. After the initial residue removal, the remaining material stream can be distributed across sorting lines 204, 206, 208, and 210 by a distribution device (which is sometimes referred to as a "pants splitter"). The distribution device is designed to split a stream of material into multiple substreams without encountering clogs due to fibrous material jams. Examples of the distribution device can be found in FIGS. 4A, 4B, and 4C, below.

Each of sorting lines 204, 206, 208, and 210 includes a respective series of conveyor devices that is each associated with a corresponding sorting device. As will be described in further detail below, local MCS 216 stores physical layout information of the sorting facility devices within the facility. The physical layout information describes at least the position of each sorting facility device such as their location within the facility and their relative position within a sorting line. Local MCS 216 uses this physical layout information to enable reconfiguration of the appropriate portion of sorting facility devices (e.g., sorting devices) in response to feedback data collected at the facility, in response to operator input, and received from a source that is external to the facility (e.g., a third-party service, another facility, and/or a central MCS).

In the example of FIG. 2, each of the sorting devices is labeled as "Sorting Device A" or "Sorting Device B." Each such sorting device may refer to an instance of a type of a sorting device with a different sorting mechanism (e.g., an array of air jets, suction, pusher, robotic arm, or otherwise) and/or an instance of a sorting device with a particular set of configured parameters (e.g., suppression thresholds, target material type(s), and target object identification thresholds). In this example, each instance of "Sorting Device A" or "Sorting Device B" in each of sorting lines 204, 206, 208, and 210 is configured to perform a sorting operation on ("fire on") target objects of a particular type of material to "capture" those objects. The fired-on target objects are removed from the stream of materials that is being transported through each sorting line and are then deposited onto a target conveyor (e.g., that is moving in a direction away from a direction in which materials are moving along the sorting lines) or through transfer tubes. Each target conveyor or transfer tube is configured to transport captured target objects to respective ones of bunkers 214 for storing captured materials of a particular material type. The specific example types of materials that are being sorted in FIG. 2 are related to recyclable materials. As shown in the example of FIG. 2, the target objects that are deposited onto the target conveyor(s) that run through one row of "Sorting Device B" sorting devices (across sorting lines 204, 206, 208, and 210) are transported to those of bunkers 214 for storing "UBC" (used beverage container) type materials, "HDPE Color" (High Density Polyethylene with color) type materials, and "HDPE Clear" (High Density Polyethylene without color) type materials. The target objects that are deposited onto the target conveyor(s) that run through another row of "Sorting Device B" sorting devices (across sorting lines 204, 206, 208, and 210) are transported to those of bunkers 214 for storing "PET Color" (polyethylene terephthalate with color) type materials, "Non-UBC Al" (non-used beverage container aluminum) type materials, and "PET Clear" (polyethylene terephthalate without color) type materials. The target objects that are deposited onto the target conveyor(s) that run through a first row of "Sorting Device A" sorting devices (across sorting lines 204, 206, 208, and 210) are transported to those of bunkers for storing "#3-7s" type materials, "Cartons" type materials, and "Spare storage" type materials. The target objects that are deposited onto the target conveyor(s) that run through a second and a third row of "Sorting Device A" sorting devices (across sorting lines 204, 206, 208, and 210) are transported to those of bunkers 214 for storing "Office paper" type materials, "News" type materials, and "OCC" (corrugated cardboard boxes) type materials.

In some embodiments, row 230 of "Diverter" sorting devices (across sorting lines 204, 206, 208, and 210) may each be configured to place undesirable objects (objects that do not match target object parameters) that had not already been removed from the stream by an upstream sorting device on to a conveyor device that transports such objects into residue 220 (e.g., a trash compactor). In performing this type of "negative" sort involving performing sorting actions on undesirable objects, row 230 of "Diverter" sorting devices is configured to allow desirable objects (target objects) to be deposited from their respective sorting lines onto recirculation conveyor 212, which is configured to transport the selected objects back to the source of sorting lines 204, 206, 208, and 210, and loading belt 202 for another pass at being sorted. The recirculated materials are then processed through all the shared components of the facility (e.g., the shredder, magnet) before being dispersed among the four sorting lines, sorting lines 204, 206, 208, and 210, for a subsequent pass through those sorting lines. "Diverter" sorting devices in row 230 may each be implemented by an array of air jets (e.g., air valves) that selectively fires on and thus changes the trajectories of the undesirable objects. Due to "Diverter" sorting devices' function of selectively allowing objects that local MCS 216 has likely determined to be a target/desirable object to enter recirculation and towards eventual capture into one of bunkers 214, sorting devices such as "Diverter" sorting devices in row 230 are sometimes referred to as "last chance" sorting devices. In some embodiments, the "last chance" "Diverter" sorting devices in row 230 can "select" objects for recirculation either by firing on them or not firing on them, depending on how the conveyance system that conveys the objects back into recirculation or residue 220 is configured. In some embodiments, the same stream of materials may be recirculated through the sorting lines 204, 206, 208, and 210 until a set of recirculation criteria is met.

In various embodiments, bunkers 214 store captured target objects that were removed by a sorting device from the material stream. Due to local MCS 216's ability to communicate with the sorting facility devices (e.g., sensor devices, conveyor devices, and/or sorting devices) within the facility, local MCS 216 is able to track which and how much of fired upon objects (e.g., objects on which a sorting device had performed a sorting operation) and that were successfully captured have been deposited into each of bunkers 214. As such, local MCS 216 can use this tracked bunker content information to determine when to programmatically trigger the emptying of any particular bunker such that its emptied out contents can be transported via conveyors (e.g., conveyor 222) into baler 226, which is configured to compress materials into rectangular bales. The produced bales can then be sold and/or transported to a buyer for additional processing (e.g., recycling, pyrolysis). Similarly, local MCS 216 can use this tracked bunker content information to reconfigure upstream sorting facility devices, if appropriate, to target more of one or more types of material that would eventually result in a desired material mix (e.g., meeting a bale recipe) to enter baler 226. Ultimately, local MCS 216 can accurately track and record the breakdown of the material types, and other attributes (e.g., mass and purity rate), of objects that are included in each bale that is produced by baler 226.

In various embodiments, the sorting facility devices of the sorting facility can be networked to enable object recognition and tracking within a facility, which affords numerous new benefits. In some embodiments, the sorting facility devices are addressable by other components within the system over network 218. As a result, information (e.g., including object type, trajectory information, etc.) related to an object of interest, for which its image is captured and then detected within the image by a sensor and local MCS 216, may be made available to any other device, upstream or downstream, within the facility. In a simple example, the object-related information is made available to a downstream sorting device to cause the downstream sorting device to perform a sorting operation on the object to remove it from the material stream and into a corresponding one of bunkers 214. In a more sophisticated use case, the object-related information may be used by local MCS 216 to calculate material characteristics of infeed flows (e.g., that emanate from input machinery 228) to the facility. Local MCS 216 can then reconfigure the sorting parameters of multiple downstream sorting devices to optimize for the sorting of the infeed flows based on their detected material characteristics. For example, with a facility-wide view of material trajectories, multiple sorting, compacting and baling subsystems can be dynamically optimized based on a changing material mix. If polyethylene terephthalate (PET) plastics experience a significant volume increase in the infeed, such a networked system can then automatically adjust sorting and baling parameters to optimize for the updated material mix, by taking sorting and sensor devices focused on other materials out of service and repurposing for the PET material influx. A similar benefit is in the dynamic tracking of statistical information, which can be programmatically compared to preconfigured rules to dynamically trigger reconfiguration within the facility and/or the statistical information can be exposed at user interfaces for operators, so that operators can make informed decisions regarding optimal bale mixes and also provide real-time feedback for the infeed operations. For example, sensed data downstream in a facility may be used to optimize the behavior of reducers, based on statistical information gathered from the overall facility. In some embodiments, sensed data downstream provides a stream type of feedback, allowing the upstream sorting devices and infeed controls to vary the inputs based upon what downstream sensors capture and are analyzed by local MCS 216. Additionally, the facility data tracked or detected by local MCS 216 may be implemented to provide visual indicators of system characteristics at user interfaces for operators. Based on analysis of one facility, or across multiple facilities, a facility neural model may be developed that can automatically provide information about system capacities, obstructions, potential maintenance issues etc. This information can then be used to provide alerts and graphical indicators to operators as needed.

In some embodiments, multiple sensor types may be used throughout a facility. For example, a visible light (e.g., vision) camera (e.g., that is pointed towards the objects on a conveyor device) can be used in conjunction with local MCS 216 as the sensor for object identification. Infrared (IR), hyperspectral, or other non-visual sensors (e.g., magnetic, audio, etc.) can be used in addition to vision cameras to augment local MCS 216's object identification capabilities. Because the sorting facility devices are networked via local MCS 216, identification information from one sorting unit (e.g., that comprises at least a sorting device) may be made available to others, even if the sensor capabilities of the two sorting units are different. A benefit of this approach is to allow the distribution of lower cost sensors everywhere throughout the facility, but still gain the benefit of more expensive multi-sensor modalities across the facility. For example, a first quality control (QC) sorting unit located near the facility ingest point may include both visible and near field infrared (IR) sensors. Upon identifying an object type with an NIR signature, that object may be tracked downstream in the facility based upon the visual structure (e.g., bounding box) and time identified (as mass flows are calculated across the facility), even though downstream sorting units may not support NIR sensors.

In some embodiments, residue 220 is implemented using two or more trash compactors. In some embodiments, a bi-directional belt drive is utilized to automatically switch between the two or more compactor bins to redirect material flows from a full compactor to a not full (e.g., empty) one. Using a distribution (e.g., pants splitter) device enabled branching or multiple compactor drive units, more than two compactors may be supported in a large facility. For example, in a two-compactor facility, a conveyor belt accepts the trash deposit from the refuse line, and operates in one of two directions, relevant to the desired compactor. By stacking such bi-directional lines, more compactors may be supported. A sensor coupled to the compactor may be used to provide feedback to the belt controller, thereby causing a switching action to occur, or an operator may be alerted through the MCS user interface (UI) and direct the switch activity. In some embodiments, local MCS 216 is integrated with the compactor system, and correlates data of material infeed and sorted objects with the amount of material deposited in the compactor. Dramatic differences between compactor levels and MCS data may trigger more detailed auditing, analysis, or operator alerts.

In some embodiments, separate "blaster" devices (a targeted high-pressure valve) may be installed within a sorting facility and used to prevent or remove clogs of fibrous materials. For example, over time, fibrous materials may accumulate around the air valves of air jet array sorting devices, particularly those focused on directing materials in an upward direction. In some embodiments, a blaster may be any form of high-pressure valve and is oriented to fire on and to remove debris buildup on one or more jet arrays or other areas of buildup. In various embodiments, a blaster can be always on, on a timer, or strategically actuated (e.g., based on feedback from an ML vision subsystem) to remove accumulated debris (e.g., cardboard, film, paper-which may hold water and therefore adhere to surfaces). Blasters may be located in any area where debris could accumulate, for example, near the air jet array sorting devices (e.g., at the jet dividers), tops or bottoms of chutes, at metal ribbing or fanout locations, or conveyor side guards. Blasters, in general, may be utilized anywhere that material may adhere within a sorting facility. In some embodiments, one or more blasters are situated near air jet array sorting devices, and actuated based on feedback from ML vision subsystems that are configured to perform clog detection/quality control. For example, a machine learning model is trained to recognize debris buildup at an air jet array sorting device from a captured image of the sorting device, and that detection is then utilized as part of the MCS feedback control system described herein to implement control signals for the blasters associated with that air jet array.

In some embodiments, one or more of the conveyor devices are augmented with a blower or other pressurized-air based mechanism to keep light objects pinned to the surface of the belt. The system may use a blower, air jet array, or other air-based mechanism to create a laminar air flow directed down, normal to the surface of the moving conveyor belt. This laminar flow creates a positive pressure on objects moving along the belt, and specifically increases the adhesion of lighter weight objects (e.g., thin film, light plastics, paper products, etc.) to the belt as it moves at a high speed so that the objects do not move relative to the motion of the belt. This ensures that lightweight target objects identified for downstream air jet array sorting devices are in position as expected (e.g., when they are targeted by a sorting device), and that undesirable (non-target) lightweight objects do not move into positions where they might trigger neighbor suppression techniques based on proximity to target objects.

While the specific example types of materials that are being sorted in FIG. 2 are related to recyclable materials, the example sorting lines shown in FIG. 2 can be used to sort through any type of material.

Figure 3:
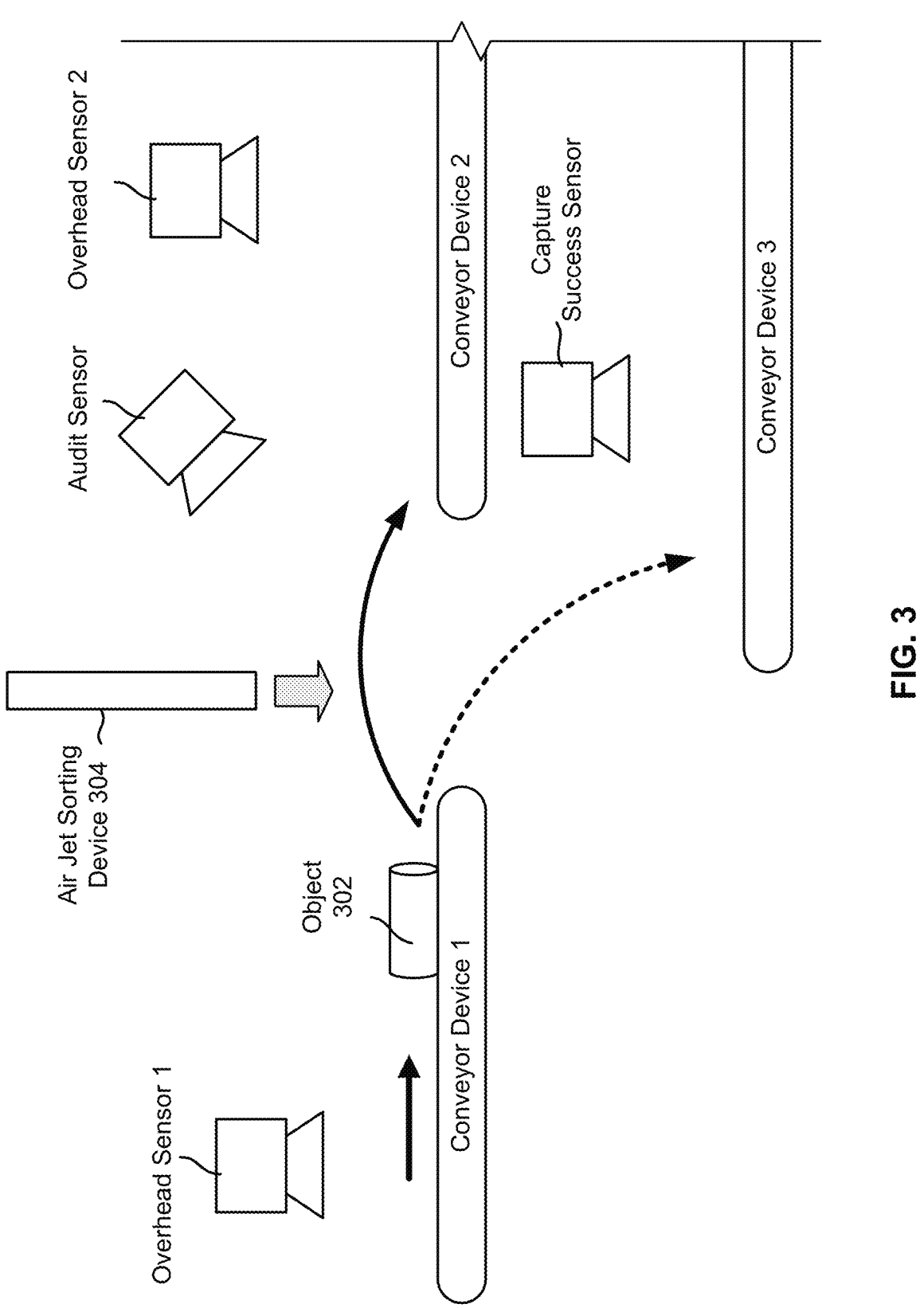
FIG. 3 is a diagram showing an example of a configuration of a sorting device and vision sensors that can be used to detect whether an object on which a sorting operation was performed (e.g., that was fired upon) by the sorting device was successfully captured.

FIG. 3 is a diagram showing an example of a configuration of a sorting device and vision sensors that can be used to detect whether an object on which a sorting operation was performed (e.g., that was fired upon) by the sorting device was successfully captured. Specifically, FIG. 3 shows the side view of an air jet array type of sorting device, the side view of various conveyor devices, and the side view of various vision sensors that can be used to detect whether a target object that was fired upon by a sorting device was successfully captured, meaning that it will be deposited into a bunker. In some embodiments, the configuration of sorting facility devices that are shown in FIG. 3 can be implemented within the example sorting facility that was described in FIG. 2.

One or more of the sorting devices within a sorting facility can be air jet arrays. In various embodiments, an "air jet" array type of sorting device (or sometimes referred to simply as "air jet") comprises an array of air valves or air orifices that are each controlled to emit/fire pressurized airflow on a target object to change the trajectory of the object towards a desired destination. For example, an air jet array can be instructed (e.g., by a local MCS) to perform a sorting operation by activating one or more of the air valves to fire airflows on a target object as it passes across the array. In some embodiments, an air jet array is distributed across the width of a conveyor belt (e.g., at the end of the belt from which objects fall off), with its air jets aimed to selectively fire on a target type of material in the direction of a collection bunker or another conveyor belt that will transport the material towards the bunker. Returning to FIG. 3, the diagram shows a particular configuration in which the air jet array's firing actions propel target objects that fall off a first conveyor belt in a vertically lower direction, ending up on a lower conveyor belt that is configured to transport sorted objects towards a corresponding bunker, while non-sorted (non-target) objects land on a second conveyor belt at the same level as the first conveyor belt to be potentially sorted downstream. Specifically, in FIG. 3, Overhead Sensor 1 captures an overhead image of objects such as Object 302 on Conveyor Device 1. The local MCS will apply machine learning model(s) to the overhead image to determine whether the attributes (e.g., material type, object type) of Object 302 match the current target object parameters of Air Jet Sorting Device 304. In the event that the attributes of Object 302 match the current target object parameters of Air Jet Sorting Device 304, the local MCS will instruct Air Jet Sorting Device 304 to fire on Object 302 as it falls off Conveyor Device 1 to cause Object 302 to drop down to Conveyor Device 3, which is configured to convey material towards a bunker. In the event that the attributes of Object 302 do not match the current target object parameters of Air Jet Sorting Device 304, the local MCS will not instruct Air Jet Sorting Device 304 to fire on Object 302 and it will fall off Conveyor Device 1 and then land on Conveyor Device 2.

In some embodiments, whether a target object that was determined to be fired upon by a sorting device is successfully sorted (and captured) into a bunker can be audited using one or more vision sensors at the sorting facility. For example, if the local MCS instructs Air Jet Sorting Device 304 to fire on Object 302, then whether Object 302 was successfully sorted and captured into the bunker can be determined based on image(s) that are captured by one or more of Audit Sensor, Overhead Sensor 2, and/or Capture Success Sensor. Audit Sensor can capture an image of Object 302 at the time that Air Jet Sorting Device 304 is instructed to fire on Object 302 and such an image can be manually evaluated or programmatically evaluated using machine learning to determine whether the image depicts a successful sorting operation (e.g., Object 302 appears within the image to be directed towards the desired destination of Conveyor Device 3). Overhead Sensor 2 can capture an image at a time subsequent to when Air Jet Sorting Device 304 is instructed to fire on Object 302 and such an image can be manually evaluated or programmatically evaluated using machine learning to determine whether the image shows Object 302 on Conveyor Device 2, which would mean that Object 302 had not been successfully sorted/captured. Capture Success Sensor can capture an image at a time subsequent to when Air Jet Sorting Device 304 is instructed to fire on Object 302 and such an image can be manually or programmatically evaluated using machine learning to determine whether the image shows Object 302 on Conveyor Device 3, which would mean that Object 2 had been successfully sorted/captured. The local MCS can then use the (e.g., aggregated) object capture success or failure infor-mation to perform additional actions such as reconfiguring the sorting parameters of Air Jet Sorting Device 304 to improve its future capture success rate and/or instruct another sorting device downstream of Air Jet Sorting Device 304 to fire on Object 302 in a subsequent attempt to capture it.

In some embodiments, one or more air jet arrays (e.g., that are positioned at the end of sides of a conveyor device) may be configured to send target objects in any one of multiple directions (e.g., down, up, one up and one down, two up, etc.). Each air jet array (or multiple air jet arrays) may be paired with receiving bunkers to facilitate the separation of desirable materials. For example, the one or more air jet arrays can be configured to target different objects and send them in different directions for collection or simply to remove from the conveyor. In one such example configu-ration, one or more air jet arrays ("dual array") may be positioned at the end of a conveyor belt, with an upward pointing section (subset of air valves) of the air jet array propelling materials to an upper conveyor belt, and mid-pointing section propelling objects to a slightly lower level belt. In this particular example configuration, non-fired upon objects fall off the end of the conveyor belt to land on the lowest level belt. In some embodiments, an air jet array may be positioned along the length of the conveyor device and used as binary sorters to push target objects off the opposite side of the conveyor device. At each array of air jets, a specific material type may be targeted, enabling multiple material streams to be sorted within a combination/heterog-enous stream. Conveyance lines coupled to air jet arrays are arranged as a set of branches (e.g., each air jet array selectively sorts a subset of one or more materials), and the system can be treated as binary sorters, enabling a large number of materials to be sorted.

Figure 4A:
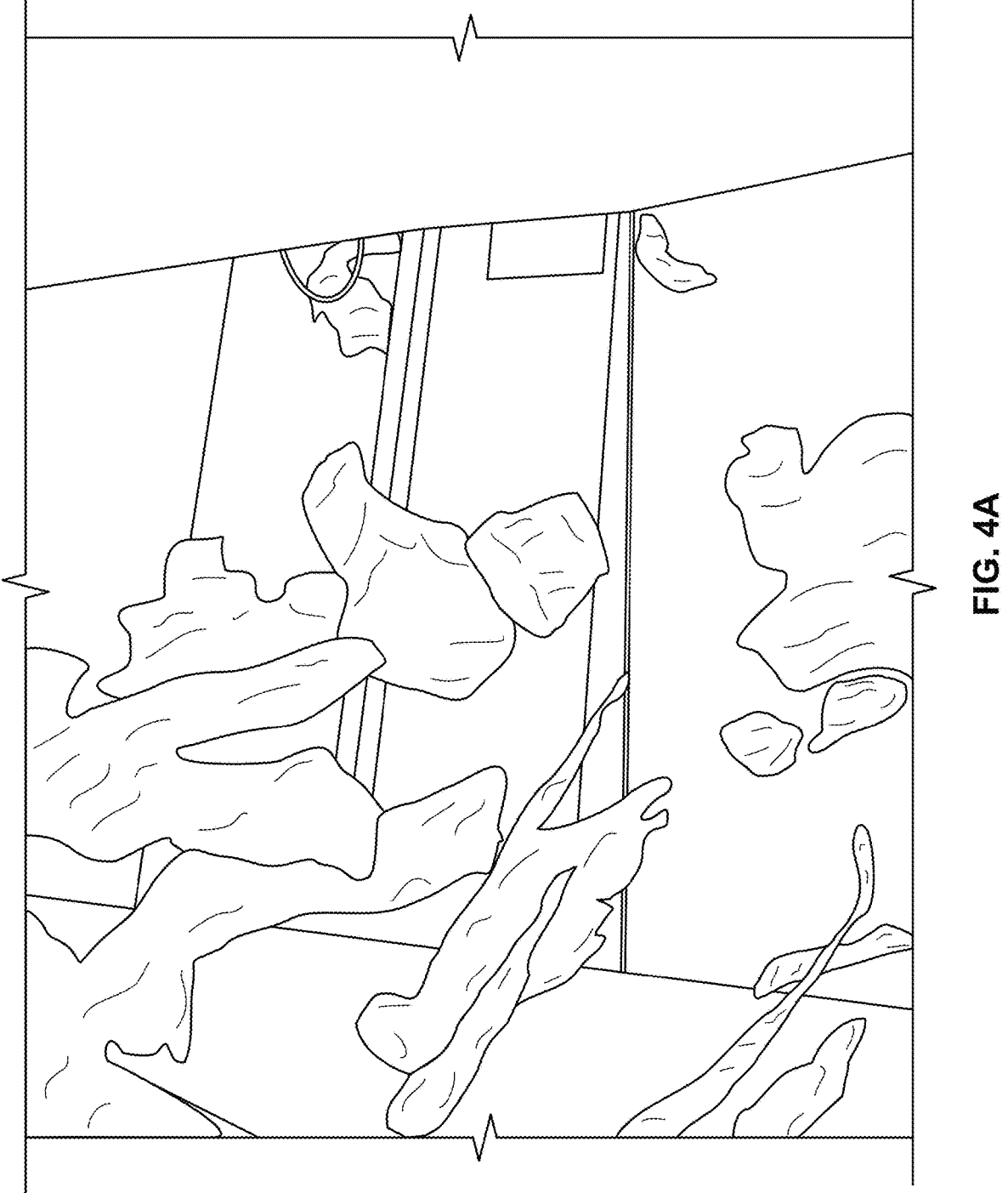
FIGS. 4A, 4B, and 4C are diagrams that show different examples of a distribution device that is configured to distribute a material stream across different sorting lines in accordance with some embodiments.
Figure 4B:
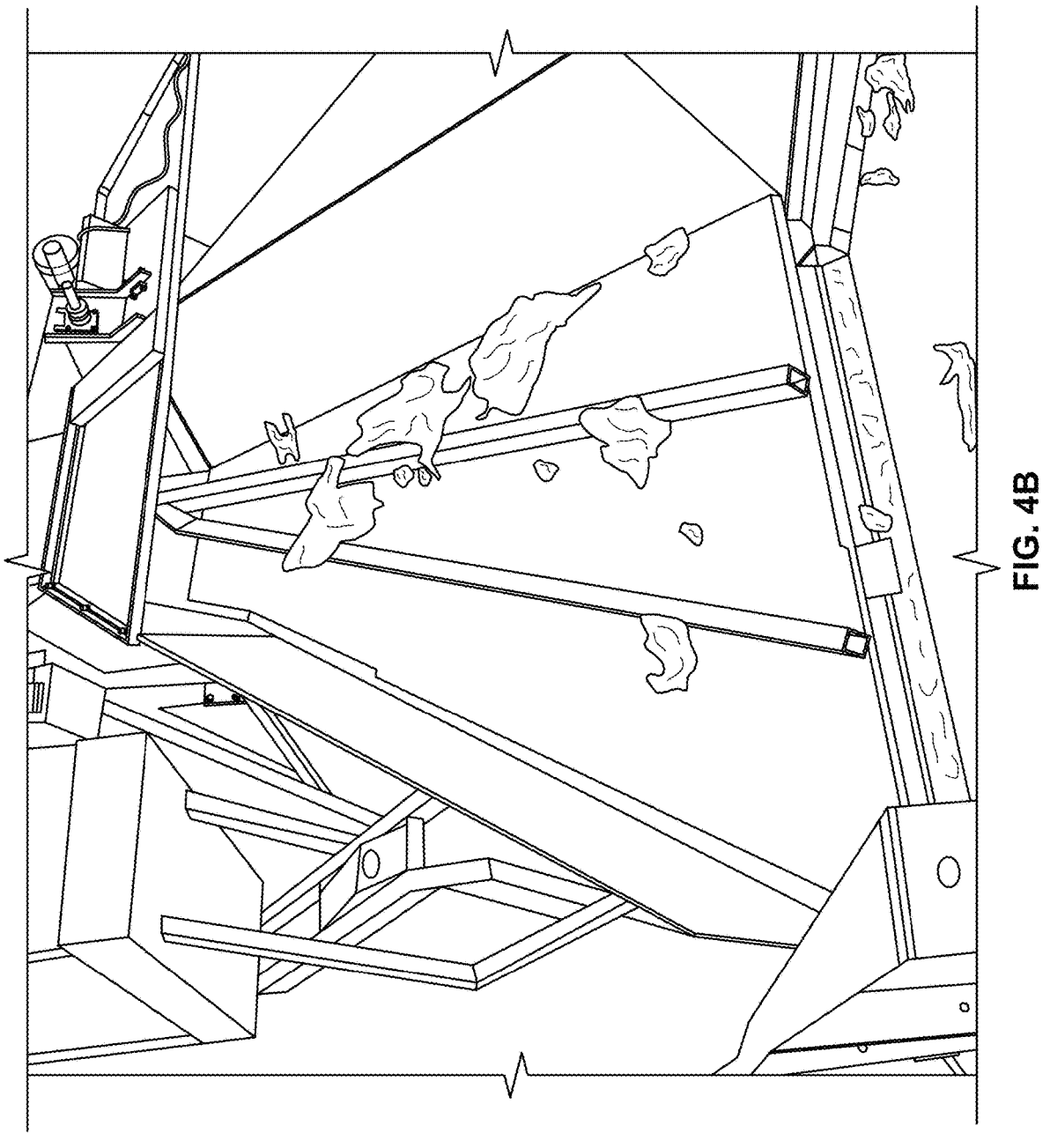
Figure 4C:
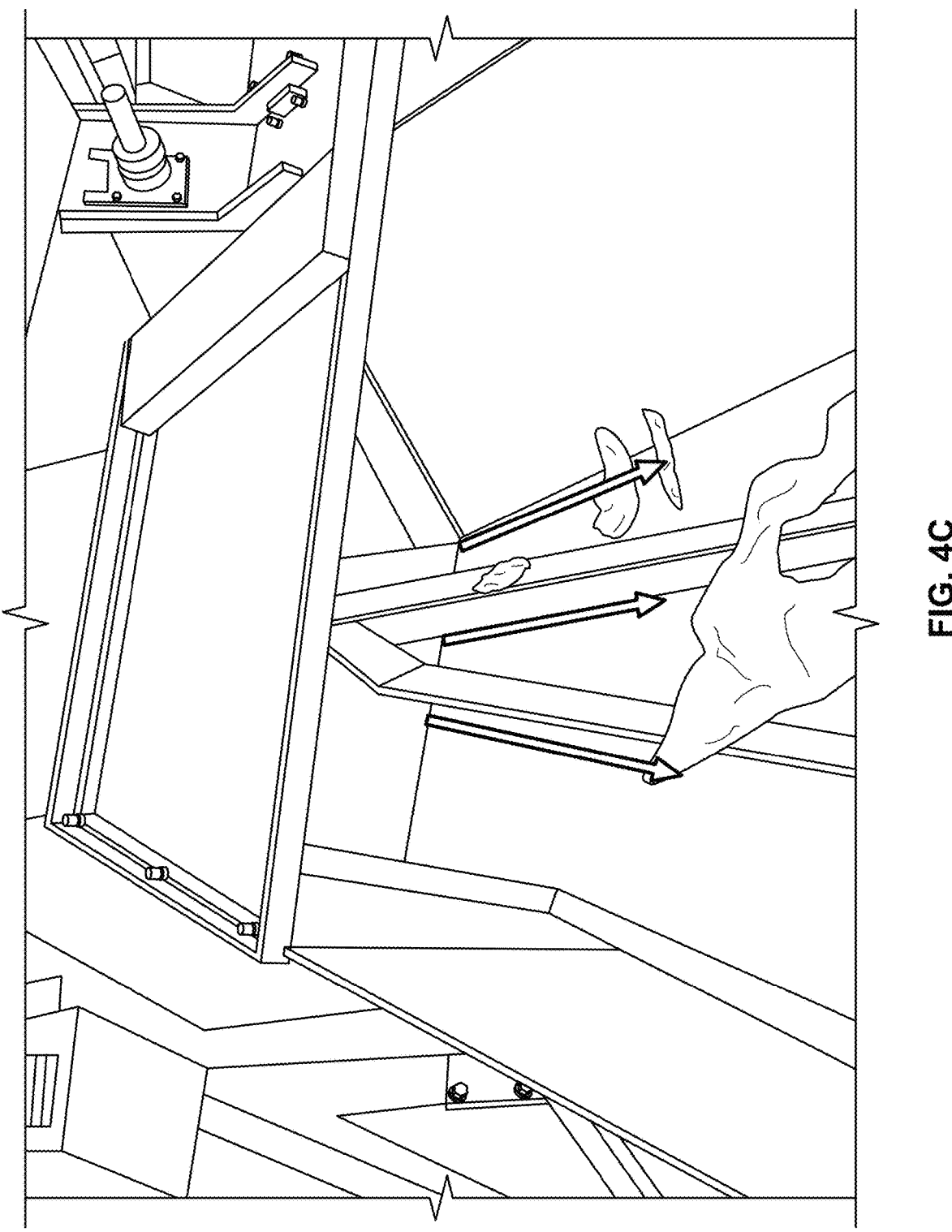

FIGS. 4A, 4B, and 4C are diagrams that show different examples of a distribution device that is configured to distribute a material stream across different sorting lines in accordance with some embodiments. In some embodiments, any examples of the distribution device shown across FIGS. 4A, 4B, and 4C can be implemented within the example sorting facility that was described in FIG. 2. In some embodiments, subsequent to the initial removal of residue by one or more air jet arrays from the infeed material flow, a distribution device (which is sometimes referred to as a "pants splitter") is used to split the infeed material flow, without creating clogs due to fibrous material jams, into multiple streams across multiple sorting lines so that the sorting devices on each sorting line sort/capture the desired materials from the conveyor devices and into destination bunkers for eventual baling. In some embodiments, a dis-tribution device (pants splitter) is a "Y-shaped" device with an input from a main conveyance line into two or more gravity-fed smooth chutes (legs), each of which deposit materials uniformly on receiving conveyance lines. By using one or more pants splitters in series, the sorting facility can passively redistribute dense infeed material streams into multiple, less dense and more easily sorted material streams. In some embodiments, an active or passive roller is incor-porated into the pant splitter design, the roller acting as a friction reducing mechanism to prevent clogs at the "Y" input to the pant splitter. Active rollers (e.g., bi-directional rolling bars) and/or air jet arrays may be controlled by the local MCS to ensure even distribution of material across a conveyor belt and into or out of the pants splitter device. In some embodiments, the local MCS utilizes observational feedback from downstream devices (e.g., vision sensors) to adjust material distribution using these devices. FIG. 4A shows a material stream being input into the mouth of an example pants splitter distribution device with an example roller. FIG. 4B shows an example pants splitter distribution device with additional rails incorporated axially into each leg of the pants splitter to improve object distribution and reduce jamming. For example, each rail is 2-6" in height. Also shown in FIG. 4B, a slippery plastic material is added to the floor of each leg (e.g., UHMW) to encourage flow (reduce friction) and reduce clogs. FIG. 4C shows an example pants splitter distribution device with additional air jets that are configured to propel material in the direction of the arrows along different legs of the pants splitter.

Figure 5:
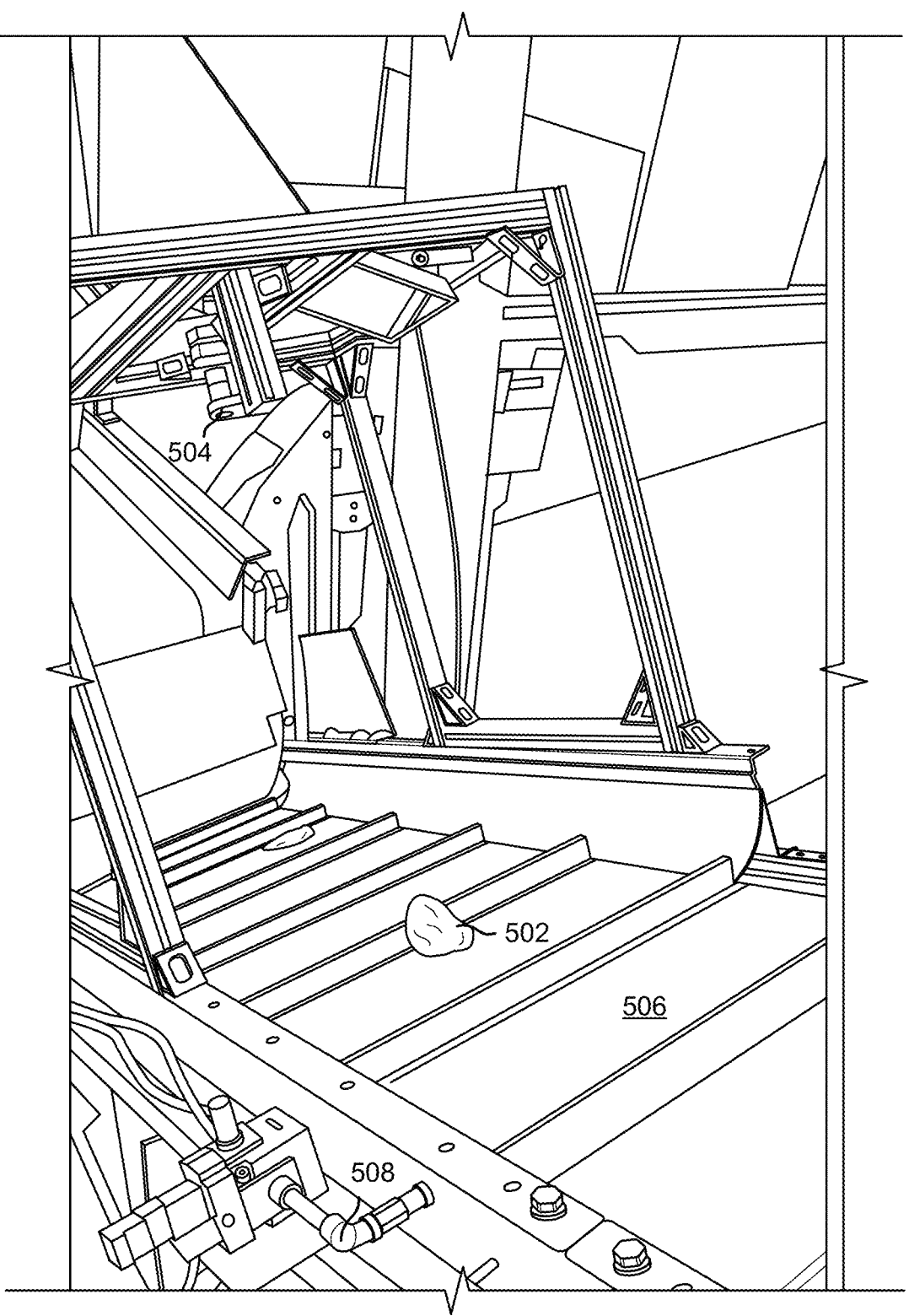
FIG. 5 is a diagram showing an example of an air jet implemented quality control (QC) subsystem in accordance with some embodiments.

FIG. 5 is a diagram showing an example of an air jet implemented quality control (QC) subsystem in accordance with some embodiments. In some embodiments, the configuration of sorting facility devices that is shown in FIG. 5 can be implemented within the example sorting facility that was described in FIG. 2. In the example of FIG. 5, objects such as object 502 are located on segmented conveyor belt 506 (e.g., a conveyor belt with ridges that separate objects). Vision sensor 504 is also placed over the segmented conveyor belt and used to capture images of the objects on conveyor belt 506. The captured images are analyzed by the (local) MCS by applying machine learning models to determine through which segment ("trough") of the conveyor belt micro air jet array 508 should shoot an airflow from a side of conveyor belt 506 so as to remove all the objects from that segment/trough off conveyor belt 506. For example, target objects (in a "positive sort") or non-target objects (in a "negative sort") can be identified in the images and then caused to be shot at by stream(s) of air off of a segment/trough of the belt by micro air jet array 508. Micro air jet array 508 may include as few as a single air valve or include more than one air valve but with a combined width that is less than the width of a conveyor belt. Micro air jet array 508 may be situated at one side of the conveyor belt and triggered to shoot stream(s) of air across the segments/troughs from which objects are desired to be removed off the other side of the belt. Alternative to an air-based removal by this "single shot" quality control subsystem, a pushing mechanism or another diverting mechanism for removing object(s) off from segments/troughs of a segmented conveyor belt can also be used. In some embodiments, conveyor belt 506 is not segmented but includes a smooth belt, free of ridges. Where conveyor belt 506 does not include segments, micro air jet array 508 can still be instructed to shoot air on (e.g., singulated) target objects from one side of conveyor belt 506 to remove the targeted objects off the other side of conveyor belt 506. For example, this single shot QC subsystem can be located at any location within the sorting facility to remove objects from the belt (e.g., on a segment/trough-based unit). In a specific example, this single shot QC subsystem can be utilized as a "last chance" diverting mechanism to negatively sort non-target objects (e.g., trash/residue) from the material stream before the remaining objects are recirculated through the sorting facility. Because micro air jet array 508 of the single shot QC subsystem can utilize as few as a single air valve (or a single pushing mechanism), it is inexpensive to implement and easy to maintain.

Figure 6:
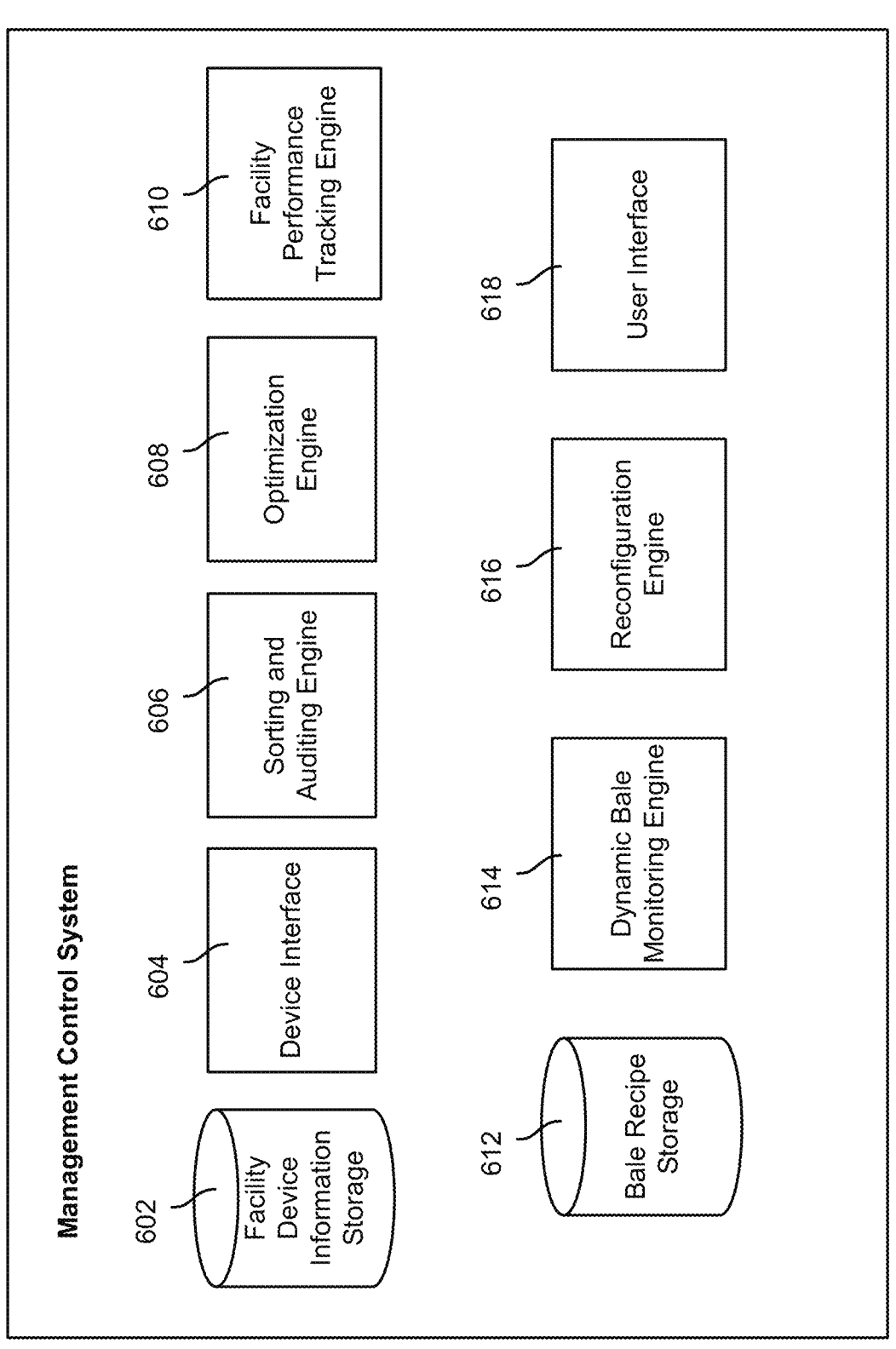
FIG. 6 is a diagram showing an example of an instance of a management control system (MCS) in accordance with some embodiments.

FIG. 6 is a diagram showing an example of an instance of a management control system (MCS) in accordance with some embodiments. In the example of FIG. 1, the MCS includes facility device information storage 602, device interface 604, sorting and auditing engine 606, optimization engine 608, facility performance tracking engine 610, bale recipe storage 612, dynamic bale monitoring engine 614, reconfiguration engine 616, and user interface 618. Each of facility device information storage 602, device interface 604, sorting and auditing engine 606, optimization engine 608, facility performance tracking engine 610, bale recipe storage 612, dynamic bale monitoring engine 614, reconfiguration engine 616, and user interface 618 may be implemented using one or more of software and/or hardware comprising one or more processors. In some embodiments, any of the local MCS instances at sorting facilities (e.g., Local MCS 104, Local MCS 108, and Local MCS 112) or the central MCS at a cloud (e.g., central MCS 102) can be implemented with the example MCS described in FIG. 1.

Facility device information storage 602 is configured to store information regarding the physical layout of components at a sorting facility. In various embodiments, the physical layout information associated with a facility comprises the location of each sorting facility device (e.g., input machinery, sensor, conveyor device, bunker, residue storage, baler, etc.) within the sorting facility and/or their position/location in relation to each other. For example, the physical layout information associated with a facility describes the sequence of the sorting facility devices within each sorting line of the facility. The physical layout information of the facility devices can be input by an operator via a configuration file or input via a user interface (e.g., user interface 618 comprising either a graphical user interface (GUI), or command line type interface).

In some embodiments, physical layout information that is maintained at facility device information storage 602 can store the different mappings/ratios between sensors and processors that are included in a logical sorting unit comprising one or more vision sensors and one or more processors, depending on camera feed/resolution and compute/memory capabilities, and a sorting device. In some embodiments, an air jet array sorting device is paired with two networked vision systems and corresponding ML systems. For example, each camera is aligned to target 50% of the width of the conveyor belt, and provides object recognition capability that is used by the control system to target the 50% of the air jet array covering that half of the belt. Based on object identification and trajectory information, the control system causes one or more jets of the 50% of the air jet array to fire. In another example, a single vision system or more than two vision systems may be used. The air jet array may be segmented into sections addressable for the individual vision systems, or may be completely addressable by each ML vision subsystem, with coordination provided by the control system.

As facility devices are rearranged in a facility, the operator can also update the physical layout information that is maintained at facility device information storage 602 for that facility. In some embodiments, the MCS adapts dynamically to plant layout changes at the facility. The operator may specify devices to be added, removed, or repositioned within the facility, either using a user interface (e.g., user interface 618) or via a configuration file which automatically updates the system (e.g., is used by the MCS to update facility device information storage 602). As will be described below, in response to the plant layout update, the MCS (e.g., via device interface 604) in turn implements software processes that dynamically reconfigure the operator interface, process flows, control algorithms, conveyor direction(s), and pairings among devices. By way of example, the addition of a new pants splitter distribution device, conveyor device, and downstream sorting device may cause the MCS (e.g., facility performance tracking engine 610) to dynamically adjust its mass flow calculations used to optimize material flow and bale purity. In another example, in response to a detected condition with respect to the remaining objects circulating through the sorting facility (e.g., the remaining objects include heavy residue), the MCS can redirect one or more conveyor devices to convey in the opposite direction and/or reconfigure the types of objects that one or more sorting devices target to ultimately adjust the flow of desired materials back into recirculation and direct the flow of undesired material into a residue collection. The addition of an additional vision sensor at an air jet array sorting device may cause the MCS to reconfigure the control logic and pairing of the existing sorting device and the vision sensor (e.g., camera). In this case, the MCS may choose to configure 50% of the air jet array sorting device to coordinate with the existing camera, and the other 50% to coordinate sorting with the newly installed camera. New configuration settings may be provided to the air jet (now logically segmenting its arrays to receive airflow profile instructions from two separate vision cameras), and also to the existing vision camera (altering the focus of its object identification to one side of the conveyance belt, but coordinating overall belt speed estimates with the new vision camera). The MCS may also alter its overall mass flow determination techniques based on such changes. The physical changes may be associated with specific technique modifications (e.g., adding a second sorting line may simply double capacity), or the MCS may alter the techniques after operating the new system to measure change effects, or a combination of both approaches.

Furthermore, the physical layout information stored at facility device information storage 602 includes information on co-located sensors within the facility. In various embodiments, "co-located sensors" comprises two or more sensors that are located in proximity to each other within the facility such that their respective fields of view are substantially adjacent or overlap with each other. As will be described in further detail below, in some embodiments, sorting and auditing engine 606 is configured to combine or otherwise simultaneously evaluate the images captured by two or more co-located sensors to determine a sorting operation to be performed on an object that appears within the image(s).

Device interface 604 is configured to discover new sorting facility devices within a sorting facility, configure the devices, and over time, also manage the software updates of the devices. In some embodiments, one or more networks are implemented within a facility, and the MCS (e.g., device interface 604) configures and manages those networks, providing access to authorized devices and facilitating communications among devices and subsystems. Networks may be distinct (e.g., separate WiFi and Modbus networks) or commingled and segmented by protocol (e.g., WiFi network supporting ML vision Internet Protocol (IP) communications as well as control protocols for embedded controllers). In some embodiments, device interface 604 may provide interfaces (e.g., graphical, command-line interface, programmatic, etc.) to enable operators or developers to set up and manage these networks and configure network settings (e.g., WiFi SSID, MAC addresses, unique or proprietary addressing for embedded devices, etc.). In some embodiments, device interface 604 further may manage network authentication, and implement a zero-trust framework to ensure that devices, users, and third-parties have appropriate levels of access to the networks. In some embodiments, device interface 604 can communicate with different devices based on the installations of various device type drivers. For example, device interface 604 can then send instructions to a particular device by translating those instructions into a protocol understood by that device using the appropriate device type driver.

In some embodiments, device interface 604 implements installation and bootstrapping algorithms to enable automatic device discovery and installation. By way of example, a new sorting device (e.g., a robot) may be installed in the facility, and may search for available WiFi or Ethernet-based IP networks. Device interface 604 may discover the robot (e.g., through the robot's bootstrapping sequence), validate that the robot is authenticated (e.g., through user input, config files, etc.), and then authorize the robot to communicate over one or more networks using one or more approved protocols. Device interface 604 is independent of the networking protocols and physical network layers, but provides a software framework to manage any such protocols and networks implemented in the facility. A component of the MCS is an authentication and authorization subsystem that enforces security business rules for the facility. A component of the MCS is a multi-protocol communications subsystem that manages disparate communications protocols across one or more physical networks within the facility. This aspect of the MCS allows the MCS to facilitate communications and control activities between multiple components of the overall facility. In an example flow, device interface 604 configures an ML vision subsystem to communicate with one or more diverting mechanisms (e.g., air jets, robot manipulators, etc.) and conveyance systems, even though the vision subsystem utilizes internet protocol (IP) networking (WiFi), and the robot manipulator utilizes both Ethernet and proprietary control networks, and the Variable Frequency Drive motors (VFD) controlling the conveyance system utilize a Modbus network architecture. The processor of the ML vision subsystem can determine the location of (e.g., the bounding box around) each detected object within the captured image and/or apply machine learning to a detected object to determine one or more characterizations about the object. Example characterizations include a material type, a shape, a size, a mass, a priority, and/or a condition.

In some embodiments, device interface 604 provides all aspects of remote device management. When a new device (e.g., a camera, sensor, diverting mechanism, etc.) is installed in a facility, in some embodiments, device interface 604 facilitates the on-boarding process. In some implementations, a device may be automatically discovered as it is added to a network. In this scenario, the device may broadcast uniquely identifying information (such as a MAC address or other identification, for example) to enable identification and authentication by device interface 604. A default on-boarding network (e.g., WiFi or Ethernet) may be utilized for the facility (or even across facilities) that enables initial communications between the new device and device interface 604. During the installation phase, the new device searches for and joins the default network (using for example a prearranged SSID and password). Device interface 604 then authenticates the device (using any cryptographic technique such as a key exchange), and after establishing an encrypted connection, directs the new device to a second, different network (e.g., a private SSID or even dedicated network for the device). This on-boarding process may not require human intervention, or it may require an installer to validate a serial number or other unique identifier for the new device prior to enablement by device interface 604. In some embodiments, device interface 604 is coupled to a database containing identifiers and other information (e.g., capabilities, version numbering, software builds, neural models, etc.) for valid devices in the facility. As part of the authentication process, device interface 604 may compare data provided by the new device or by the installer with data in the database. Once authenticated by device interface 604, the new device is registered with the MCS (for example in an "active devices" database) and device interface 604 assumes responsibility for ongoing device management. Device interface 604 is capable of implementing all aspects of the device life cycle for managed devices. After the initial onboarding, device interface 604 monitors firmware versions for all managed devices (where applicable) and initiates or supports firmware update procedures as needed. By way of example, a newly onboarded camera may be running an outdated factory version of firmware. In this scenario, device interface 604 may initiate a firmware update before the onboarding process is complete if the old version of firmware is not compatible with the newer software in the facility. Alternatively, if software interoperability is assured (e.g., as described in the metadata for the devices in the MCS "active devices" database) then device interface 604 may finish the onboarding process first, and only then initiate a firmware upgrade. Note that firmware updates may also be controlled by the device itself, with device interface 604 acting as a facilitator or alert mechanism to provide devices with information about newer firmware releases.

In some embodiments, device interface 604 implements change control business policies for one or more sorting facilities. Operators may set MCS configuration parameters (through a GUI, or programmatically) to govern the management of state changes in the system. In some embodiments, device interface 604 maintains information (e.g., in an "active devices" database) about all devices installed within a facility or across multiple facilities. Based on business or technology requirements, device interface 604 may cause configuration and version changes to the system dynamically. In the MCS, each type of device implements a set of features, configurations, and software versions. In some embodiments, the "active devices" database also incorporates version compatibility information that is used by the version management system. Upon any change to a device in the database (e.g., updated software version, new functionality, changes to configuration, etc.) device interface 604 ensures that the entire facility is operating based upon the version compatibility data and operator configuration preferences. In some embodiments, device interface 604 maintains consistency of versioning within each device, as well as consistency across devices and within the facility. For example, a machine learning model (e.g., neural network) update may be made available to the cameras of one or more ML vision subsystems within a facility. Based upon the new capabilities of the update, device interface 604 may indicate that a newer firmware version is required for all participating cameras. Device interface 604 then automatically schedules and implements a synchronized update process, whereby impacted cameras are updated first, followed by the update to the neural network. In the event of a problem with an update (e.g., a bug in the camera firmware), device interface 604 can provide a rollback facility that backs out changes and downgrades camera firmware and neural software in an order appropriate to prevent mismatches in the system (e.g., downgrade the neural network first, followed by camera firmware). This is a simple example that scales to support dozens or hundreds of devices within a facility, each with one or more dependencies on other software or devices. In some embodiments, device interface 604 manages change control across multiple facilities. Cloud services utilized by multiple facilities are then managed using the same change control techniques, but with parameters related to multi-facility dependencies. As mentioned above, the MCS itself may be implemented as a cloud service, and manage multiple facilities and their associated devices. By way of example, a database schema change may be required for the MCS to implement the latest version of its software, which may have an impact on remote MCS services running in facilities. The MCS change management system is employed in this case to ensure that facility software is first updated to support new and old versions of the schema, and then the schema change is implemented. In some embodiments, the MCS incorporates change management functions that support all of its managed devices and services, remote cloud services, as well as the services provided by the MCS itself.

Sorting and auditing engine 606 is configured to receive images of objects from (e.g., vision) sensors and then apply machine learning to the images to detect the objects and the features of the objects. In some embodiments, sorting and auditing engine 606 executes one or more of the following types of software: a neural network algorithm, reinforcement learning algorithm, support vector machine, regression (logistic or otherwise), Bayesian inference, and other statistical techniques. In particular, sorting and auditing engine 606 is configured to run one or more machine learning models that are configured to identify object(s) within the image received from a vision sensor (e.g., that are placed above a conveyor device). For example, the machine learning model(s) running at sorting and auditing engine 606 are configured to determine the location of (e.g., the bounding box around and/or the outline of) objects and the features of the objects in the received image. Sorting and auditing engine 606 is configured to compare the determined object features (e.g., material type, object type, object shape, object dimensions, form factor, object color, and/or brand) to a reconfigurable set of target object criteria to determine those object(s) that match the criteria as "target objects." "Target objects" are objects which sorting and auditing engine 606 is to instruct a sorting device, which is located downstream from the vision sensor, to perform sorting operations on and to deposit the sorted/captured objects directly into a corresponding bunker or onto a conveyor device that conveys captured objects to the corresponding bunker.

In some embodiments, sorting and auditing engine 606 is configured to determine, for each target object, whether the sorting/removal of that target object from the stream of objects should be suppressed (e.g., avoided) using a reconfigurable set of suppression criteria/parameters. Certain sorting mechanics of removing a target (desirable) object from a stream include physically deflecting (e.g., using a vacuum, a positive airflow, or a physical mechanism) the target object into a bunker or a target conveyor device. However, it is possible that the physical deflection aimed at the target object could inadvertently also deflect a non-target (undesirable) object into the bunker intended for the target object. The result of inadvertently deflecting a non-target object into the bunker is to decrease the purity rate of objects collected in one or more bunker(s), which is undesirable. For example, the "purity rate" corresponding to objects deposited into one or more bunkers can be defined as either 1) the total number of collected target objects over the total number of all objects collected at the bunker(s) or 2) the total weight of collected target objects over the total weight of all objects collected at the bunker(s). Typically, the greater the purity rate of objects collected at the bunker(s), the greater the (e.g., economic) value that is associated with the collected objects. As such, it is undesirable to allow neighboring non-target objects to be inadvertently deposited into a bunker when a sorting device fires on a target object because doing so will lower the purity rate associated with the objects collected at the bunker. For example, the set of suppression criteria describes the conditions for when a sorting device should not fire on a target object (to reduce the risk that the non-target object also inadvertently becomes deposited into a bunker). In a specific example, the set of suppression criteria may describe that if a non-target object is located within a predetermined distance from a target object and that the size of the non-target object is greater than a predetermined size, then the sorting device should not be instructed to remove the target object (to reduce the risk that the non-target object becomes deposited into a bunker) (i.e., the removal of that target object should be suppressed). For example, the set of suppression criteria/parameters can be made to be more "tolerant" by shortening the predetermined distance between the target object and a non-target object that would trigger suppression (i.e., shortening the predetermined distance would cause the sorting device to perform sorting operations more frequently/aggressively, while increasing the risk that undesirable objects are captured). Also, for example, the set of suppression criteria/parameters can be made to be more "stringent" by increasing the predetermined distance between the target object and a non-target object that would trigger suppression (i.e., increasing the predetermined distance would cause the sorting device to perform sorting operations less frequently/less aggressively, while decreasing the risk that undesirable objects are captured). In some embodiments, sorting and auditing engine 606 is configured to determine which target objects should be removed and which should not be removed by a sorting device using the set of suppression criteria. In some embodiments, sorting and auditing engine 606 is configured to store data to indicate the target objects for which removal (e.g., via the performance of a sorting action) was determined by sorting and auditing engine 606 to not be performed by a sorting device.

Sorting and auditing engine 606 is further configured to perform quality control on sorting efficacy by auditing whether a sorting operation that was performed by a sorting device on a target object was successful (e.g., the target object was deposited on the desired conveyor or in the desired bunker) or unsuccessful (e.g., the target object was not deposited on the desired conveyor or in the desired bunker). In some embodiments, to determine the success or failure of a sorting operation performed on a target object, sorting and auditing engine 606 is configured to evaluate feedback image data that is captured by one or more vision sensors that depict the execution of the sorting operation and/or objects that appear on one or more conveyor devices after the execution of the sorting operation. As mentioned with the example images of FIG. 3, above, sorting and auditing engine 606 can programmatically analyze (e.g., using machine learning models) feedback image data to determine whether an image of the execution of the sorting operation appears to be successful, whether an image of objects downstream of the executed sorting operation includes the target object (meaning that the sorting operation had failed), and whether an image of objects on a target conveyor includes the target object (meaning that the sorting operation had been successful). By determining the real-time capture success or failure of sorting operations performed by a sorting device, sorting and auditing engine 606 is able to determine performance statistics (e.g., the percentage of capture success) of each sorting device and, if appropriate, prompt events such as reconfiguration (e.g., of target object criteria and/or suppression criteria, re-calibration, cleaning/maintenance of the sorting device or retraining of the machine learning model's parameters for trajectory evolution and subsequent sorting operations, etc.) to obtain better sorting results. Furthermore, the auditing results when coupled to the neural processing capabilities enables identification of problem areas to the operator. For example, the identification of only large PET containers in the output stream may be a result of an insufficient air vacuum to the robotic picker types of sorting devices or improper stream management (e.g., over-burdening of the line), resulting in losses for small or irregular objects. By incorporating audit data into the sorting logic, audit results can be used to flag issues automatically (e.g., faulty vacuum lines) with less instrumentation in the facility.

Returning to FIG. 6, sorting and auditing engine 606 is configured to measure efficiency at various points or between various points in the facility. For example, sorting and auditing engine 606 is configured to obtain images of objects on a conveyor belt before and after the objects are subject to a metal removal process (e.g., by a magnetic belt) and by comparing the images, sorting and auditing engine 606 is configured to measure the efficiency of the initial metal removal. Similarly, sorting and auditing engine 606 is configured to obtain images of objects on a conveyor belt before and after the objects are subject to other kinds of initial processing such as fines, glass, and small shredded object removal (e.g., using a screen) and by comparing the images, sorting and auditing engine 606 is configured to measure the efficiency of the small object removal. In some embodiments, sorting and auditing engine 606 is configured to obtain images of objects on a conveyor belt before and after the objects are subject to a residue removal process (e.g., by an air jet array sorting device that is targeting residue) and by comparing the images, sorting and auditing engine 606 is configured to measure the efficiency of the initial residue removal.

In some embodiments, sorting and auditing engine 606 is able to leverage the multiple, networked ML vision subsystems, located throughout a facility, to perform a role identifying objects and measuring flow for sorting purposes and for quality control purposes. In some embodiments, the facility is designed to utilize networked ML vision subsystems as part of an overall facility or sorting line feedback loop. Each ML vision subsystem identifies all objects traversing the conveyance system within their field of view. By positioning such ML vision subsystems before and after sorting devices, on recirculation belts, at bunker and compactors, and at ingress points into the facility, the material flows for the entire facility may be characterized, and used to make operator-based or automatic control changes in the facility. For example, data gathered before and after a specific sorting device may be used by sorting and auding engine 606 to analyze device efficiency, and then optimize its operation. For example, an air jet array that routinely overshoots material to the wrong destination may be dynamically re-tuned to improve efficiency, with the results of any changes immediately available to the operator and to the optimization algorithms. Using optimization analysis of the real-world metrics, diverting mechanism control algorithms (including both control algorithms and physical characteristics such as valve pressure or jet angle) may be adjusted dynamically, even in an ever-changing system (e.g., with vastly different material flow parameters). By measuring ingest points (e.g., screeners and reducers) and output points (e.g., feeds into bunkers, compactors, balers), by sorting and auditing engine 606, in some embodiments may treat each sorting line as a dynamic system with known inputs and outputs, enabling faster and more comprehensive control algorithm optimization. Sorting and auditing engine 606 may also use these metrics to balance vendor feeds against contract guarantees, to optimize the cost recovery for the system. By measuring the input to each baling action, sorting and auditing engine 606 may similarly record and optimize bale contents against objective functions relating to content mix and mass.

Figure 11:
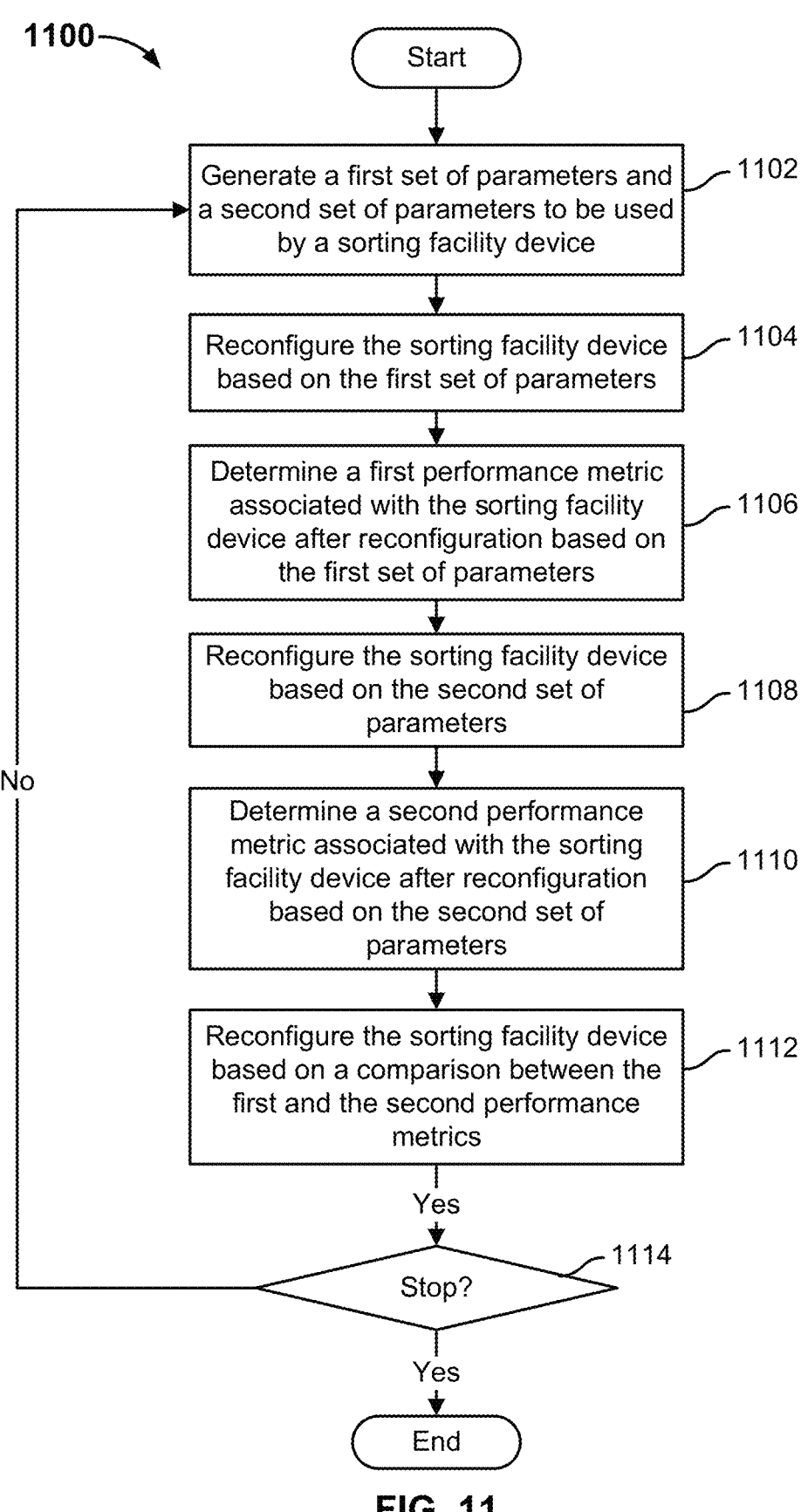
FIG. 11 is a flow diagram showing an example of a process for performing optimization with respect to a sorting facility device's configuration parameters in accordance with some embodiments.
Figure 12:
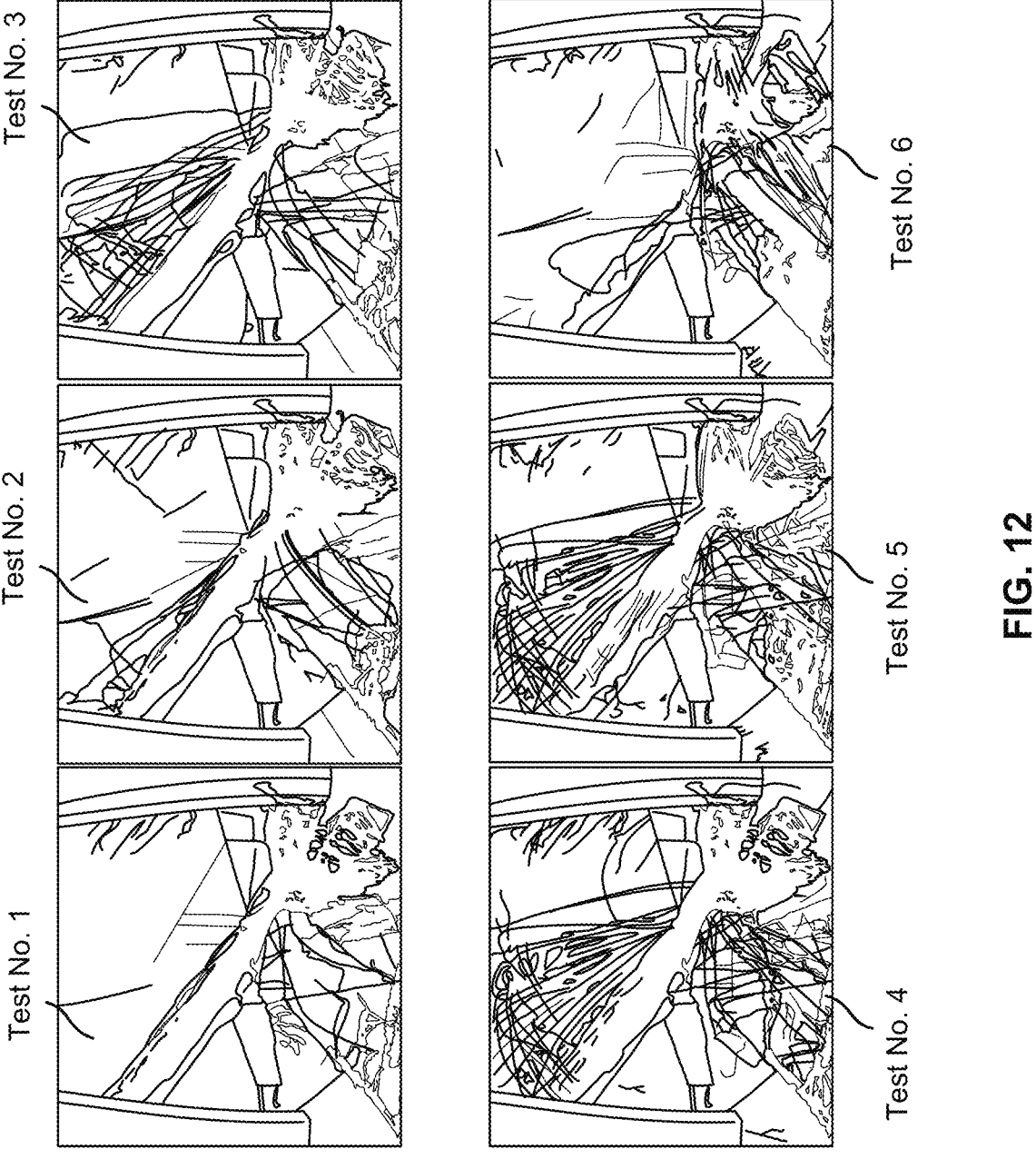
FIG. 12 is a diagram showing the respective recorded flight paths of objects that were fired on by an air jet array sorting device that was configured based on different sets of parameters.

Optimization engine 608 is configured to perform optimization analysis by testing different sets of configurations on respective sorting facility devices of a facility and evaluating the resulting sorting performance of each set of configurations on each respective sorting facility device to select a (e.g., optimal) set of configurations that the device should continue to implement. Examples of optimization that may be performed by optimization engine 608 to configurations of sorting facility devices include stochastic analysis, gradient descent optimization, and any other technique that is appropriate for determining an optimal configuration based on the control signal. The different sets of configurations for each sorting facility device are specific to that device type (e.g., an air jet array sorting device, a suction gripper actuated by a robot sorting device, a vision sensor, a conveyor device, a baler, a residue compactor, etc.) and may be manually or programmatically generated. In a specific example, different sets of configurations that are to be tested by a particular air jet array sorting device within a facility may include different combinations of target object criteria, suppression criteria, and sorting parameters (e.g., the air pressure to use to fire on a target object, the number of air valves to emit air from, the location on the target object with which to engage, etc.). Then, the air jet array's percentage of capture success and/or other sorting performance metrics over a testing period can be determined (e.g., by facility performance tracking engine 610) for each different combination of target object criteria, suppression criteria, and sorting parameters to determine the optimal set of configurations (e.g., the set of configurations that yielded the highest percentage of capture success) to be used for that particular air jet array (e.g., under the conditions such as, for example, the source of the material stream that the set of configurations were tested). FIGS. 11 and 12, below, provide additional examples of stochastic optimization at the facility.

Facility performance tracking engine 610 is configured to track the performance at each individual sorting facility device within a facility, the performance of a group of sorting facility devices within the facility, and the holistic performance of the entire facility. In some embodiments, facility performance tracking engine 610 can determine statistical performance information such as, for example, a capture success rate associated with a particular sorting device and/or a grouping of sorting facility devices from other MCS components, such as sorting and auditing engine 606. In some embodiments, facility performance tracking engine 610 can also determine statistical performance information such as, for example, the purity rate and/or mass of materials that have been deposited into a particular bunker. In some embodiments, ML vision sensors, coupled to a neural network are trained to correlate object mass or other features with each identified object type. As an example, a specific PET bottle type may be associated with a quantifiable mass range. This may be accomplished by labeling, dynamic training data, or a combination of both. Once trained, facility performance tracking engine 610 can optimize the output bale content against varying input feeds, even using specific mass measurements to guarantee and track bale quality. ML vision sensors and neural processing at the object recognition stage may be augmented with similar capabilities at the material output stage—by using images captured by one or more sensors to quantify (e.g., determine the mass of) material entering the compactor/baling stage. Facility performance tracking engine 610 is also configured to track the status (e.g., the health) of each sorting facility device and also events (e.g., detected jams, detected maintenance alerts, detected unavailability) such as those generated by other MCS components for each device.

In some embodiments, facility performance tracking engine 610 is configured to propagate an object's characterization that was determined at one location (e.g., associated with a first ML vision subsystem) within the facility to another location (e.g., associated with a first ML vision subsystem) within the facility. Examples of a characterization of the object are a material type/object type identification and/or a bounding polygon associated with the object that is determined by a first ML vision subsystem that is located at a first location within the facility. In some embodiments, facility performance tracking engine 610 is configured to predict the trajectory of the object within the sorting facility. For example, the trajectory of the object can be determined based on an estimated mass flow of materials through the sorting facility, the known speed of the conveyor belt, and/or a dynamic model. Mass flows throughout the facility are measured using any available ML vision subsystem (e.g., those directing diverting mechanism actions, QC subsystems, even calibration systems). Measurements are sent to facility performance tracking engine 610 in near real-time, and facility performance tracking engine 610 manages data structures and persistent databases to monitor the flow. Facility performance tracking engine 610 can then send the characterization and the trajectory associated with the object to a second ML vision subsystem that is located at a second location within the facility. It is also possible for the recipient/second ML vision subsystem to use a different type of sensor than the first sensor. The recipient/second ML vision subsystem can anticipate the object being detected by the second sensor at an expected time based on the characterization and the trajectory of the object. The recipient/second ML vision subsystem can also leverage the previously determined characterization of the object to more efficiently determine (e.g., sorting) an operation to be performed with respect to the object.

In some embodiments, facility performance tracking engine 610 is configured to detect jams and their specific locations within the facility. In a first example, facility performance tracking engine 610 can use detected mass flow to detect a jam (e.g., a bottleneck). In some embodiments, facility performance tracking engine 610 utilizes predicted mass flows within the facility to determine where in the facility a bottleneck or jam has occurred. Facility performance tracking engine 610 can aggregate data from multiple sensors within the facility, and can utilize any ML vision subsystem for this purpose. Facility performance tracking engine 610 can track the type of inputs being fed into the facility (using RFID or another approach to identify vendor mixes at ingest). A detected mass flow may be compared to earlier mass flow data in a session (e.g., from the same infeed/input load) or compared to historical mass flow data associated with specific areas in the facility. Based on measurements, facility performance tracking engine 610 may alert operators (e.g., via user interface 618) to anomalous flow patterns, or automatically determine that a jam has occurred at a specified location within the facility. As will be described below, in response to a detected jam, facility performance tracking engine 610 can perform corrective action at one or more locations (e.g., reverse belt flow, actuate rollers or clearing jets, etc.). Alerts may be generated based on jam determination (and may include suspected areas), or alerts may be generated when flow parameters fall outside of a target range (e.g., a range set by the operator or determined stochastically from system data). For example, in response to a detected jam, facility performance tracking engine 610 can trigger the safe shutdown of devices that are proximate to the location of the jam and/or cause the flow materials to be rerouted to different areas (e.g., sorting lines) of the facility that are not affected by the detected jam. In a second example, facility performance tracking engine 610 can use anomalous device measurements or performance information to detect a jam. For example, facility performance tracking engine 610 may monitor system components responsible for maintaining mass flow and detect jams based upon anomalous component parameters. For example, facility performance tracking engine 610 may monitor the variable frequency drives (VFDs) responsible for conveyance system motion or roller activity. Upon detecting an anomaly (e.g., power, frequency, torque, or current variation), facility performance tracking engine 610 can alert an operator (e.g., via user interface 618) or divert flows away from the misbehaving equipment. This approach may also be used for general component monitoring and scheduling of maintenance. In a third example, facility performance tracking engine 610 can receive and apply machine learning techniques to images captured by various vision sensors throughout the facility to detect the appearance of jams among the images. For example, a jam (including "stuck" objects) can be detected by analyzing successive images captured at different times from the same sensor and detecting a less than expected shift in the position/bounding box of an object across the two or more images (e.g., due to objects becoming "stuck"). Upon detection of an appearance of a jam at the location shown in images, facility performance tracking engine 610 can alert an operator (e.g., via a presentation of the jam's detected location within the facility at user interface 618) and/or trigger automatic remediation steps (e.g., reversing belts, activating air blasters or rollers, etc.), as will be described below.

In some embodiments, facility performance tracking engine 610 is configured to implement techniques similar to networking load balancing to accommodate varying input streams, varying commodity pricing, and/or utilization of devices. As mentioned above, multi-purpose bunkers may be utilized for material collection (e.g., bunkers that could be used for a variety of material types and are not specific to a material). In an example of varying commodity price-related load balancing, if the operator desires a system reconfiguration (e.g., due to changes in the input streams), the MCS (e.g., facility performance tracking engine 610 and/or reconfiguration engine 616) may re-target specific bunkers and sorting devices accordingly. As an example, a facility may be initially configured with 8 bunkers for three-dimensional materials, 4 for any desirable material, and 4 for pulp-type materials. The MCS (e.g., user interface 618) may receive an input (from an operator or a commodity price tracking third-party service) that it is desirable to utilize all 16 bunkers for a specific material type (e.g., PET) for a 6-hour period to maximize the value of the captured/sorted objects. Without requiring any physical reconfiguration, in some embodiments, reconfiguration engine 616 may change the control parameters to enable this new configuration for a specific period of time, or for a specific quantity of material (e.g., enough material to bale the output of all 16 bunkers).

After the desired time or quantity is reached, the facility may then be automatically reconfigured by reconfiguration engine 616 back to its default configuration. In response to reconfigurations such as described in the previous example, facility performance tracking engine 610 may dynamically balance the material flow within a sorting line or across sorting lines and can also vary belt speeds and infeed component settings to optimize the flow of material on the belts to support such a dynamic reconfiguration. In an example of device utilization load balancing, a series of two or more air jet array sorting devices are paired with a vision sensor that captures images of a stream of objects as they are conveyed on a conveyor device towards the two or more air jet array sorting devices. Overhead images of objects on the conveyor device can be processed by the MCS (e.g., sorting and audit engine 606 thereof) to identify target objects among those in the stream. While the two or more air jet array sorting devices in the series are configured with similar target object criteria and so perform sorting operations on redundant/similar types of objects, in some embodiments, facility performance tracking engine 610 is configured to load balance the utilization of the series of air jet array sorting devices with respect to firing on the target objects. For example, facility performance tracking engine 610 could instruct that the first air jet array sorting device of the series should fire on 50% of the identified target objects while the second air jet array sorting device of the series should fire on the other 50% of the identified target objects. By balancing the firing operation of the same set of target objects across two or more sorting devices, facility performance tracking engine 610 can balance the use of each such sorting device and potentially reduce the frequency that each such device needs to be maintained (e.g., because the probability that a device needs to be de-clogged or otherwise repaired increases the more times that it is instructed to perform sorting operations). Another benefit of balancing the firing operation of the same set of target objects across two or more sorting devices is that the downstream of such sorting devices may enjoy a higher capture success rate due to more objects already having been removed from the stream and therefore better object singulation.

Dynamic bale monitoring engine 614 is configured to monitor the characteristics and/or quantity (e.g., mass) of captured objects that are deposited into one or more bunkers and that will ultimately be transported into a baler. Dynamic bale monitoring engine 614 is able to monitor the characteristics and/or quantity of captured objects that are deposited into bunkers based on its auditing of which target objects were successfully captured and/or its usage of vision sensors to capture images of objects that are being deposited into bunkers, as described above. Given that the contents of the one or more bunkers are to be emptied onto conveyors that will convey the material into a baler for compaction and to be made into bales, dynamic bale monitoring engine 614's real-time tracking of the bunkers' content can also be used to trigger an instruction to empty one or more bunkers for the purpose of baling those bunkers' current contents. As such, dynamic bale monitoring engine 614 not only tracks the contents within bunkers at the facility but also can control the composition and other characteristics of an (output) bale that is to be generated by a baler machine.

In some embodiments, dynamic bale monitoring engine 614 is configured to utilize the combination of machine learning object recognition capabilities and dynamically controllable sorting devices to manage the purity rate of or to specify the composition of output bales. For example, the operator or dynamic pricing algorithm may attribute value to different materials differently and cause specific blends of materials to be captured by the baler system. In some embodiments, each blend of materials in a bale that may be desired is described in a "recipe" that is stored at bale recipe storage 612. For example, different types of PET materials may be combined in a bale in order to attain a specific bale mix blend. In another example, chemically compatible materials, though physically different, may be identified and grouped for baling. Thresholds may also be set to achieve, for example, less than 20% bleached paper per paper bale, or a variable percentage of material in a plastics mix. In some embodiments, dynamic bale monitoring engine 614 learns from input output measurements, and creates a catalog of high value object classifications, including chemically compatible material/object types, that can be used to manage bale mixes. Such a catalog may be stored in a local database (e.g., bale recipe storage 612) or in a cloud server and made available to multiple facilities. The catalog may be used to create dynamic recipes for bale mixtures that can be adjusted based on infeed consistency.

In some embodiments, both programmatic and graphical interfaces (e.g., at user interface 618) can be provided by dynamic bale monitoring engine 614 to modify the configuration/behavior of one or more sorting facility devices to create a variety of bale mixes. Configuration data for other types of sorting devices may vary in content, but are generally similar. The configuration data is utilized by dynamic bale monitoring engine 614 to set targets for ML vision subsystems as well as optimize sorting device (e.g., air jet) behavior for the desired type of target objects. Multiple configuration files may be created and stored within the facility or within local or remote database structures (e.g., within bale recipe storage 612). At a higher level, the operator (or a programmatic interface) may create a specification (a "recipe") for bale output at the facility or sorting line level. For example, a recipe may specify the target metrics of objects (e.g., percentage of each of one or more types of material types, target purity rate, etc.) to be included in a bale. This recipe may be mapped to economic inputs (e.g., material pricing variations) or adjusted based on vendor material in-feed to a facility. In either case, the recipe is input to dynamic bale monitoring engine 614 or stored at bale recipe storage 612, and dynamic bale monitoring engine 614 in turn selects the appropriate configuration data for ML vision and sorting devices accordingly, enables the download of the configurations across the facility, and utilizes the auditing mechanisms described herein to monitor output (e.g., captured object) quality based on the input specification recipe. Dynamic bale monitoring engine 614 is configured to determine the real-time, current metrics of sorted/captured objects that have been added to one or more bunkers. The current/actual metrics of objects that have actually been deposited into the bunker(s) are then compared with the target metrics of the recipe to determine whether the difference between the two is greater than a threshold. If the difference between the current/actual metrics of the bunker(s) and the target metrics exceeds the threshold, then at least some of the devices (e.g., sensors, processors, sorting devices) of the sorting facility can be reconfigured (e.g., by reconfiguration engine 616) to ensure that the remaining objects that are to be deposited into the bale will cause the overall actual metrics of the bale to be closer to the target metrics of the recipe.

In some embodiments, dynamic bale monitoring engine 614 may track and record the output (e.g., baling) performance of an input material source (e.g., a supplier or a group of suppliers of materials) against target metrics (e.g., objective functions for the facility, or supplier contractual agreements). In one example, dynamic bale monitoring engine 614 is configured to monitor and record the historical compositions of bales output by the facility from material loads that are supplied by each supplier. This data may be used dynamically to modify sorting behavior (e.g., to adjust sorting device configuration/behavior based on infeed loads from varying suppliers) for sorting future infeed material from the same supplier and to create reports to provide feedback to the suppliers on the quality of their supplied infeed against target metrics such as fines content, moisture content, hazardous material rates, material value, residue amount, etc. In some embodiments, a Radio Frequency Identification (RFID) tag may be assigned (e.g., attached) to each bale, and a database may be used to track the determined metrics (e.g., material type composition, purity) for each bale as well as the input supplier or suppliers. For example, a bale's RFID tag can be used to look up an entry in the database that stores that bale's determined metrics and corresponding supplier. In a facility, one or more sorting lines may be assigned by dynamic bale monitoring engine 614 to handle a truckload of specific input material, or may be configurable for multiple truckloads or portions. Based on the supplier in-feeds, dynamic bale monitoring engine 614 may track the material from input through baling, and the RFID representing each bale is associated with supplier data, time range, and data gathered in the sorting process from the feedback and auditing ML vision subsystems. In addition to providing tracking proof for material origin and destination, this approach may provide historical data for suppliers or regulators (e.g., carbon credit tracking).

Reconfiguration engine 616 is configured to dynamically reconfigure the configurations of at least some sorting facility devices at a facility in response to one or more factors as described herein. In some embodiments, reconfiguration engine 616 is configured to reconfigure configurations of at least some sorting facility devices (e.g., sorting devices' target object criteria and suppression criteria) in response to operator input (e.g., the addition or removal of a device from the facility and/or an operator submitted prioritization of material types to capture). In some embodiments, reconfiguration engine 616 is configured to reconfigure configurations of at least some sorting facility devices based on feedback data that is obtained locally at the facility. Examples of feedback data that is obtained locally at the facility include performance data by individual devices (e.g., lower than threshold capture success rates associated with devices in an area of the facility), output sorting results from the facility (e.g., the composition of output bales associated with an input material source), a detected jam, stochastic analysis from testing different sets of configurations for different device types, the current composition of captured objects at a bunker, and characterization of objects that remain in circulation through the facility (e.g., whether the characterization of remaining objects warrants a different sorting/recirculation approach). In some embodiments, reconfiguration engine 616 is configured to reconfigure configurations of at least some sorting facility devices based on feedback data that is obtained from a source that is external to the facility. Examples of feedback data that is obtained from a source that is external to the facility include output sorting results from other one or more facilities and/or a cloud-based service (e.g., a third-party service that tracks dynamic commodity prices). Reconfiguration engine 616 can perform reconfiguration of sorting facility devices in advance/anticipation of processing an input material load/stream, at any time during the process of sorting through an input material, and/or after the completion of sorting through a particular input material stream.

Summarizing this approach, reconfiguration engine 616 may utilize objective functions that incorporate constraints relevant to material economics, supplier quality levels, sorting line layout, chemistry mixes, etc. Based on the desired cost function at a specific time (e.g., a morning arrival of material form Supplier A), reconfiguration engine 616 may implement dynamically changing control parameters for each component in the sorting line (e.g., robot parameters, air jet profiles, belt speeds/directions, etc.) without requiring any physical retuning of the devices. These parameters may also be modified by reconfiguration engine 616 based on historical data obtained from one or more facilities across one or more suppliers.

User interface 618 is configured to present any of real-time monitored/tracked device-specific information, facility-wide information, and/or multi-facility information that is maintained by the MCS as described herein. For example, user interface 618 comprises a graphical interface. In some embodiments, user interface 618 comprises a display screen. In some embodiments, user interface 618 comprises an application programming interface. In some embodiments, user interface 618 is configured to receive inputs from operators that may prompt reconfiguration engine 616 to reconfigure at least some devices in the facility. Examples of such operator inputs include commodity prices, bale recipes, and the current physical layout of the facility. By way of examples, such operator inputs may include one or more of the following: commodity value weightings or purity requirements, desired bunker and sorting line configurations as described herein, sorting device configuration criteria (e.g. settings optimizing a sorter for a material type), maintenance settings (e.g., triggering manual or automatic device maintenance options such as filter changes or calibration processes), system or subsystem start/stop/restart inputs, or other inputs to control the conveyance, sorting, storage, and baling subsystems.

In some embodiments, user interface 618 provides status and controls for all aspects of the facility, including performance statistics, fault management, individual device controls, as well as synchronized control macros, for example. User interface 618 dynamically adapts based on installed devices and systems, as well as operator-defined objectives. For example, in the event an operator desires a high purity PET output, user interface 618 may present metrics and controls relevant to this objective function in a way that easily enables "glanceable" assessment and control of one or more facilities. In some embodiments, the MCS provides a group of synchronized controls (a macro) for multi-systems operations. For example, in the event of a blockage or failure, the MCS may need to pause operations, including a specifically timed or feedback-based ordering of control actions. If a blockage occurred at a bunker intake, the MCS may first need to stop infeed activities (e.g., slow or stop VFDs controlling infeed flow rate), and progressively stop conveyance mechanisms throughout the plant. Alternatively, an immediate total shutdown may occur (for example with respect to a safety issue), requiring a later restart control sequence that takes into account the overall state of the facility at the time of shutdown (e.g., baler and bunker inflows may be restarted first, prior to conveyances at the front end (infeed) of the facility). In some embodiments, the MCS incorporates configurable control logic enabling an operator to specify coordinated control actions across all or portions of the facility. Coordinated control tasks (e.g., macros) may be created by an operator or developer, and implemented as automatic tasks within the system that can be triggered by user interface 618, programmatically, based on events, or time-based (scheduled). For example, a "nightly shutdown" macro may be created to cause a schedule-based, orderly shutdown of the facility. Similarly, a "morning startup" macro or "software upgrade downtime" macro may be created that is run based on user interface 618 operator input.

In some embodiments, user interface 618 enables operators to view and manage device configurations. In some embodiments, the MCS provides user interface 618 that provides relevant state information for each device in a facility or across multiple facilities. State information can include any parameter of the device, and is typically customized for the specific needs of that device. For example, the state of a vacuum-based robotic picker sorting device may include parameters such as pick rate, machine velocity over time, vacuum pressure traces, pick success and failure rates, etc. Each of these parameters may be available to the operator through user interface 618, and/or the critical states for any parameter may be flagged or sent as alerts to the operator. From an operator console (e.g., PC, tablet, smartphone, etc.), an operator may initiate remediation actions for any addressable parameters in a device. By way of example, an operator may see a trouble state in user interface 618 and temporarily take a robotic manipulator out of service through a selection at user interface 618 in order to initiate service actions (e.g., automatic filter changes or manual lubrication). In some embodiments, an operator or a computer program may analyze performance data for a device in real-time, and based on performance metrics cause a recalibration of one or more devices. For example, an air jet array may be flagged with a high-miss rate (lack of captures). Through or in conjunction with the MCS, an ML vision software program or operator may analyze the live video feed with strobe LEDs and cause a reconfiguration of jets in order to address the issue.

FIG. 7 is a flow diagram showing an embodiment of a process for dynamically reconfiguring devices at a sorting facility in response to feedback data that is collected from the devices. In some embodiments, process 700 may be implemented at an MCS such as the example MCS described in FIG. 6.

At 702, physical layout information that describes corresponding positions of a plurality of sorting facility devices within a sorting facility is stored. As described herein, a sorting facility includes a collection of devices that are configured to work in concert to efficiently process an input material stream and capture target objects from the material stream and into bunkers. Examples of the sorting facility devices include input machinery devices (e.g., screeners, reducers, distribution devices, magnets), sensor devices, conveyor devices, sorting devices, bunkers, balers, and residue compactors. Examples of the physical layout information include the location (e.g., in coordinates) of each sorting facility device within a building associated with the sorting facility, the sorting line to which the device belonged, and the position of the device in relation to other devices within the facility (e.g., the sequence of the device(s) that are upstream from a device in question and also the sequence of the device(s) that are downstream from the device in question). The physical layout information of the sorting facility devices could have been input by an operator via a user interface or submitted via configuration files. As new devices are added, existing devices are removed (e.g., for maintenance), or the physical locations of devices are updated within the facility, the physical layout information is correspondingly updated to identify the current/updated location of each device.

At 704, feedback data is collected from the plurality of sorting facility devices. As the sorting facility devices process an input material stream, feedback data related to the sorting performance, the sorting output, and device health, for example, are programmatically monitored. An example of feedback data related to sorting performance includes the capture success rate of sorting devices. Examples of feedback data related to sorting output include the material composition, mass, recovery rates, and purity rates of generated bales of captured objects. Examples of feedback data related to device health are detections of clogging of a sorting device, detections of jams at certain areas within the facility, and device signals (e.g., detected using programmatic logic controller (PLC) integrations) that deviate from a desired reference (e.g., out of a standard deviation signal from devices such as, for example, robots, camera data, and motors). Additional feedback data that is collected may be input by an operator via a user interface and where the operator inputs correspond to updated sorting targets (e.g., an updated prioritization of material types to capture and/or an updated market value of a certain commodity).

At 706, at least a subset of the plurality of sorting facility devices is identified to reconfigure based at least in part on the collected feedback data and respective positions of the subset of the plurality of sorting facility devices. Generally, the feedback data is evaluated to determine whether one or more sorting facility devices are underperforming and if so, to perform reconfiguration on that basis as well as to, optionally, send an alert (e.g., to a user interface that is presented to an operator). In response to the feedback data, at least some of the sorting facility devices are reconfigured (e.g., their configurations and the criteria that they use are modified) such that their subsequent behavior is adjusted. In various embodiments, reconfiguring the sorting facility devices' subsequent behavior involves triggering an optimization process to select an optimal subsequent configuration and/or to switch to a pre-programmed configuration (e.g., sort less of one type of object, and/or turning off a set of sorting devices). In a first example, the feedback data can be compared to reconfiguration criteria (e.g., target metrics such as bale recipes, target air pressure used by an air-based sorting device, etc.) to determine whether there is a deviation beyond a threshold amount from a reference value (e.g., does the feedback data deviate more than a standard deviation from an average value), and then if so, at least some of the devices that are relevant to the feedback data can be reconfigured. Specific examples of feedback data that might trigger reconfiguration include a drop in the recovery rate at the facility, a drop in the purity rate at the facility, and a drop in a device signal (e.g., from an air-based sorting device, a robot, a camera, or a motor) that deviates beyond a threshold amount. In a second example, the feedback data can be compared to historical feedback data of a similar type to determine which set of feedback data indicates better performance and then, if appropriate, at least some of the devices that are relevant to the feedback data can be reconfigured to the parameters associated with the more desirable set of feedback. The reconfiguration of devices can be performed based on stored rules or optimization techniques (e.g., that prescribe conditions/criteria for when reconfiguration is to be performed, when alerts are to be sent to a user interface, and/or how reconfiguration is to be performed). The reconfiguration of devices can be performed during the course of processing a particular input material stream or in anticipation of processing a subsequent, similar input material stream. For example, input material streams from the same source (e.g., supplier or material collection route) can be considered to be similar. Various examples of dynamic reconfiguration within a sorting facility are described further below.

Overall, process 700 describes a sorting facility that is intelligent by virtue of being able to dynamically self-correct/self-heal to remediate detected anomalies such as, for example, maintenance or performance issues, during the course of processing an input material stream. Furthermore, the intelligent sorting facility is also self-optimizing by being able to dynamically load balance among devices and/or retune configuration parameters/criteria to ensure that target performance metrics are to be met during the process of sorting through the input material stream. Lastly, the intelligent facility can use the feedback data obtained from sorting a historical input material stream to configure its devices in anticipation of sorting through a new similar, input material stream. All of the dynamic reconfiguration of the sorting facility can occur without requiring any manual or physical change to the facility's processing layout.

Figure 8:
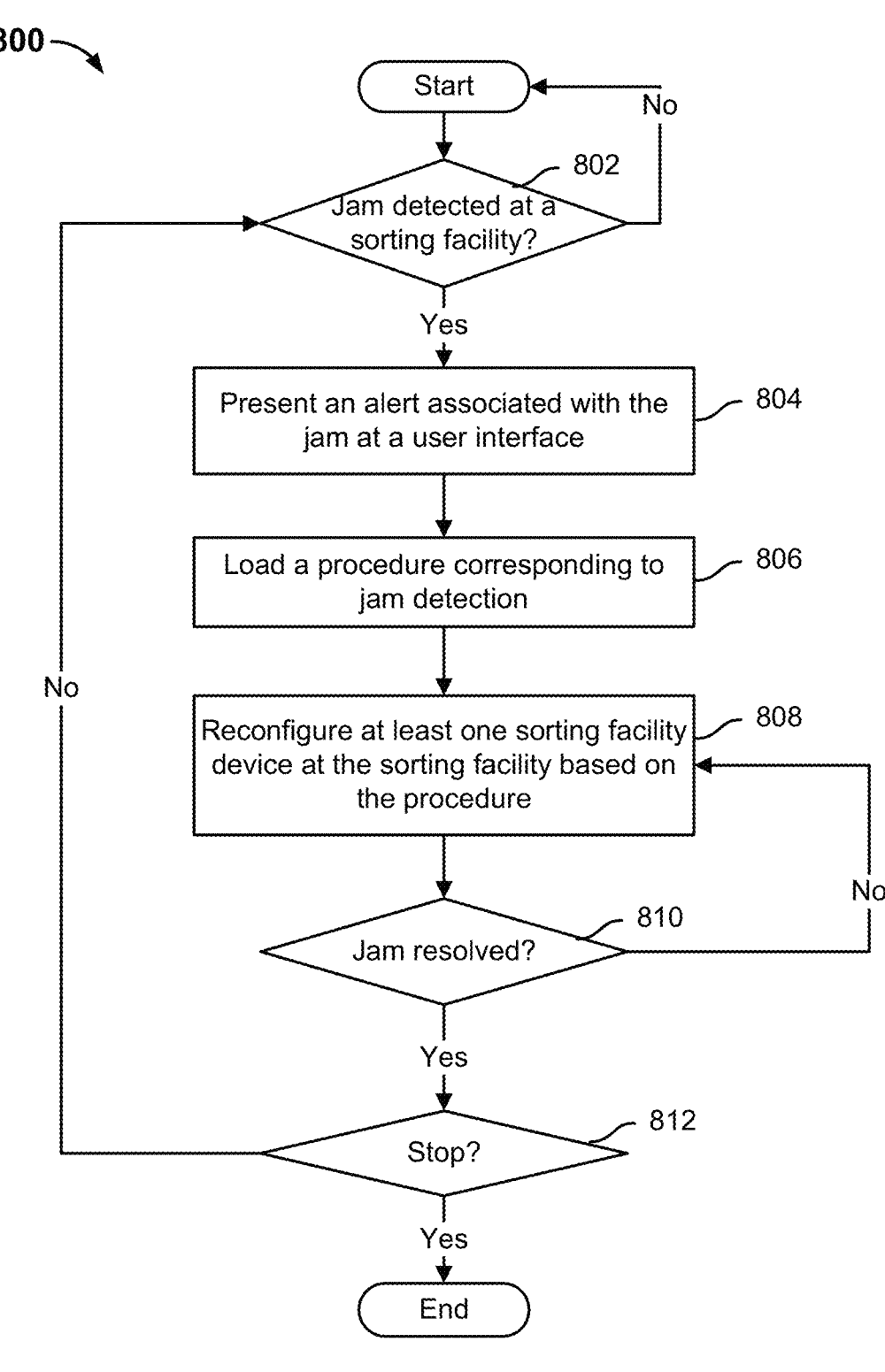
FIG. 8 is a flow diagram showing an example of a process for dynamically reconfiguring devices at a sorting facility in response to a detected jam in accordance with some embodiments.

FIG. 8 is a flow diagram showing an example of a process for dynamically reconfiguring devices at a sorting facility in response to a detected jam in accordance with some embodiments. In some embodiments, process 800 may be implemented at an MCS such as the example MCS described in FIG. 6. In some embodiments, steps 704 and 706 of process 700 of FIG. 7 may be implemented using process 800.

Figure 9:
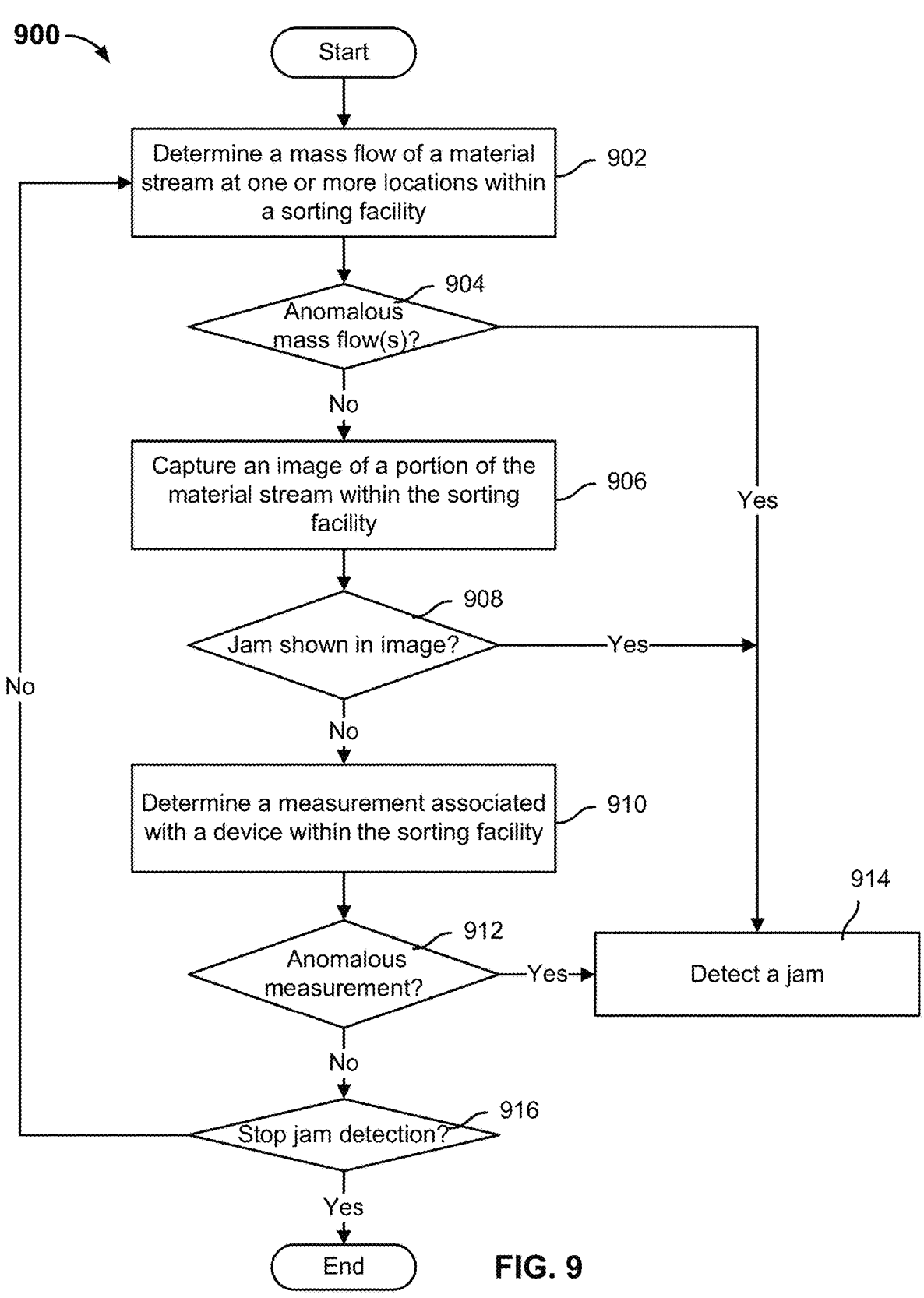
FIG. 9 is a flow diagram showing an example of a process for detecting jams at a sorting facility in accordance with some embodiments.

At 802, it is determined whether a jam is detected at a sorting facility. In the event that a jam is detected at the sorting facility, control is transferred to 804. Otherwise, in the event that a jam is not detected at the sorting facility, process 800 starts again. In some embodiments, a jam (or blockage) at the sorting facility may occur when the flow of materials through the facility via conveyor devices becomes obstructed. For example, a jam can occur when objects are not sufficiently spread out over a conveyor belt and the pile of objects restricts the conveyance/movement of objects through the facility near or at the expected speed (e.g., the configured speed of the conveyor device). Jams or blockages of materials are undesirable because they could slow down the movement of materials along conveyor devices, which could cause more unsuccessful sorting operations due to the expected timing of the target objects reaching a sorting device's target region being offset from the actual timing. Worse, jams or blockages could virtually halt the flow of materials altogether, which would significantly interfere with the capture of target materials at the facility. FIG. 9 describes various example techniques in which a jam can be detected at a sorting facility.

Returning to FIG. 8, at 804, an alert associated with the jam is presented. A jam and the corresponding location/area at which the jam was detected within the facility is presented at a user interface to inform a facility operator.

At 806, a procedure corresponding to jam detection is loaded. In some embodiments, procedures, which describe a series of reconfiguration actions to be performed in the event of different detected facility events such as jams, are stored. In some embodiments, the jam removal/remediation procedure can be programmatically determined through stochastic analysis. For example, the procedure is implemented as computer instructions. In response to the detected jam, the corresponding procedure is retrieved/loaded from storage (e.g., memory) and then programmatically implemented by a processor.

At 808, at least one sorting facility device at the sorting facility is reconfigured based on the procedure. To implement the procedure includes to reconfigure at least one sorting facility device that is affected by the detected jam, including those devices that are upstream or downstream (e.g., within the sorting line) relative to the location of the jam. In a first example type of reconfiguration, a sorting device (e.g., an air jet array) or a jam removal device (e.g., an air jet array or a pushing mechanism) near the detected jam can be reconfigured to direct force (e.g., via airflow or a physical mechanism) on the jam to loosen the pile of objects. In a second example type of reconfiguration, a conveyor device on which the jam is detected can be reconfigured to employ an adjusted belt speed (e.g., a faster speed) to remediate the jam. In a third example type of reconfiguration, a conveyor device upstream to where the jam is detected can be reconfigured to direct the flow of materials away from the location of the jam so as to ensure that the upstream materials do not also become jammed.

At 810, it is determined whether the detected jam is resolved. In the event that the detected jam is resolved, control is transferred to 812. Otherwise, in the event that the detected jam is not resolved, control is returned to 808. In some embodiments, whether the jam is resolved can be determined using at least some of the same techniques for detecting the jam—only that if the techniques can longer detect the jam, then it can be inferred that the jam has been remediated (e.g., is no longer present). In some embodiments, after the jam becomes resolved, the procedure can stop being implemented and the reconfigured devices for the purpose of jam remediation can be reconfigured back to their previous configurations to resume sorting as usual. In some embodiments, the efficacy of a given jam remediation procedure is evaluated and may be used to improve the jam remediation procedure (e.g., to modify the actions taken).

At 812, it is determined whether jams are continued to be detected and remediated. In the event that jams at the sorting facility are continued to be detected and remediated, process 800 starts again. Otherwise, in the event that jams at the sorting facility are no longer to be detected, process 800 ends.

FIG. 9 is a flow diagram showing an example of a process for detecting jams at a sorting facility in accordance with some embodiments. In some embodiments, process 900 may be implemented at an MCS such as the example MCS described in FIG. 6. In some embodiments, step 802 of process 800 of FIG. 8 may be implemented using process 900.

At 902, a mass flow of a material stream at one or more locations within a sorting facility is determined. In some embodiments, the flow rate (mass/time) of a material stream ("mass flow") can be determined based on detections made by a machine learning model on data captured by sensors and/or scales located throughout the facility. In some embodiments, the flow rate can be estimated based on object data in which objects and their type and area that are identified within captured image data are counted. Then, area-adjusted mass coefficients prescribed to each object type are used to determine the estimated mass of the counted objects. For example, the area-adjusted mass coefficients are data points that are collected and iterated on through other means, such as tracking the impact of object count/type/area on the weight of a bunker as it goes into that bunker at one or more sorting facilities. In some embodiments, a flow rate can be determined or be refined by using radar/NIR/x-ray data on material density, depth data for better volumetric estimation, further refined data sources on the relationship between a material type and its mass, and modulating the mass estimation against secondary material properties (such as if the item contains a liquid or exterior contamination, or the item's moisture content in the case of fiber).

At 904, it is determined whether a determined mass flow is anomalous. In the event that a determined mass flow is anomalous, control is transferred to 914. Otherwise, in the event that none of the determined mass flow(s) are anomalous, control is transferred to 906. The detected mass flow at each location within the facility may be compared to earlier mass flow data in a session (e.g., from the same input load) or compared to historical mass flow data associated with those same locations in the facility. If a determined mass flow corresponding to a specific location deviates beyond a tolerance amount from the reference mass flow associated with that location, then the mass flow corresponding to that location is determined to be anomalous and a jam is detected at the location associated with that determined mass flow. The mass flow associated with zero or more locations within the facility can be determined to be anomalous.

At 906, an image of a portion of the material stream within the sorting facility is captured. For example, the images captured by multiple vision sensors located at different locations within the facility can be (e.g., periodically) obtained and scanned using machine learning techniques to detect the appearance of stuck objects.

At 908, it is determined whether the image shows a jam. In the event that the image shows a jam, control is transferred to 914. Otherwise, in the event that the image does not show a jam, control is transferred to 910. As mentioned above, for example, successive images captured at different times by the same sensor can be analyzed and if less than an expected shift in the position/bounding box of an object is detected across the two or more images, then a jam is detected at the location associated with that sensor.

At 910, a measurement associated with a device within the sorting facility is determined. In some embodiments, measurements associated with a device's components (e.g., power, frequency, torque, or current variation) are (e.g., periodically) obtained to determine whether the measurements are anomalous. For example, the motor related variable frequency drives (VFDs) responsible for conveyance system motion or roller activity of one or more conveyor devices can be measured and then compared to a threshold value.

At 912, it is determined whether the measurement is anomalous. In the event that the measurement is anomalous, control is transferred to 914. Otherwise, in the event that the measurement is not anomalous, control is transferred to 916. The determined device-related measurements are compared to thresholds and if the determined measurements are beyond a tolerance amount from the threshold, then a jam is detected at a location associated with the device from which the measurement was derived. For example, if the measured VFD of a conveyor device is slower than a threshold, then it is inferred that the conveyor device is working harder to convey a larger amount of an object, which is indicative of a jam.

At 914, a jam is detected. As described above, each jam is detected with a corresponding location within the facility.

At 916, it is determined whether jams are continued to be detected. In the event that jams at the sorting facility are continued to be detected, control is returned to 902. Otherwise, in the event that jams at the sorting facility are no longer to be detected, process 900 ends.

Figure 10:
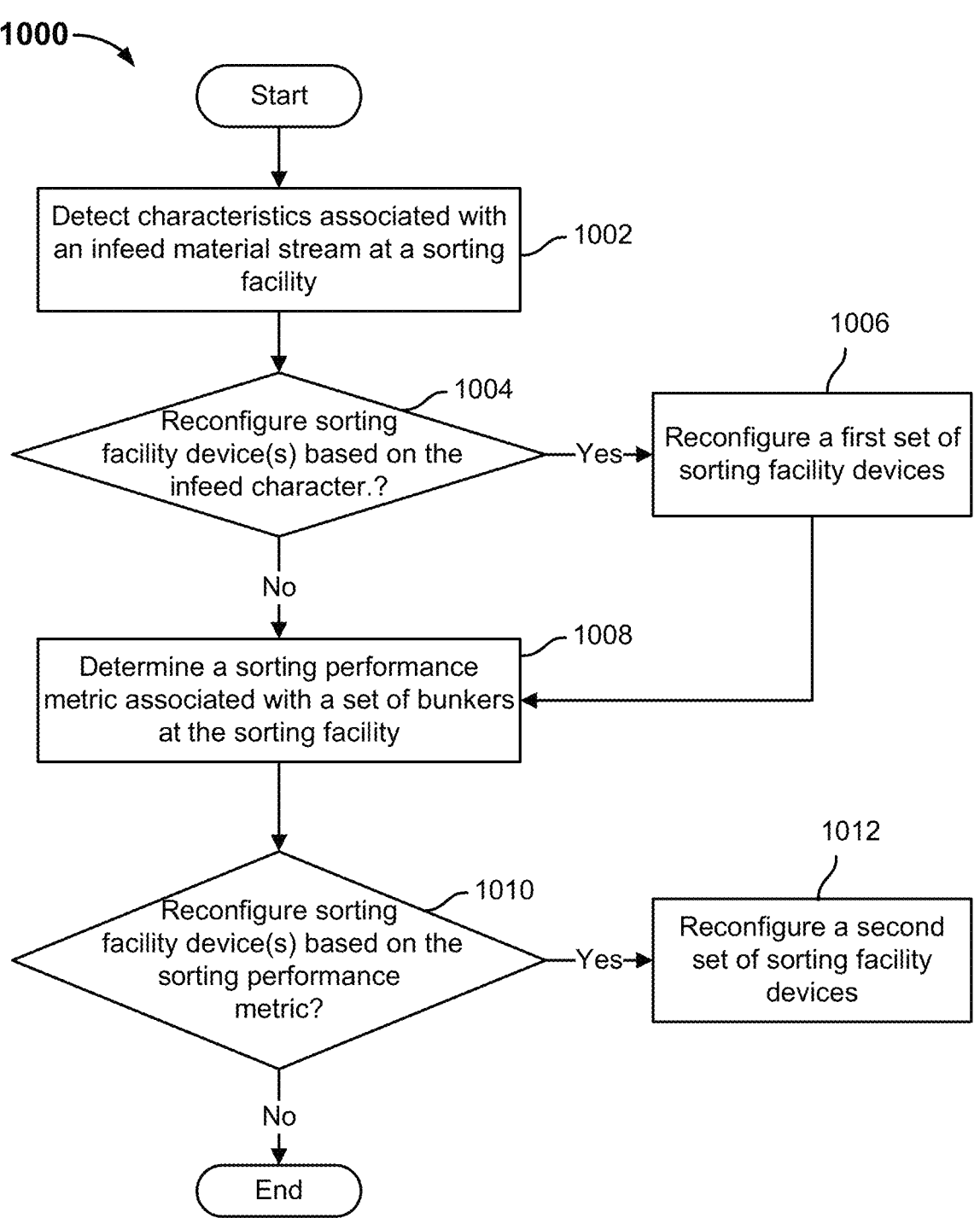
FIG. 10 is a flow diagram showing an example of a process for reconfiguring sorting facility devices based on infeed material characteristics and sorting performance metrics in accordance with some embodiments.

FIG. 10 is a flow diagram showing an example of a process for reconfiguring sorting facility devices based on infeed material characteristics and sorting performance metrics in accordance with some embodiments. In some embodiments, process 1000 may be implemented at an MCS such as the example MCS described in FIG. 6. In some embodiments, steps 704 and 706 of FIG. 7 may be implemented using process 1000.

At 1002, characteristics associated with an infeed material stream at a sorting facility is detected. In some embodiments, objects that are deposited at the input location of materials into the facility are sometimes referred to as "infeed" or "input" material. Such infeed objects are "seen" by using vision sensors located near the input to capture images of the input materials and using a corresponding processor (e.g., which is part of or in communication with the local MCS) to apply machine learning to identify the attributes of the objects seen within the images. These determined object attributes can be used to determine characteristics about the infeed material stream such as, for example, the material types. The "seen" amount of material types in the infeed may be used to approximate the proportions of material types that make up the infeed material stream and this material type distribution can be used to reconfigure the (e.g., target object criteria of) downstream sorting facility devices to optimize the capture of target objects within the stream.

In one example, the characteristics of the material stream can be determined after infeed materials (e.g., from a particular source) are initially sorted by the input machinery of the facility to positively remove unwanted material from the stream. For example, input machinery for performing initial sorting includes: screeners for filtering small particles (e.g., broken glass, dirt, small rocks, etc.), a magnetic removal element for removing or diverting larger metallic items from the line, or a waterfall sorter (in conjunction with air jets) for removing the undesirable materials prior to subsequent sorting on the line. In some embodiments, after the initial sorting phase, subsequent sorting facility devices are utilized to capture images of the remaining material stream and the MCS is configured to analyze the images to detect the objects within. Such object detection can be used to characterize the infeed material. After the initial sorting phase, one or more distribution devices are configured to distribute the objects across one or more conveyance devices (e.g., associated with one or more sorting lines). Air jet array sorting devices or other diverting mechanisms may be used to distribute the materials across a moving platform (e.g., conveyor belt).

At 1004, it is determined whether sorting facility device(s) are to be reconfigured based on the characteristics associated with the infeed material stream. In the event that sorting facility device(s) are to be reconfigured based on the characteristics associated with the infeed material stream, control is transferred to 1006. Otherwise, in the event that sorting facility device(s) are not to be reconfigured based on the characteristics associated with the infeed material stream, control is transferred to 1008. For example, in each sorting line, an ML vision subsystem coupled with one or more sorting devices may target objects of different material types, with physically co-located air jet arrays or robotic elements targeting different materials, shunting the target objects along different target paths. In this way, multiple material streams may be sorted within each of the same fundamental sorting line, even using the same conveyance system. In some embodiments, ML vision subsystems can be arrayed across or along a line, each one providing sorting instructions for one or more material types, and one or more sorting devices. A sorting device may receive instructions generated by one or more ML vision subsystems, and the MCS may coordinate such interaction and trigger reconfiguration of any components thereof to ensure optimal usage of all components to achieve maximum performance.

To determine whether reconfiguration should be triggered based on infeed characteristics, in some embodiments, optimal or otherwise appropriate device configurations (e.g., as determined through stochastic optimization) for the determined characteristics associated with an infeed material stream can be obtained and compared to the current configurations of the devices in the facility. If the determined appropriate device configurations differ from the current configurations, then the devices whose current configurations differ from the determined appropriate device configurations are reconfigured to match the former.

At 1006, a first set of sorting facility devices is reconfigured. In a first example, ML vision subsystem A may focus on sorting material type 1 (e.g., identifying objects of material type 1 within captured images), while ML vision subsystem B may focus on material type 2. In the event that an upstream ML vision subsystem C alerts the MCS as to an incoming influx of material type 3, the MCS may instruct downstream subsystems A and B to both additionally target material type 3, and adjust "deposit" or placement parameters to ensure that such material is shunted to the proper target conveyors or target bunkers. In a second example, a priority is assigned to each material type that is detected within the infeed material. Then the number of ML vision subsystems and corresponding sorting device(s) of the facility that are reconfigured to target each material type is determined based on each material type's respective priority. For example, if material type X that is detected within the infeed material is assigned a greater priority than material type Y that is also detected within the infeed material, then a greater number of ML vision subsystems and corresponding sorting device(s) at the facilities can be reconfigured/assigned to target objects of material type X than the number of ML vision subsystems and corresponding sorting device(s) at the facilities that will be reconfigured/assigned to target objects of material type Y. In this way, by monitoring characteristics of infeed material, the MCS can configure at least the sorting (e.g., targeting and depositing) behavior of downstream sorting devices to optimize the sorting performance of the overall facility.

At 1008, a sorting performance metric associated with a set of bunkers at the sorting facility is determined. In some embodiments, downstream ML vision subsystems can be used to audit the sorting performance metrics of upstream sorting devices and provide feedback that may be used to reconfigure upstream sorting devices and ML vision subsystems to improve upon overall input/output characteristics for the system. A first example of a sorting performance metric is the capture success rate of performed sorting operations. As mentioned above, a capture success rate of a sorting device can be determined from images captured by vision sensors mid-operation and/or just downstream of the operations. A second example of a sorting performance metric is the material purity rate or current material composition of objects captured into bunkers. Also, as mentioned above, the material purity rate or current material composition of objects captured into bunkers can be determined from sorting operations that were determined to be successful and their targeted material types and/or images captured by vision sensors of objects being conveyed to or deposited into bunkers.

At 1010, it is determined whether sorting facility device(s) are to be reconfigured based on the sorting performance metric associated with the set of bunkers. In the event that sorting facility device(s) are to be reconfigured based on the sorting performance metric associated with the set of bunkers, control is transferred to 1012. Otherwise, in the event that sorting facility device(s) are not to be reconfigured based on the sorting performance metric associated with the set of bunkers, process 1000 ends. To determine whether reconfiguration should be triggered based on the sorting performance metric, in some embodiments, a target performance metric is compared to the determined sorting performance metric and if the determined sorting performance metric differed from the target performance metric beyond a tolerance amount, then at least some sorting facility devices that are upstream to a location in the facility associated with the determined sorting performance metric are reconfigured.

At 1012, a second set of sorting facility devices is reconfigured. For example, to improve the example sorting performance metric of a sorting device's capture success rate of performed sorting operations, the sorting parameters, which dictate the manner (e.g., the force, the location on the object to target, the number of diverting mechanisms to activate) can be reconfigured/updated to different values. In another example, to improve the example sorting performance metric of the purity rate of captured objects at a bunker, the suppression criteria (which dictates how much risk of inadvertently capturing a non-target object a sorting device should take) to be used by upstream sorting devices that capture target objects into the bunker can be made more stringent so that they are more careful to avoid firing on target objects that could also lead to the capture of non-target objects.

In some embodiments, in addition to the infeed material stream characteristics and sorting performance metrics as described in process 1000, another metric determined by ML vision subsystems throughout the facility that can prompt reconfiguration of devices at the facility is the mass flow of objects moving through the facility. Put another way, the mass flow measurements throughout the facility are utilized as feedback mechanisms to enable the MCS to dynamically alter the behavior of the facility. Here, the MCS dynamically tracks mass flows and compares them to desired mass flow norms. The desired normative behavior may be decided a priori, be modeled using a simulation mechanism, or may be created iteratively as a result of multiple runs of material through a facility, for example. Additionally, a more comprehensive model may be created by aggregating data from multiple sorting facilities using similar sorting systems. In another example, the cloud/central MCS provides target and historical metrics to each facility based on the aggregate data. During its monitoring of the mass flows at a facility, the MCS may encounter deviations, and adjust upstream device parameters accordingly. For example, with a known input mix to the facility from a particular supplier, the normative value for the desired material mass might be 6 tons per hour, where the norm was determined over months of facility operation. If the MCS monitoring shows that under the current operation, the bunker accumulation is well below this value, an operator may be notified and/or the MCS may adjust sorting parameters, belt speeds, etc. to achieve an increased value in mass flow.

In some embodiments, yet another metric that can prompt reconfiguration of devices at the facility is the updated market value of a commodity/material type. For example, updated commodity pricing information may be received (at any time) at the MCS via an operator input or from using an API to query a third-party commodity value service. In the event that the price of a particular commodity/material type has increased or decreased, the sorting devices throughout the facility can be reconfigured to prioritize/target material types whose current market values are highest.

FIG. 11 is a flow diagram showing an example of a process for performing optimization with respect to a sorting facility device's configuration parameters in accordance with some embodiments. In some embodiments, process 1100 may be implemented at an MCS such as the example MCS described in FIG. 6. In some embodiments, steps 704 and 706 of FIG. 7 may be implemented using process 1100.

In some embodiments, an optimization process such as process 1100 can be triggered with respect to a sorting facility device in response to a determination to reconfigure the sorting facility device (e.g., when reconfiguration is prompted by feedback data). In some embodiments, an optimization process such as process 1100 can be triggered with respect to a sorting facility device periodically.

At 1102, a first set of parameters and a second set of parameters to be used by a sorting facility device are generated. In some embodiments, at least two different sets of parameters for configuring the behavior of a sorting facility device are generated using a stochastic process. The parameters that are generated are specific to the device's type. In a first example, the parameters for a sorting device such as an air jet array include target object criteria, suppression criteria, and sorting parameters (e.g., which valve/air pressure to use, which angles to use for each air jet in the array, and the number of air jets that should be activated to emit airflow) for performing a sorting operation. In a second example, a parameter for a conveyor device is a belt speed. In a third example, a parameter for a baler system is the force with which to compress the contents within the baler.

At 1104, the sorting facility device is reconfigured based on the first set of parameters. The sorting facility device is configured with the first set of parameters.

At 1106, a first performance metric associated with the sorting facility device is determined after reconfiguration based on the first set of parameters. After the sorting facility device is configured with the first set of parameters, a performance metric associated with the device is determined over a given period of time (e.g., a predetermined testing window). The performance metric is a measure of the efficacy of a set of parameters and different performance metrics can be determined for different types of sorting facility devices. One example of a performance metric for a sorting device is its capture success rate as audited using ML vision subsystems as described above. Another example of a performance metric for a sorting device is the purity rate of the captured materials at a bunker as audited using ML vision subsystems as described above. A specific example of a performance metric for an air jet array sorting device is the collective trajectories/flight paths of target objects after they were fired on by the sorting device. FIG. 12 shows example monitored flight paths of target objects after they were fired on by an air jet array sorting given different sorting parameters.

Returning to FIG. 11, at 1108, the sorting facility device is reconfigured based on the second set of parameters. As mentioned above, the second set of parameters is different from the first set of parameters.

At 1110, a second performance metric associated with the sorting facility device is determined after reconfiguration based on the second set of parameters. The same type of performance metric associated with the device that was determined at step 1106 is determined at 1110 over another given period of time.

At 1112, the sorting facility is reconfigured based on a comparison between the first and second performance metrics. The respective performance metrics resulting from the first and the second sets of parameters are compared and the set of parameters corresponding to the better performance metric (e.g., the higher capture success rate or the higher purity rate) is used to reconfigure the device (e.g., until the conditions at which the parameters were tested change or another update criterion is met).

While example process 1100 describes stochastically generating only two sets of parameters to test on the device, in practice, any number of sets of parameters can be stochastically generated and then tested on the device. Then, the set of parameters that resulted in the best performance metric is selected as the optimal set of parameters to be utilized by the device (e.g., for a given set of conditions such as a particular supplier's input material streams).

At 1114, it is determined whether additional sets of parameters are to be tested for the sorting facility device. In the event that additional sets of parameters are to be tested for the sorting facility device, control is returned to 1102. Otherwise, in the event additional sets of parameters are not to be tested for the sorting facility device, process 1100 ends.

FIG. 12 is a diagram showing the respective recorded flight paths of objects that were fired on by an air jet array sorting device that was configured based on different sets of parameters. Specifically, FIG. 12 shows the recorded flight paths corresponding to six different test sets of air jet array sorting device parameters, which are referred to as Test No.

1, Test No. 2, Test No. 3, Test No. 4, Test No. 5, and Test No. 6. Each object's flight path (trajectory) after they fell off one end of a conveyor device and were fired on with pressurized airflow emitted by the air jet array sorting device is represented by a respective line in FIG. 12. For example, the set different sets of air jet array sorting device parameters may vary on one or more of the following: the amount of air pressure emitted by the air jets, the length of time of firing on an object, the number of air jets to use to fire on an object) and suppression parameters (e.g., conditions under which firing on a target object should be suppressed given the proximity of a non-target object). The collection of recorded flight paths corresponding to each test set of parameters represents that set of parameters' performance metrics in this particular example. In the example of FIG. 12, the performance metric of the fired upon objects' flight paths resulting from each set of parameters is evaluated by how precise and how dense the set of flight paths are. Put another way, the set of parameters that results in the most precise and dense flight paths, which most closely forms a beam-like presentation, is associated with the best performance metric. In the example of FIG. 12, the set of parameters associated with Test No. 1 had the recorded set of object flight paths with the best performance metric because the flight paths were the most precise and closest together as compared to the flight paths of the other sets of parameters. As such, based on this example evaluation, the air jet array sorting device is to be reconfigured with the set of parameters associated with Test No. 1 to optimize its performance.

Figure 13:
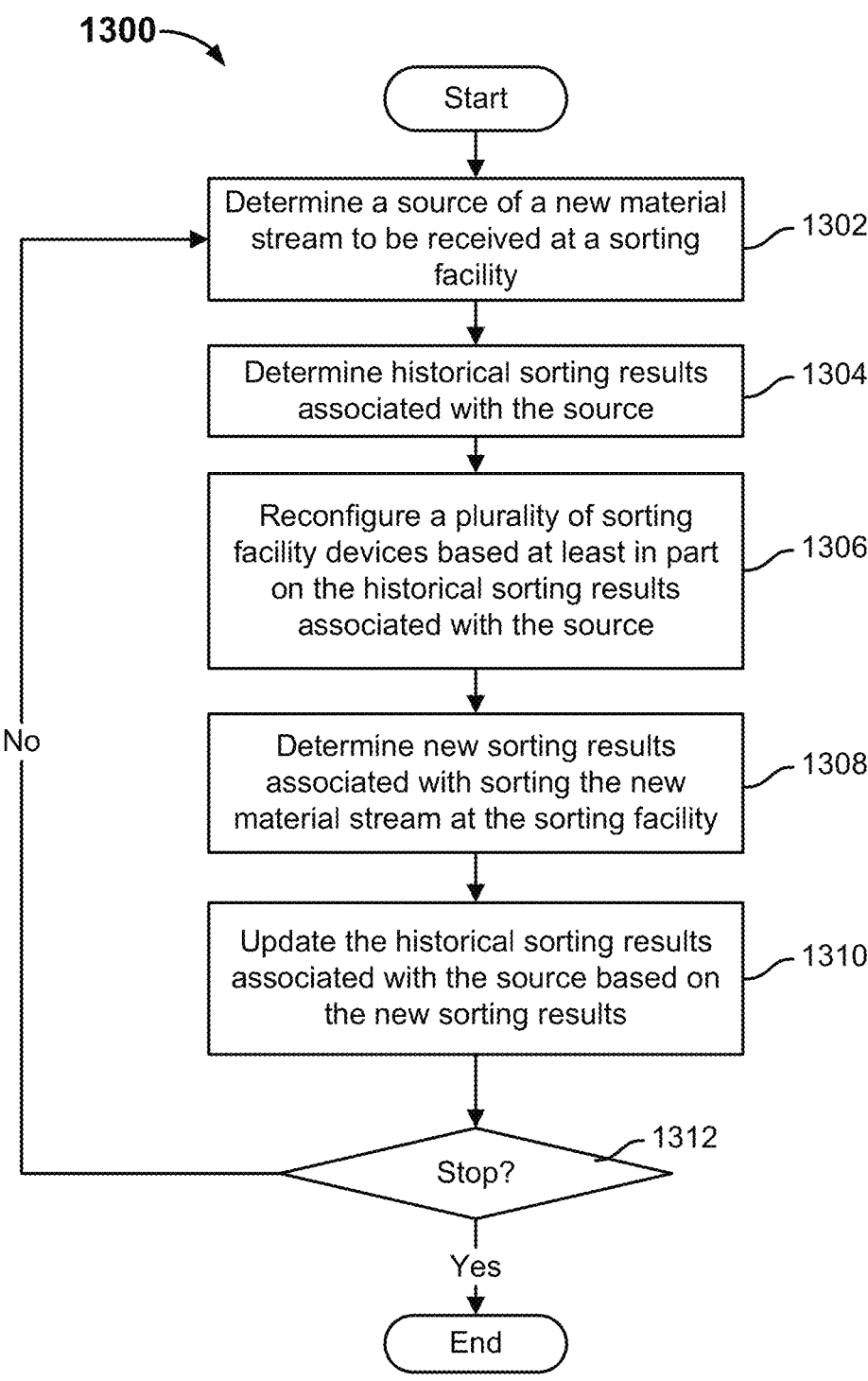
FIG. 13 is a flow diagram showing an example process for reconfiguring sorting facility devices in response to a determined source of a new material stream to be processed at a sorting facility.

FIG. 13 is a flow diagram showing an example process for reconfiguring sorting facility devices in response to a determined source of a new material stream to be processed at a sorting facility. In some embodiments, process 1300 may be implemented at an MCS such as the example MCS described in FIG. 6. In some embodiments, steps 704 and 706 of FIG. 7 may be implemented using process 1300.

At 1302, a source of a new material stream to be received at a sorting facility is determined. For example, the "source" of a new material stream (or "infeed") may refer to the supplier/vendor of the material, a particular route from which the material was collected (e.g., in a waste collection and sorting context), or a vehicle on which the material was transported to the sorting facility. For example, the "new material stream" may refer to a new load, shipment, or other physical grouping of raw materials that are to be sorted. In some embodiments, the source of the new material stream can be determined from an expected (e.g., scheduled) time at which a material stream is expected to be received at the facility from a particular source, an operator input, and/or a scan of identifying information on the vehicle that had transported the materials.

At 1304, historical sorting results associated with the source are determined. In some embodiments, the "historical sorting results" associated with a source comprise the output (e.g., baling) performance of sorting previous material streams from that same source. For example, the output performance of sorting previous material streams includes the breakdown of material compositions, the purity rate, and the mass of each material type that was determined from bales of captured objects from those streams and also the number of such bales.

At 1306, a plurality of sorting facility devices is reconfigured based at least in part on the historical sorting results associated with the source. At least a portion of the sorting facility devices can be reconfigured to accommodate and/or optimize for the sorting of the new material stream based on the historical sorting results. For example, if the output bales that were generated from previous material streams that were received from that source indicated a 50% of material type 1, 30% of material type 2, and 20% of material type 3, then the sorting behavior of the devices at the facility can be reconfigured to optimize the sorting of the new material stream around that breakdown of material types based on the assumption that the new material stream would have similar characteristics to the historical material streams. A first example type of reconfiguration based on this material breakdown may include configuring proportional numbers of available ML vision subsystems and corresponding sorting devices at the facility to target material types 1, 2, and 3 in relation to their respective proportions in the historical bales. A second example type of reconfiguration based on this material type breakdown is to assign/allocate bunkers and also target conveyor devices to receive/convey the captured objects corresponding to target material types 1, 2, and 3 in relation to their respective proportions in the historical bales. Other examples of reconfiguration include adjusting a reducer's settings, adjusting a distribution device's setting, adjusting an air jet array's air pressure, adjusting the speed of a screen, and/or adjusting a baler's settings in anticipation of sorting through a new material stream with a material type breakdown similar to those in the historical bales.

At 1308, new sorting results associated with sorting the new material stream at the sorting facility are determined. In some embodiments, new sorting results describe the sorting performance of the facility after sorting through the new material stream and include, for example, the material type composition within the output bales generated from sorting through the new material stream.

At 1310, the historical sorting results associated with the source are updated based on the new sorting results. For example, the new sorting results are combined (e.g., averaged) with the historical sorting results and the updated historical sorting results are stored for the source. For example, if the new sorting results indicate that the resulting material composition across bales generated from the new material stream were now 40% of material type 1, 40% of material type 2, and 20% of material type 3, then the new average sorting results for this source may indicate that to sort a subsequent material stream to be received from the source, the sorting devices need to be reconfigured to account for the trend towards more of material type 2 appearing within the stream.

At 1312, it is determined whether at least one more new material stream is to be received at the sorting facility. In the event that at least one more new material stream is to be received at the sorting facility, control is returned to 1302. Otherwise, in the event that no new material stream is to be received at the sorting facility, process 1300 ends.

As mentioned above, the output bales generated from a source's material streams can be recorded over time. In some embodiments, the monetary value of the source's output bales can also be determined based on the current commodity prices, the material composition, and mass of each bale. The actual material composition of a source's material streams can also be used to evaluate whether the source has fulfilled terms of a contractual agreement, in which the source had agreed to provide materials of a certain material breakdown.

In some embodiments, as mentioned above, a QC system may be implemented whereby ML vision subsystems placed throughout the facility identify and measure either success or failure of sorting operations, or both. As mentioned above, placement of QC sensors near or downstream from locations within the facility at which sorting devices perform sorting operations enables the MCS to both provide feedback to the sorting device control systems, as well as enable downstream components to further act upon the "missed" objects (e.g., target objects that were not successfully captured). In some embodiments, prior to discarding unpicked objects that remain on the conveyance system in a residue compactor, the remaining objects are redirected to a "recirculation system," and routed to a "last chance" ML vision subsystem and a sorting device (e.g., an air jet array) pair (e.g., such as the diverters shown in row 230 of the example sorting facility of FIG. 2). In general, it is advantageous to provide multiple attempts at object capture. For example, an object may fail to be captured on a first attempt, or blocked by another object, where it could be captured later. Thus, in order to achieve a high capture success rate, it is beneficial to augment a sorting facility with multiple capture areas in series. A disadvantage of this approach is that it effectively doubles the cost of the ML vision and sorting device systems by duplicating them. A solution to this is the addition of a second "last chance" sorting subsystem attached to the recirculation line. In this case, each ML/sorting station remains the same, and missed objects end up on the "last chance" recirculation belt before being processed as residue/garbage and compacted. In this approach, a second "last chance" air jet array sorting device and ML vision subsystem is added, so that only the final last attempt to capture is duplicated. In the event that the last chance ML vision/air jet array subsystem has a 90% capture rate, the addition of a subsequent ML vision/air jet array subsystem boosts the probability of capture up to 99%(90%+9%). Here, any desirable/target objects are sorted and the remaining objects allowed to exit the system for subsequent compaction. Alternatively, the "last chance" diverting mechanism can remove any undesirable/non-target objects from the material stream and the remaining objects are allowed to recirculate through at least a portion of the sorting facility for the chance to be sorted into their respective bunkers. In some embodiments, the recalibration of diverting devices may be triggered by the MCS based on QC metrics for downstream materials. For example, the QC system may identify large quantities of desirable unsorted objects, and then trigger a new calibration or adjustment to the diverting devices (e.g., jets or robot pickers) responsible for those objects. In some embodiments, and as will be described further below, the QC system is used to dynamically modify bale mixes, including chemical compositions of specific bales based on target optimization metrics (e.g., an objective function as described in a bale recipe relative to chemical composition within a bale).

A significant portion of missed capture opportunities arise due to "neighbor suppression," which is where a sorting device is not triggered to remove (capture) a target object due to the proximity of undesirable objects to the target object. As described above, to increase capture percentages, a "double pass" system may be implemented, where dual ML vision and sorting devices are attached in a series. A variation on this approach is to implement an initial sorting subsystem (i.e., ML vision subsystem and air jet array or other diverting mechanism) where this first subsystem targets 100% of identified objects with no consideration for undesirable contamination. Because a high percentage of these "sorting operations" will result in undesirable neighbors also being picked, a second sorting subsystem is then implemented downstream of the location of the first sorting device instead of directly depositing all materials in the target object bunker. The second sorting subsystem then provides a second pass through the objects captured/diverted by the first ML vision subsystem and sorting device by targeting the undesirable neighbor objects (e.g., objects that do not match a set of target object criteria), and is focused on removing these objects (in a negative sorting scheme) and placing them in a separate stream. Similar to the design above, a more economically optimal solution is to perform the first sort as described above, but then allow both targets and undesirable neighbors to be placed in the bunker. A second "negative sort" system is then placed between the bunkers and balers, and the undesirable neighbor objects are identified on the way from the bunker to the baler and removed at that point, with the MCS dynamically adjusting the negative sort to match the product/material type currently being baled from a given bunker. Another aspect is that by decoupling the second negative sorting system from the initial sorters, and utilizing only one negative sorter in the facility, the negative sorting subsystem may include more expensive components while only having a minimal impact on the facility cost as a whole. For example, while the normal, positive sorting subsystems might utilize only inexpensive vision sensors, the second, negative sorter may be equipped with both vision sensors, NIR sensors, and even multispectral sensors to ensure proper identification of objects. In this way, multiple air jet array sorting devices and sensors may be utilized to improve accuracy, but at a limited overall cost to the system.

In some embodiments, as mentioned above, material that completes a circuit through the facility but is not picked may be recirculated on a recirculation conveyance system. However, in some scenarios, the desirable materials that are recirculating within a facility represent a smaller percentage of the total material on a sorting line, or where the non-desirable (residue) material may be too large or heavy to divert easily (e.g., concrete blocks which cannot be easily moved by sorting/diverting mechanisms such as airflow), the facility's devices may be reconfigured such that "selectable" recirculation may be implemented. Examples of "desirable" objects are those that are normally captured into bunkers at the sorting facility for further processing (e.g., recycling) and/or resale. Selectable recirculation may entail, depending on the characteristics of the remaining objects in recirculation, a "default" mode in which the "last chance" sorting device targets only undesirable objects or a "healing" mode in which the "last chance" sorting device targets only desirable objects. Also, in "selectable recirculation," the direction of at least one conveyor device is reversed as the facility switches between the "default" mode and "healing" mode such that the desirable objects are always placed on the recirculation belt while the non-desirable/residue are conveyed towards a residue collection (e.g., a residue compactor). As mentioned above, in some embodiments, removing desirable objects from the conveyor device is referred to as a "positive sort" and removing undesirable objects from the conveyor device is referred to as a "negative sort." FIG. 14, below, describes one such example process for performing selectable recirculation at the sorting facility.

Figure 14:
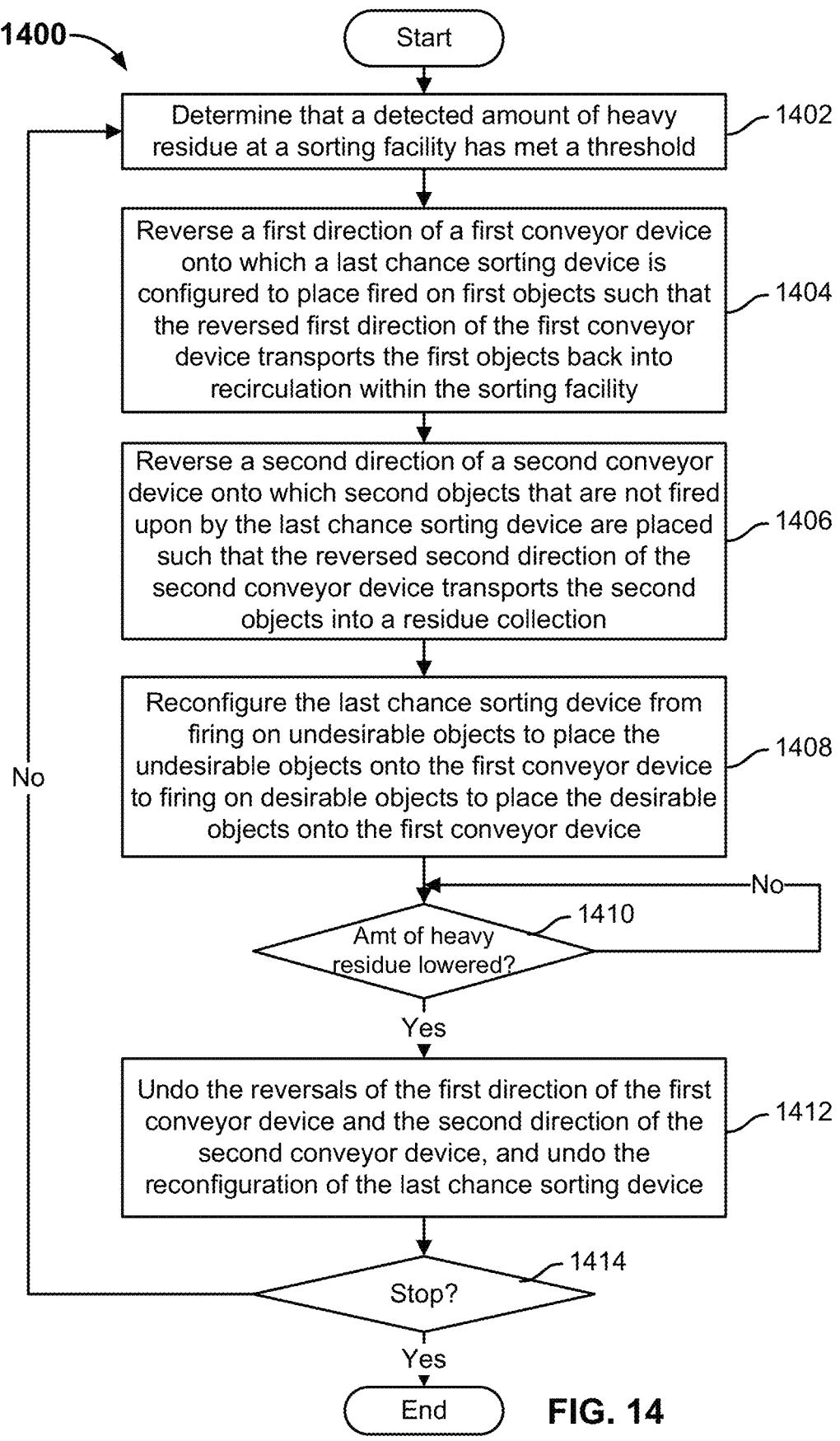
FIG. 14 is a flow diagram showing an example of a process for reconfiguring sorting facility devices to perform selectable recirculation at a sorting facility in accordance with some embodiments.

FIG. 14 is a flow diagram showing an example of a process for reconfiguring sorting facility devices to perform selectable recirculation at a sorting facility in accordance with some embodiments. In some embodiments, process 1400 may be implemented at an MCS such as the example MCS described in FIG. 6. In some embodiments, steps 704 and 706 of FIG. 7 may be implemented using process 1400.

At 1402, it is determined that a detected amount of heavy residue at a sorting facility has met a threshold. As described above, the use of ML vision subsystems throughout the facility can characterize the objects that are flowing through the facility. In some embodiments, via the ML vision subsystems, the MCS can determine that a number, proportion, or mass of remaining objects match the criteria of being "heavy residue" on the facility's conveyance system or the estimated mass of heavy residue meets a threshold. For example, the "heavy residue" criteria comprises a specified minimum mass and/or a set of specified material types (e.g., concrete, organic material, rubber, metal). In general, the "heavy residue" criteria describes characteristics of objects that are too heavy to be sorted by the types of sorting devices (e.g., such that ones that use suction or airflow to divert objects) that are used at the facility.

Prior to the detected amount of heavy residue meeting the threshold, the "recirculation" that was used at the facility was the "default" mode. During the "default" mode, a last chance sorting device (e.g., implemented by an air jet array) is configured to perform a "negative sort," which involves firing on undesirable objects (e.g., residue) that are lightweight enough to be manipulated by the last chance sorting device to place them onto a conveyor device that will convey the objects towards a residue/garbage compactor. In some embodiments, "desirable" objects may be objects that match a set of target object criteria and "undesirable" objects may be objects that do not match a set of target object criteria. After the detected amount of heavy residue meets the threshold, the MCS can switch the recirculation to be in a transient/temporary "healing" mode. During the "healing" mode, the behavior of the last chance sorting device (and its corresponding ML vision system) and two conveyor devices that are proximate to the last chance sorting device are temporarily adjusted to allow the heavy residue to be routed to the residue/trash compactor in a manner that does not require them to be diverted by the last chance sorting device, which may not be capable of manipulating the heavy residue given their larger mass.

At 1404, a first direction of a first conveyor device onto which a last chance sorting device is configured to place fired on first objects is reversed such that the reversed first direction for the first conveyor device transports the first objects back into recirculation within the sorting facility. In some embodiments, a first conveyor device and a second conveyor device are proximate to the last chance sorting device and move in opposite directions. At any time, one conveyor device conveys objects back towards the facility for recirculation and the other conveyor device conveys objects towards the residue/trash compactor. During the "default" mode, the last chance sorting device is configured to perform a "negative sort" by placing undesirable objects falling off from a main conveyor device onto the first conveyor device that is normally configured to move objects (targeted residue) towards the residue/trash compactor. However, during the "healing" mode, the direction of this first conveyor device is reversed to now move objects back to the facility for recirculation.

At 1406, a second direction of a second conveyor device onto which second objects that are not fired upon by the last chance sorting device are placed is reversed such that the reversed second direction of the second conveyor device transports the second objects into a residue collection. During the "default" mode, the last chance sorting device is configured to not fire upon desirable objects falling off from a main conveyor device and as such, these desirable objects land on the second conveyor device that is normally configured to move desirable objects back to the facility for recirculation. However, during the "healing" mode, the direction of this second conveyor device is reversed to now move objects towards the residue/trash compactor.

At 1408, the last chance sorting device is reconfigured from firing on undesirable objects to place the undesirable objects onto the first conveyor device to firing on desirable objects to place the desirable objects onto the first conveyor device. The last chance sorting device (and its corresponding ML vision system) are reconfigured to perform a "positive sort" by placing desirable objects onto the reversed first conveyor device that is now moving objects back to the facility for recirculation.

As a result of the reconfiguration described in steps 1404, 1406, and 1408, the facility in the "healing" mode enables the last chance sorting device to ignore firing on heavy residue, which allows the heavy residue to passively fall onto the conveyor device that now conveys the heavy objects into the residue compactor. Similarly, the healing mode also enables the last chance sorting devices to fire on lighter desirable objects to change their trajectory and therefore place them onto another conveyor device that will return them back to the facility for recirculation. Running the facility in this "healing" mode will enable the facility to "purge" itself of the heavy residue, which is not easily diverted or manipulated by the sorting devices of the facility, while allowing the lighter, desirable objects to recirculate through the facility to be potentially captured by sorting devices.

At 1410, it is determined whether the detected amount of heavy residue has lowered below a threshold. In the event that the detected amount of heavy residue has not lowered below a threshold, control returns to 1410 after a waiting period. Otherwise, in the event that the detected amount of heavy residue has lowered below a threshold, control is transferred to 1412. The amount (e.g., the number, the proportion, or the mass) of the heavy residue that remains circulating through the facility is determined and if the amount is less than another lower threshold, then the facility can be returned to the "default" mode.

At 1412, the reversals of the first direction of the first conveyor device and the second direction of the second conveyor device are undone, and the reconfiguration of the last chance sorting device is undone. When the facility is returned to the "default" mode, the directions of the two conveyor devices are switched again to return them to their normal directions. Furthermore, to reinstate the "default" mode, the last change sorting device and its corresponding MV vision system are also reconfigured to once again perform a "negative" sort, as described above.

At 1414, it is determined whether selectable recirculation is to be continued at the sorting facility. In the event that selectable recirculation is to be continued at the sorting facility, control returns to 1402. Otherwise, in the event that selectable recirculation is not to be continued, process 1400 ends.

Figure 15A:
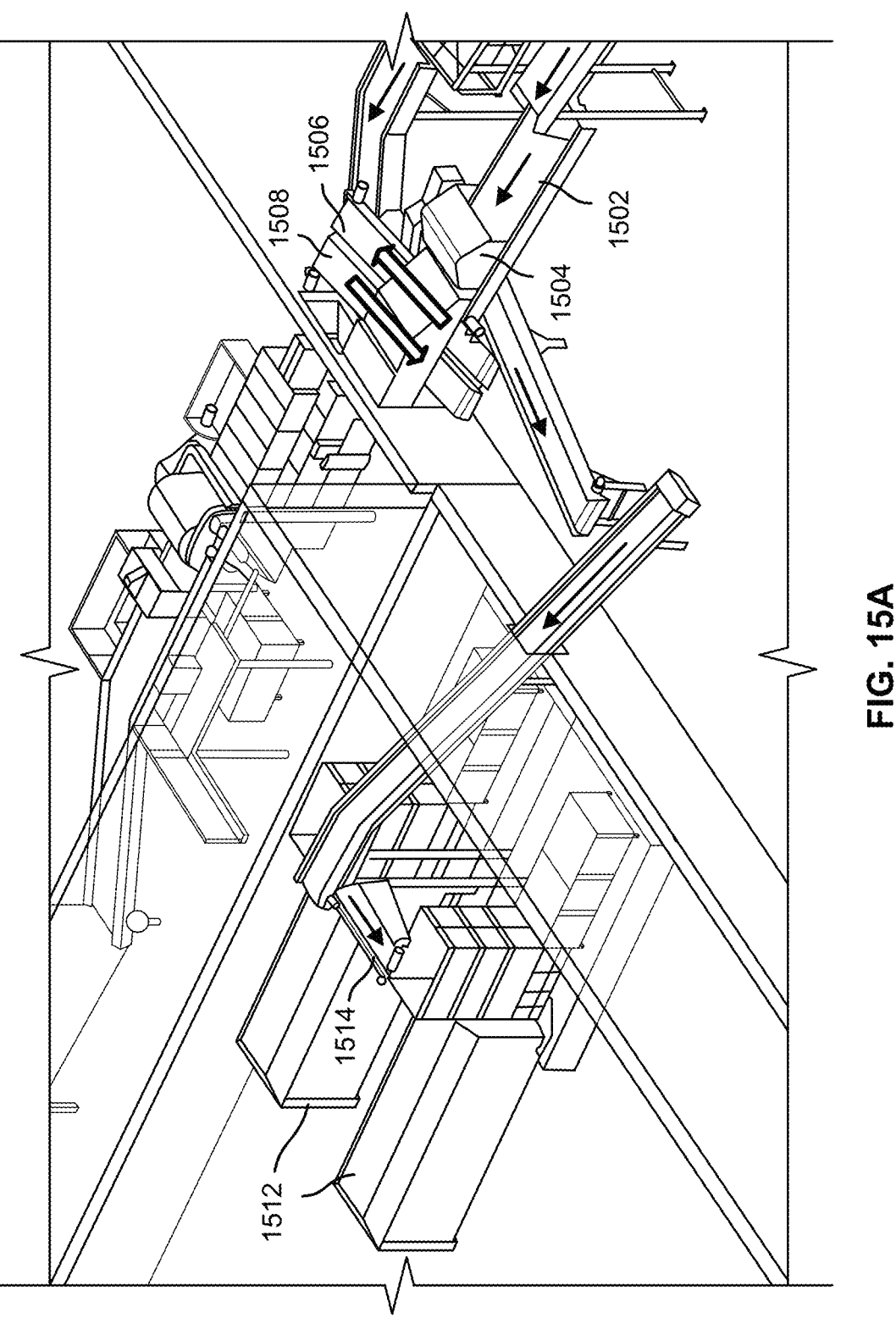
FIGS. 15A and 15B show examples of a facility configuration implementing selectable recirculation.
Figure 15B:
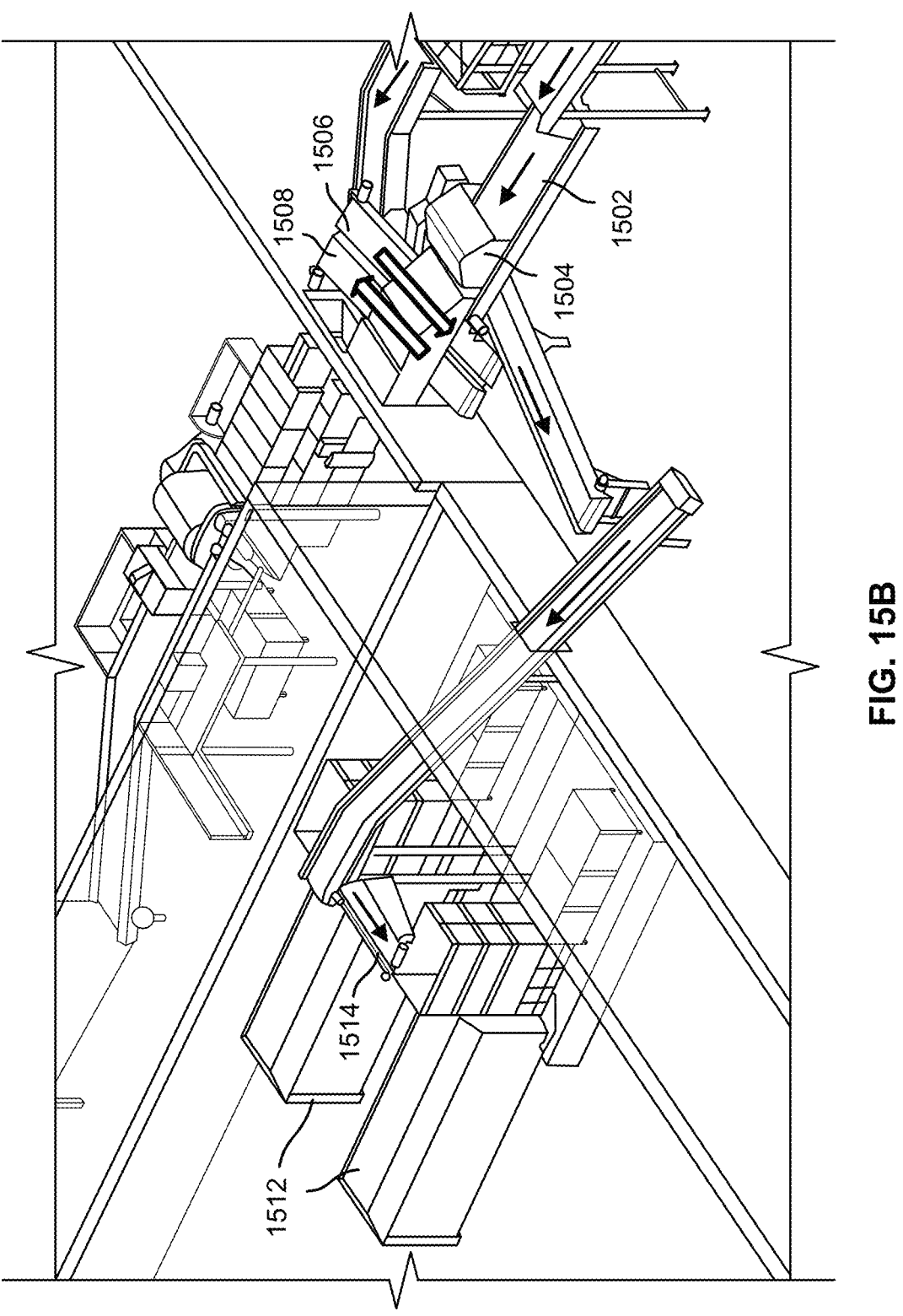

FIGS. 15A and 15B show examples of a facility configuration implementing selectable recirculation. In particular, FIG. 15A shows an example of a configuration implementing a "default" mode of recirculation. As shown in FIG. 15A, objects are transported by conveyor device 1502 towards last chance sorting device 1504. For example, last chance sorting device 1504 is implemented using one or more air jet arrays. Last chance sorting device 1504 is coupled with an ML vision subsystem that captures images of the objects heading towards last chance sorting device 1504 and also characterizes the objects within the images. As the objects fall off the end of conveyor device 1502 that is proximate to last chance sorting device 1504, last chance sorting device 1504 is instructed (e.g., by the corresponding ML vision subsystem) to fire on a subset of the objects depending on whether it is implementing a "positive sort" (in which last chance sorting device 1504 will fire on desirable objects) or a "negative sort" (in which last chance sorting device 1504 will fire undesirable objects). The objects that are fired on by last chance sorting device 1504 will be propelled to the further conveyor device, conveyor device 1508, while the objects that are not fired on by last chance sorting device 1504 will land on the closer conveyor device, conveyor device 1506.

In the "default" mode in the example configuration of FIG. 15A (e.g., before the amount of heavy residue circulating in the facility has met a threshold), last chance sorting device 1504 is instructed to perform a "negative sort" and fire on undesirable objects (e.g., light residue that can be manipulated by a positive airflow). Also, in the "default" mode in the example configuration of FIG. 15A, conveyor device 1506 is configured to convey objects in the direction back towards recirculation through the facility, whereas conveyor device 1508 is configured to convey objects towards residue compactors 1512. Given the configuration of the facility components of FIG. 15A, in the "default" mode, the light residue that is fired on by last chance sorting device 1504 will be propelled onto conveyor device 1508, which will convey the light residue towards residue compactors 1512. Compactors 1512 show an example of two residue compactors that bi-directional belt drive 1514 is utilized to automatically switch between to redirect material flows from a full compactor to the not full (e.g., empty) one. Similarly, in the "default" mode, the target objects that are not fired on by last chance sorting device 1504 will land on conveyor device 1506 and become conveyed back into the facility for additional sorting.

In the "default" mode, even if last chance sorting device 1504 fires on heavy residue, the heavy residue will likely still not fall on conveyor device 1506 and return to the facility for recirculation, which is undesirable, as the residue should be placed into residue compactors 1512. As such, thanks to an intelligent detection for a threshold amount of heavy residue circulating through the facility (e.g., using a process such as process 1400), the components of the facility can be switched into a "healing" mode, as shown in FIG. 15B.

Once the facility is switched to the "healing" mode, last chance sorting device 16504 (and its corresponding ML vision subsystem) is reconfigured to perform a "positive sort," whereby desirable objects that fall off of the end of conveyor device 1502 are fired on to propel them to land on conveyor device 1508 and undesirable objects land on conveyor device 1506. Furthermore, in the "healing" mode, the directions of conveyor devices 1506 and 1508 are reversed to result in conveyor device 1506 now conveying objects towards residue compactors 1512 and conveyor device 1508 conveying objects back to recirculation. Given the configuration of the facility components of FIG. 15B, in the "healing" mode, the heavy residue that is not fired on by last chance sorting device 1504 will land (via gravity) onto conveyor device 1506, which will now convey the heavy residue towards residue compactors 1512. In this way, the "healing" mode reconfigures the sorting scheme of last chance sorting device 1504 and the directions of conveyor devices 1506 and 1508 to direct heavy residue (that is not easily manipulated using an air-based sorting mechanism) of the material stream towards residue compactors while selectively allowing the lighter target objects to be routed back into recirculation. A facility that enters the "healing" mode as shown in FIG. 15B may stay in that mode for a temporary period of time (e.g., until the amount of heavy residue in the material stream is determined to fall below a threshold) to purge the facility of the heavy residue before the sorting scheme of last chance sorting device 1504 and the directions of conveyor devices 1506 and 1508 can return to operating in the "default" mode as shown in FIG. 15A.

Figure 16:
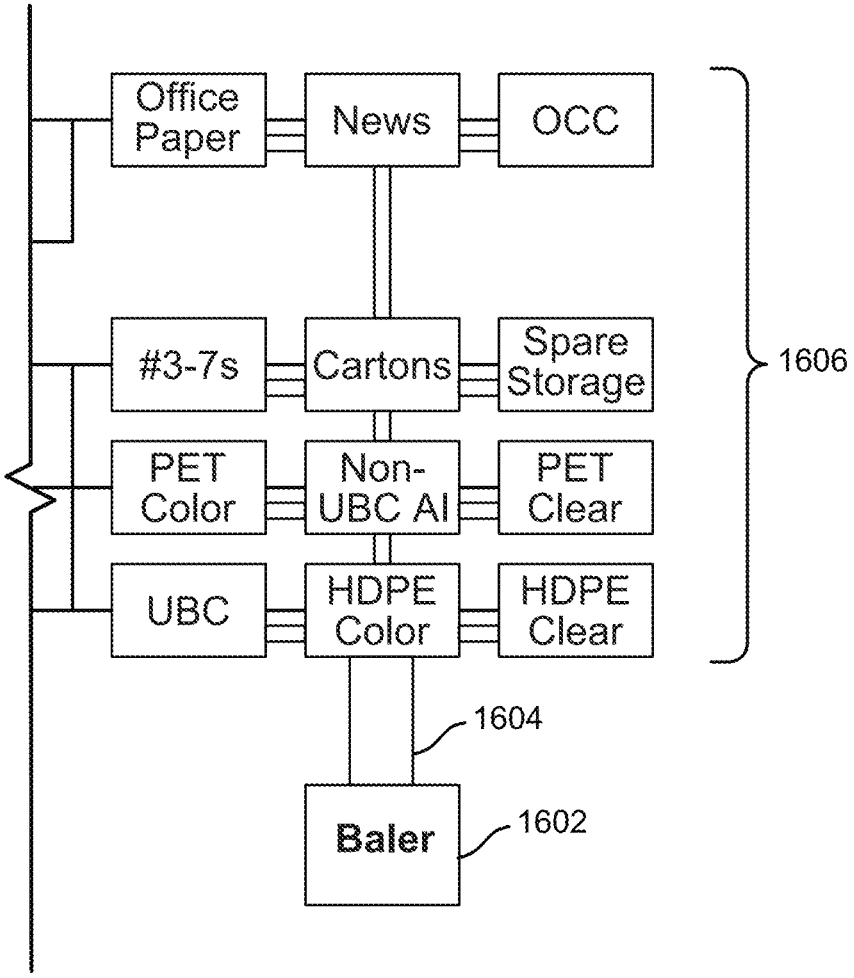
FIG. 16 is a diagram showing example bunkers, a conveyance system, and a baler at a facility.

FIG. 16 is a diagram showing example bunkers, a conveyance system, and a baler at a facility. In particular, FIG. 16 shows a zoom-in view of bunkers 214, conveyor device 222, and baler 226 of the example sorting facility of FIG. 2. As described above, the objects that are captured from a material stream by the diverting mechanisms of sorting devices located throughout the facility are either directly deposited into or conveyed to and then deposited in respective ones of bunkers 1606. As shown in FIG. 16, each individual bunker is assigned to hold captured objects of one or more specified types of materials. For example, bunkers 1606 show respective bunkers that are assigned to hold captured objects that are office paper, newspapers, corrugated cardboard boxes (OCC), plastics with codes 3 through 7, cartons, spare storage, PET with color, non-used beverage can (UBC) aluminum, PET that is clear, used beverage cans (UBC), High Density Polyethylene (HDPE) with color, and HDPE that is clear. The sorting facility devices of the facility are configured such that each object is characterized using machine learning and then its characteristics (e.g., material type) are used to determine whether it is a target object and if so, a corresponding sorting device is configured to capture the target object from the material stream and then the conveyor system of the facility is configured to route the captured object into a corresponding bunker that holds objects of that material type.

In some embodiments, bunkers 1606 are augmented to support optimized material collection in an automated environment. At least some of bunkers 1606 are sloped to enable passive movement of materials into and out of the bunker and to prevent clogging. At least some of bunkers 1606 that are prone to clogging may be automatically cleared using vibratory inputs to the bunker itself, or using oscillating air jets to move materials down the slope. In some embodiments, an ML vision subsystem that includes a vision sensor that captures images of objects that are to be conveyed to or deposited into a bunker tracks the bunker's state and triggers active unclogging activities automatically, using, for example, vibratory or air jet control inputs. In some embodiments, smooth plastic sheeting may be applied to the interior sides of a bunker to facilitate material movement as a passive mechanism for clog prevention.

In some embodiments, at least some of bunkers 1606 are "live" bottom bunkers with an intrinsic conveyance belt that is utilized to actively enable bunkers to be filled completely without clogging. In such a system, one or more vision sensors that are placed inside of a bunker or pointed into the bunker track the fill level within the bunker. Based on sensor feedback, the control system (the MCS or other controller) sends a control signal to the motor controlling the conveyor belt inside the bunker to enable material to be moved within the bunker (e.g., to prevent or undo clogging).

Ultimately, the contents held by each bunker of bunkers 1606 is configured to be transferred to baler 1602 so that baler 1602 can compact the contents into rectangular-shaped bales, which are usually material-specific products that can be sold to buyers (e.g., for further processing such as recycling). In particular, the contents held by each bunker of bunkers 1606 are to be transferred to baler 1602 by being first emptied from the bunker onto a conveyor system that ultimately conveys the contents via conveyor device 1604 into baler 1602. While not shown in FIG. 16, an ML vision subsystem and corresponding sorting device pair is placed between bunkers 1606 and baler 1602 to identify and remove any undesirable objects that are being conveyed from a bunker to baler 1602, with the MCS dynamically adjusting this negative sort to match the product/material type that is expected to be emptied from a given bunker and into baler 1602. As will be described in FIG. 17, below, the material composition of a bale that is to be generated by a baler from the contents from one or more bunkers can be dynamically tracked and controlled through the reconfiguration of sorting facility devices to meet a target blend, such as one described by a "bale recipe." Moreover, as will be described in FIG. 18, below, the one or more bunkers can be dynamically emptied to result in the emptied contents of the bunker(s) being transferred into the baler to generate a bale without creating an overflow of materials at the bunker(s) and baler.

FIG. 17 is a flow diagram showing an embodiment of a process for dynamic bale creation. In some embodiments, process 1700 may be implemented at an MCS such as the example MCS described in FIG. 6. In some embodiments, steps 704 and 706 of FIG. 7 may be implemented using process 1700.

At 1702, a plurality of sorting facility devices at a sorting facility is used to capture objects from a material stream based at least in part on target sorting metrics specified by a bale recipe. In some embodiments, operators may provide bale recipes as system inputs (e.g., via a user interface associated with the MCS) that cause the facility to optimize for specific target sorting metrics (e.g., target chemical compositions, target material type compositions, and/or target purity rates). For example, in a bale recipe, the operator may specify the target percentages for certain material types, as well as specific purity rates for each bale. The MCS may also obtain target sorting metrics such as from a third-party (e.g., cloud) service, that may be tied into an economic model (e.g., varying the output mixes based upon current supply/demand curves or market pricing). In some embodiments, the MCS incorporates or accesses a chemistry database relating to target object composition and compatibility. For example, two materials may be different chemically, but the combination is considered desirable from an economic or chemical combination viewpoint.

In some embodiments, different bale recipes (e.g., formulas) can then be created dynamically based on a large range of input metrics. For example, bale formulas are created based on an overall sorting line or facility objective function optimization process.

In some embodiments, a bale recipe can also be programmatically generated by the MCS based on actual sorting results (e.g., material type compositions, purity rates). For example, a programmatically generated bale recipe may correspond to specific characteristics of the input materials from a particular source (e.g., supplier) and also include (e.g., optimized) device configurations to use to yield desired bales that match the target sorting metrics of the bale recipe. In some embodiments, ML vision subsystem(s) can monitor infeed material consistency and material types of an input material stream, and the MCS can correlate this data with other infeed parameters such as vendors, geography, time of year/day/month, etc. Other ML vision subsystem(s) monitor bale output and the MCS can correlate this with facility settings (e.g., target acquisition settings, desired bale mixes, etc.). This aggregate data can then be used by the MCS—either within the single facility, across facilities, or through a cloud service—to dynamically create a library/database of input blends and possible optimized output bales (bale recipes). The facility operator may then select to use the prescribed sorting facility device configurations associated with a selected bale recipe from this library/database, to automatically generate the sorting configuration that was determined based on the input mix across multiple suppliers.

At 1704, current sorting metrics associated with captured objects that are to be added to a collection mechanism at the sorting facility are determined. In various embodiments, the facility is designed to support the tracking of material into and through the facility, and to dynamically optimize desired outputs (e.g., bale creation) based on operator-defined bale recipes or programmatically generated bale recipes, as described above. As described above, using ML vision systems or other sensors, the identification and capture of target objects through the facility can be tracked, which provides data useful for statistical analysis to the MCS. For example, counts and (e.g., mass flow) rates for various objects that may be provided by the ML vision subsystems, or raw data on objects may be forwarded to the MCS. Object counts may be provided at each stage of the facility, e.g., infeed, initial screening, at various sorting devices, on the recirculation belt, at the bunkers, compactor, etc.

In some embodiments, the current sorting metrics associated with captured objects include the characteristics of captured objects that are held at one or more bunkers whose contents are to be transferred to a collection mechanism can be determined using one or more ways that the facility tracks the materials that it processes. Examples of a collection mechanism include a baler (e.g., that configured to generate bales of materials), a roll-off container (e.g., a large container that is configured to store objects and that may be transported by a truck), and/or a compactor. Examples of the current sorting metrics include the material composition (e.g., the breakdown of different material types) and/or the purity level of the contents in a bunker. In a first example, which objects from the material stream that are captured is determined by the ML vision subsystems that instructed sorting device(s) to capture certain target objects. In a second example, which objects from the material stream that are captured is determined by the ML vision subsystems that audit which sorting/capture operations on target objects have succeeded. In a third example, which objects from the material stream that are captured is determined by the ML vision subsystems whose vision sensors are placed near, inside, or pointed at the inside of bunkers (e.g., the images captured by such sensors are analyzed to determine contents within the bunkers).

At 1706, it is determined whether reconfiguration of at least a subset of the plurality of sorting facility devices should be triggered based at least in part on a comparison between the target sorting metrics and the current sorting metrics. The comparison between the current sorting metrics and the target sorting metrics is used to reconfigure the sorting behavior that is performed by at least a portion of the sorting facility devices to ensure that the subsequently captured objects to add to the bunker(s) and that will be contributed to the facility output (e.g., bale) will cause the overall composition of the facility output (e.g., bale) to meet or approach more closely the target sorting results of the bale recipe.

In one example, the MCS may initially optimize sorting devices for maximum capture rate (e.g., get as many target objects as possible) even at the risk of some contamination with non-target objects. As the bunkers become filled with captured objects, quality control analysis of bunker contents may then be used to refine control algorithms to ensure target bale formulae as described by a selected bale recipe are met. If such analysis indicates that the target purity rates that are described by the bale recipe are at risk of not being met, the MCS may dynamically reconfigure at least some of the sorting devices that are configured to capture objects associated with the material types whose purity rates in the bunker(s) are at risk to be more conservative, resulting in fewer captured objects that are not target objects. An example of this would be to modify "neighbor suppression" parameters of sorting devices such that potential "piggybacking" of non-target/undesirable objects is eliminated or reduced. Put another way, the set of suppression parameters of the sorting devices are modified to be more stringent so as to suppress firing on desirable objects more frequently given that an undesirable object is its vicinity. Alternative examples could include varying sorting device control parameters based on supplier IDs (e.g., certain suppliers statistically provide better or worse material mixes), or varying the sorting device control parameters to include targeting of additional chemical stock keeping units (SKUs) that are compatible with the primary target chemical components as specified in the bale recipe. In some embodiments, the MCS utilizes one or more chemical databases to vary control parameters such that the desired quantity of chemical components as specified in the bale recipe are implemented in each bale.

In another example, a bale recipe indicates that the composition of a bale can have no more than a predetermined portion (e.g., 20%) of its composition as a specified material type, such as, for example, blue or green plastics (e.g., because colored plastics are more difficult to recycle and if this threshold is exceeded, the resulting bale would sell for a lower value). As such, once the MCS determines that the current composition of materials that will be emptied from one or more bunkers and into the baler to generate a bale is approaching 20%, then the MCS will reconfigure at least some of the sorting devices at the facility to no longer target blue or green plastics (and only clear, colorless plastics) until the current bale is output by the baler and objects are starting to be captured for a new bale.

As described in process 1700, networked ML vision subsystems, sorting devices, and/or conveyor devices may be reconfigured (e.g., the targeting parameters and the suppression parameters modified) without physically changing the material processing layout, based on captured objects that are already stored at bunker(s). In this way, this type of intelligent sorting facility may become a fungible entity that can be repurposed to support changing business requirements.

In some embodiments, the MCS utilizes the real-time and historical material flows to bunkers and collection mechanism(s) (e.g., balers) to generate data sets and reports useful for stochastic analysis, system tuning, and as inputs to a machine learning system to optimize overall output metrics for the facility. This information may be local to the facility, or shared across facilities by the cloud-based MCS. The MCS may dynamically compare its estimated metrics (e.g., mass and volume of specific materials determined using the ML vision subsystems monitoring conveyances) with the actual output metrics from the baler and bunkers (e.g., scale weights, bunker and/or baler sensors/ML vision systems). Comparisons of this sort may be then used to tune and optimize the QC systems within the facility. In some embodiments, ML vision subsystems are trained on bale quality metrics, and alert the MCS to both conforming and non-conforming bale composition. In the case of a non-conforming bale (e.g., relative to a selected bale recipe), the MCS may elect to flag the bale for inspection. Alternatively, in the event that an ML vision subsystem detects that a bale is becoming non-conformant (e.g., a bunker is becoming contaminated beyond acceptable thresholds), the MCS may dynamically alter upstream sorting operations to increase the purity of the non-conforming bunker in order to meet desired bale metrics, such as described in process 1700.

Figure 18:
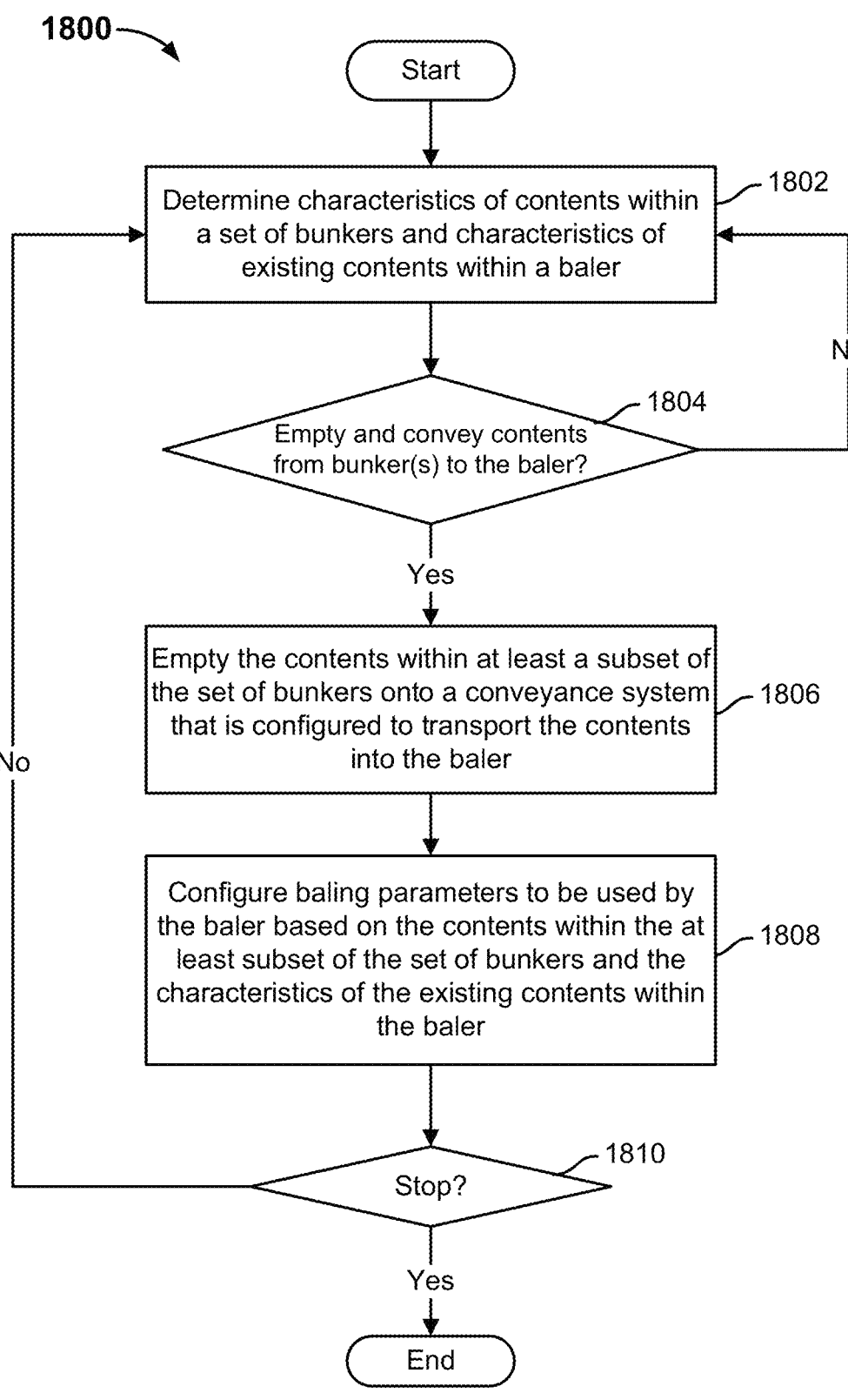
FIG. 18 is a flow diagram showing an example of a process for dynamic bunker emptying in accordance with some embodiments.

FIG. 18 is a flow diagram showing an example of a process for dynamic bunker emptying in accordance with some embodiments. In some embodiments, process 1800 may be implemented at an MCS such as the example MCS described in FIG. 6. In some embodiments, steps 704 and 706 of FIG. 7 may be implemented using process 1800.

In a conventional bunker, it is extremely difficult to determine the mass of materials therein, particularly if a bunker varies its contents dynamically as described elsewhere. When there is too little material in a bunker, the resulting bale from the contents of that bunker becomes undersized. When there is too much material in the bunker, there is waste and extra work to clean and re-bunker the overflow of desired materials. Process 1800 describes an example process for dynamically determining when a bunker is to empty its contents to allow the contents to be transferred to a baler.

At 1802, characteristics of contents within a set of bunkers and characteristics of contents within a baler are determined. In some embodiments, ML vision subsystems or processors that are configured to execute object recognition using other non-vision types of sensors can be leveraged to monitor the mass entering a bunker, and dynamically trigger a bunker emptying event once the bunker reaches a desired capacity to avoid the described undesirable underfilling and overfilling scenarios. For example, the bunkers at a sorting facility are implemented with the capability of identifying the characteristics of its contents (e.g., mass, volume, purity rate, and/or material composition), monitoring the status of the bunker, and metering a specific mass or volume in order to create bales with no overflow or underflow. Once the bunker emptying event is triggered for one or more bunkers, the MCS also automatically commands the baler to create a bale using the contents that are emptied from the one or more bunkers. In some embodiments, in addition to monitoring the characteristics of the content within each bunker, whether the baler includes any content and if so, the characteristics of the baler's current content are also determined. Example characteristics of a baler's content may include mass, volume, purity rate, and/or material composition.

At 1804, it is determined whether contents from the set of bunkers should be emptied and conveyed to the baler. In the event that the contents from the set of bunkers should be emptied and conveyed to the baler, control is transferred to 1806. Otherwise in the event that the contents from the set of bunkers should not be emptied and conveyed to the baler, control is returned to 1802. A bunker may be deemed "full" based on any of the following criteria: 1) ML vision subsystems that are upstream of the bunker and that monitor the status (e.g., the amount) of the captured objects being routed to the bunker and 2) feedback regarding material input to the bunker by an ML vision subsystem that is monitoring inputs and/or outputs at the bunker (e.g., a vision sensor is pointed inside the bunker or located inside the bunker). Once deemed "full," the MCS signals the system to empty the bunker for baling. Alternative embodiments include other processors in the system triggering the emptying process. In some embodiments, either one or more than one bunkers can be triggered to empty its contents into the baler at the same time if the combination of their contents and any already inside the baler meets the target sorting metrics that are described in a selected bale recipe for the current bale. The MCS may signal a bunker to empty at any time, even prior to filling, based upon its monitoring of the baling system. For example, a bunker may be half full, but the MCS determines based on target sorting metrics (e.g., a target material composition and/or a target purity rate) for a bale, that the partial load should be added to the current partial bale. In addition, whenever the MCS elects to reconfigure the material flow (e.g., new material composition is being input to the facility), it may signal one or more bunkers to immediately empty, and configure balers and conveyance systems (e.g., recirculation lines) to handle the influx of partial material loads. This process is automated by the MCS in order to minimize mixed-material baling due to system changes or other events.

At 1806, the contents within at least a subset of the set of bunkers are emptied onto a conveyance system that is configured to transport the contents into the baler. As shown in FIG. 17, for example, the bunkers at the facility that are triggered to empty their contents, empty their contents onto one or more conveyor devices that are configured to transport the material into a baler system at the facility.

At 1808, baling parameters to be used by the baler are configured based on the contents within the at least subset of the set of bunkers and the characteristics of contents within the baler. In some embodiments, the MCS provides separate views and controls for the sorting components and the baling components. In the baling zone, conveyance belts and balers may be controlled and configured by the MCS. In some embodiments, one or more visions sensors are coupled to the baler, and feedback from sensors may be used by the system to start/stop and otherwise automate the baling process. In some embodiments, because the MCS had monitored the contents of one or more bunkers and then triggered them to empty, the MCS is also aware of the material composition and other characteristics (e.g., volume, mass) of the combination of contents in the baler. As such, the MCS can programmatically determine the appropriate baling parameters (e.g., pressure) with which the baler should perform a baling action on its current contents. For example, the baling parameters should be customized to generate each bale based on the contents of the bale so that the resulting bale will meet desired criteria such a desired density, size, and/or shape. In a specific example, if the baler's contents were mostly corrugated cardboard, then the baler should perform the baling operation using different parameters than if its contents were mostly cartons due to the different characteristics (e.g., compressibility) between corrugated cardboard and cartons.

At 1810, it is determined whether dynamic bunker emptying is to be continued at the sorting facility. In the event that dynamic bunker emptying is to be continued at the sorting facility, control returns to 1802. Otherwise, in the event that dynamic bunker emptying is not to be continued, process 1800 ends.

FIG. 19 is a flow diagram showing an embodiment of a process for using co-located sensors to determine a sorting decision. In some embodiments, process 1900 may be implemented at an MCS such as the example MCS described in FIG. 6.

At 1902, a first image including a first set of objects is received from a first sensor in a sorting facility, wherein the first sensor is associated with a first field of view. In some embodiments, the first sensor comprises a first vision sensor. In some embodiments, the first vision sensor is placed in a location within the facility at which it is pointing towards objects on a conveyor belt. For example, the first vision sensor's field of view covers only a portion of the entire width of the conveyor belt.

At 1904, a second image including a second set of objects is received from a second sensor in the sorting facility, wherein the second sensor is associated with a second field of view, and wherein the first field of view is adjacent to or overlaps with the second field of view. In some embodiments, the second sensor comprises a second vision sensor. In some embodiments, the second vision sensor is placed in a location within the facility that is proximate to the first vision sensor and as such, the first and second sensors have substantially adjacent if not at least partially overlapping fields of view. For example, two or more sensors can be "co-located" because they have adjacent or at least partially overlapping fields of view. In one example configuration, the first vision sensor's field of view covers a portion of the width of the conveyor belt and the second vision sensor's field of view covers at least the other remaining portion of the width of the conveyor belt. If the two sensors have overlapping fields of view but are placed at different angles relative to the conveyor belt, then the images captured by the co-located sensors at similar times or close in time (e.g., the images are captured within a threshold window of time) could show different angles/views of at least some of the same objects. In some embodiments, the two vision sensors may be connected or combined as sensor arrays.

At 1906, the first image and the second image are evaluated to determine a sorting decision with respect to a target object. In some embodiments, the images captured by the first and second co-located sensors with substantially adjacent or overlapping fields of view may be analyzed simultaneously by machine learning techniques to detect the objects within one or both of the images. In some embodiments, the images captured by the first and the second co-located sensors with substantially adjacent or overlapping fields of view may be combined to provide a higher resolution image to be processed by machine learning techniques to detect the objects within one or both of the images. The images obtained from the co-located sensors could be evaluated together to identify object(s) that may be at least partially occluded in one of the images but relatively less occluded in the other images. The combined, higher resolution image can then be used to better identify objects within at least some of the images and therefore, enable more effective sorting operations to be performed by sorting devices on such objects. In some embodiments, the images captured by the first and the second co-located sensors with substantially adjacent or overlapping fields of view may be analyzed in succession by machine learning techniques to detect the objects within one or both of the images.

In some embodiments, the images captured by the first and the second co-located sensors with substantially adjacent or overlapping fields of view may be analyzed to determine a "sorting decision" with respect to the target object. In a first example, the "sorting decision" is whether or not to perform a sorting operation on the target object. For instance, if the images show that the target object is within a pick region of a downstream sorting device and/or there is not a proximate non-target object relative to the target object, then a sorting operation is to be performed on the target object. In a second example, the "sorting decision" is a sorting parameter to be used to perform a sorting operation on the target object. For instance, sorting parameters with which to perform a sorting operation include one or more of the following: the force to use, the location on the object to target, the number of diverting mechanisms to activate. In a third example, the "sorting decision" is a successful or unsuccessful result associated with a sorting operation that is performed on the target object. For instance, the downstream co-located sensor can serve as an audit sensor that captures an image of the sorting operation on a target object that was performed by a sorting device based on an image that was captured by the upstream, co-located sensor.

While two co-located sensors are mentioned, in other examples there could be two or more co-located sensors whose respectively captured images could be evaluated to better identify objects within at least some of the images and therefore, perform more effective sorting operations on such objects.

In some embodiments, the images captured by the co-located first sensor and the second sensor (and, potentially, additional co-located sensor(s)) can be analyzed (e.g., by the MCS) using machine learning to detect objects that can be sorted by one or more downstream sorting devices. For example, one or more downstream sorting devices can employ the same type of sorting mechanisms or different types of sorting mechanisms and different sorting arrangements. Examples of sorting mechanism types include suction grippers, vacuum tubes, robotic sorters, air jet arrays, and microjets. Examples of sorting arrangements include the number of sorting devices that are placed within the same junction (e.g., between consecutive conveyor devices) that are respectively configured to target different types of objects. For example, a sorting arrangement in which one sorting device is configured to sort objects at a junction is sometimes referred to as a "single cut" and a sorting arrangement in which two sorting devices are configured to sort different types of objects at a junction is sometimes referred to as a "dual cut," and so forth.

Figure 20A:
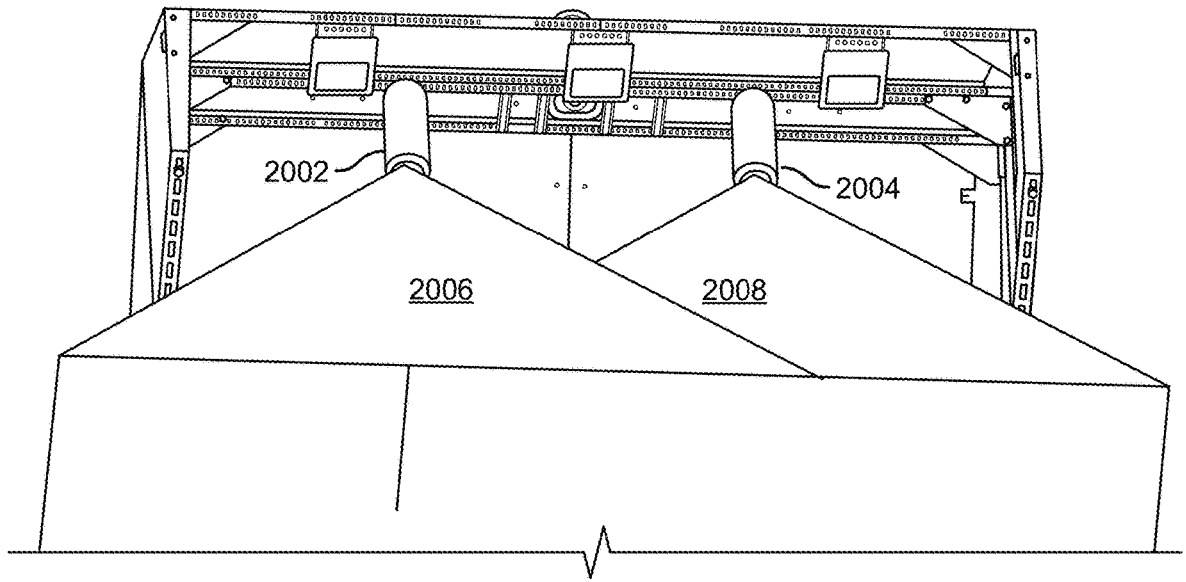
FIGS. 20A and 20B are diagrams that show different views of two co-located sensors and whose fields of view combine to span at least the width of a conveyor belt in accordance with some embodiments.
Figure 20B:
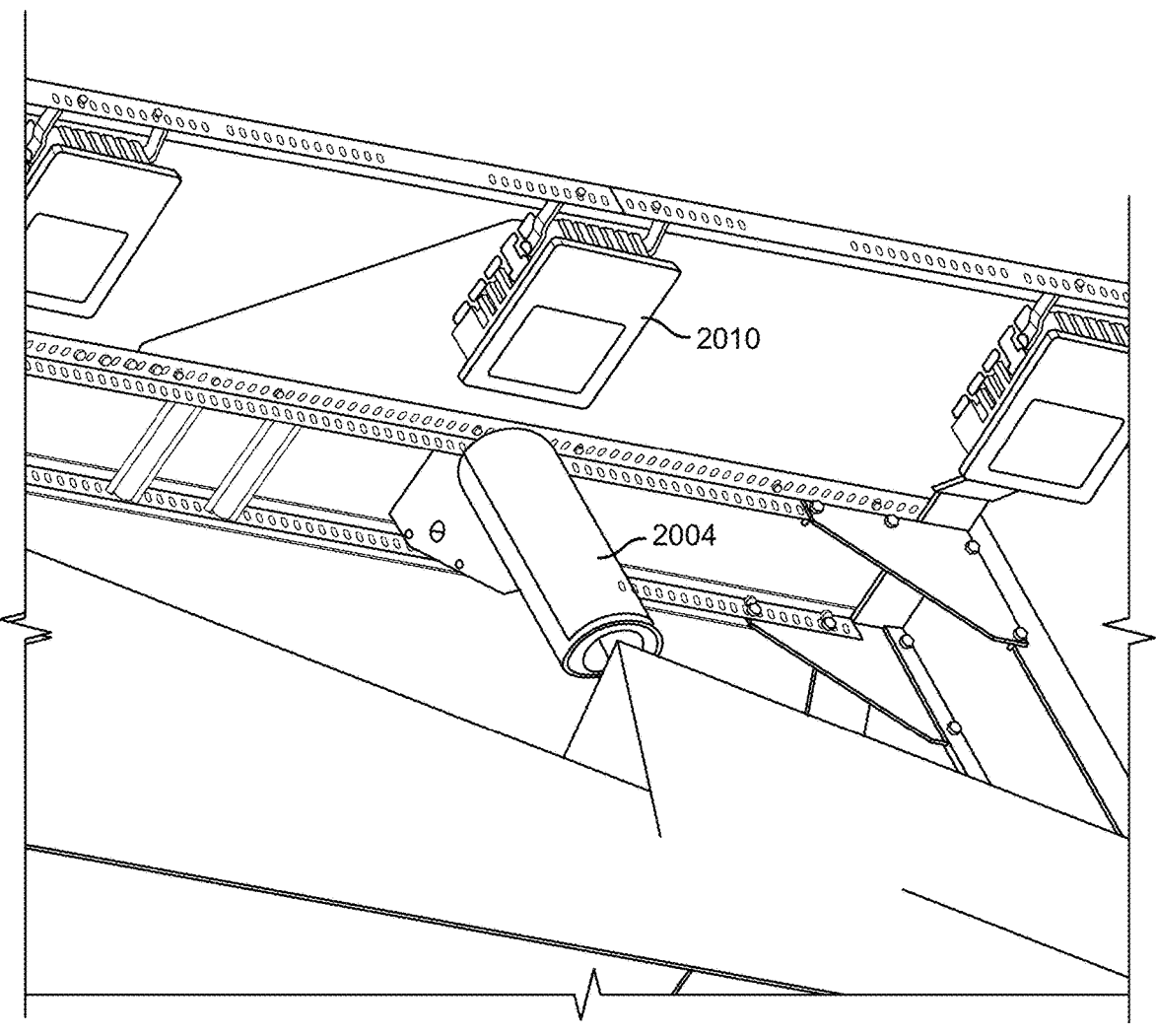

FIGS. 20A and 20B are diagrams that show different views of two co-located sensors and whose fields of view combine to span at least the width of a conveyor belt in accordance with some embodiments. In the examples of FIGS. 20A and 20B, the two co-located sensors are installed on a structure above a conveyor device that is conveying materials through a sorting facility. In the examples of FIGS. 20A and 20B, the two co-located sensors are pointed down on the conveyor belt to capture images of the objects below. FIG. 20A shows a view of the two co-located sensors, sensor 2002 and sensor 2004, from below. In particular, FIG. 20A shows that field of view 2006 of sensor 2002 partially overlaps with field of view 2008 of sensor 2004. In some embodiments, sensors 2002 and 2004 are both vision sensors that may be connected or combined as sensor arrays. For example, two or more sensors can be combined as sensor arrays if they are triggered to or otherwise determine to capture images close in time. In a specific example, co-located sensors (e.g., in an array) can be configured to capture images at the same frequency in a synchronized manner. Whether physically combined, or co-located as individual units, the combination of vision sensors creates a higher spatial resolution image to be processed by a machine learning model for object detection. When two or more sensors have at least overlapping fields of view, such as sensors 2002 and 2004, and are configured to capture images close in time, the images from the sensors may include different angles of at least some of the same objects and therefore, collectively provide richer information on such objects. In some embodiments, the images captured close in time from such sensors may be stitched together to create a master image. In some embodiments, a master image can be provided to the MCS and used by the MCS to perform object detection and/or to train a machine learning model to better detect object characteristics using a stitched together image. In some embodiments, the master image data may evolve over time as updated data arrives. For example, master image data may evolve when images that are captured by co-located sensors are taken over time and then stitched together to generate master images. One or more master images can be analyzed using machine learning techniques to remove uncertainty in position and velocity in tracking object trajectories, which will enable very accurate picking mechanisms for, for example, a dense air jet array with multiple sorting directions based on object type. FIG. 20B shows a zoomed-in view of sensor 2004 from FIG. 20A. FIG. 20B also shows a zoomed-in view of light 2010, which is paired with sensor 2004 and is configured to provide more light on the objects that are being sensed by sensor 2004 to improve the resolution of the images captured by sensor 2004.

Figure 21:
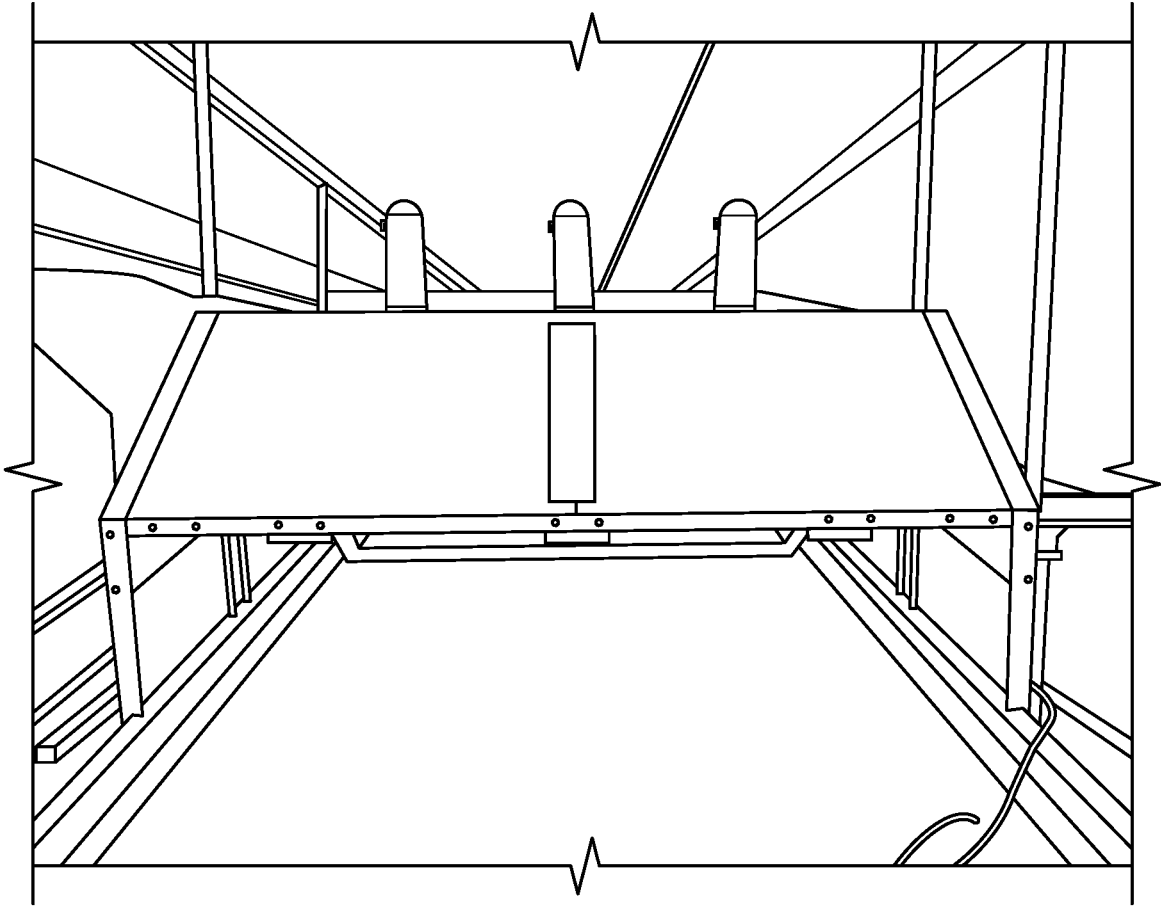
FIG. 21 shows an example of three co-located sensors with at least partially overlapping fields of view that span the width of a conveyor belt below.

FIG. 21 shows an example of three co-located sensors with at least partially overlapping fields of view that span the width of a conveyor belt below.

While the example co-located sensors shown in FIGS. 20A, 20B, and 21 above show co-located sensors that are arranged in a row and pointing in the same direction, in other examples, co-located sensors may be arranged into a row but pointing in different directions or arranged not in a row and pointing at one or more of the same objects but from different angles.

Figure 22:
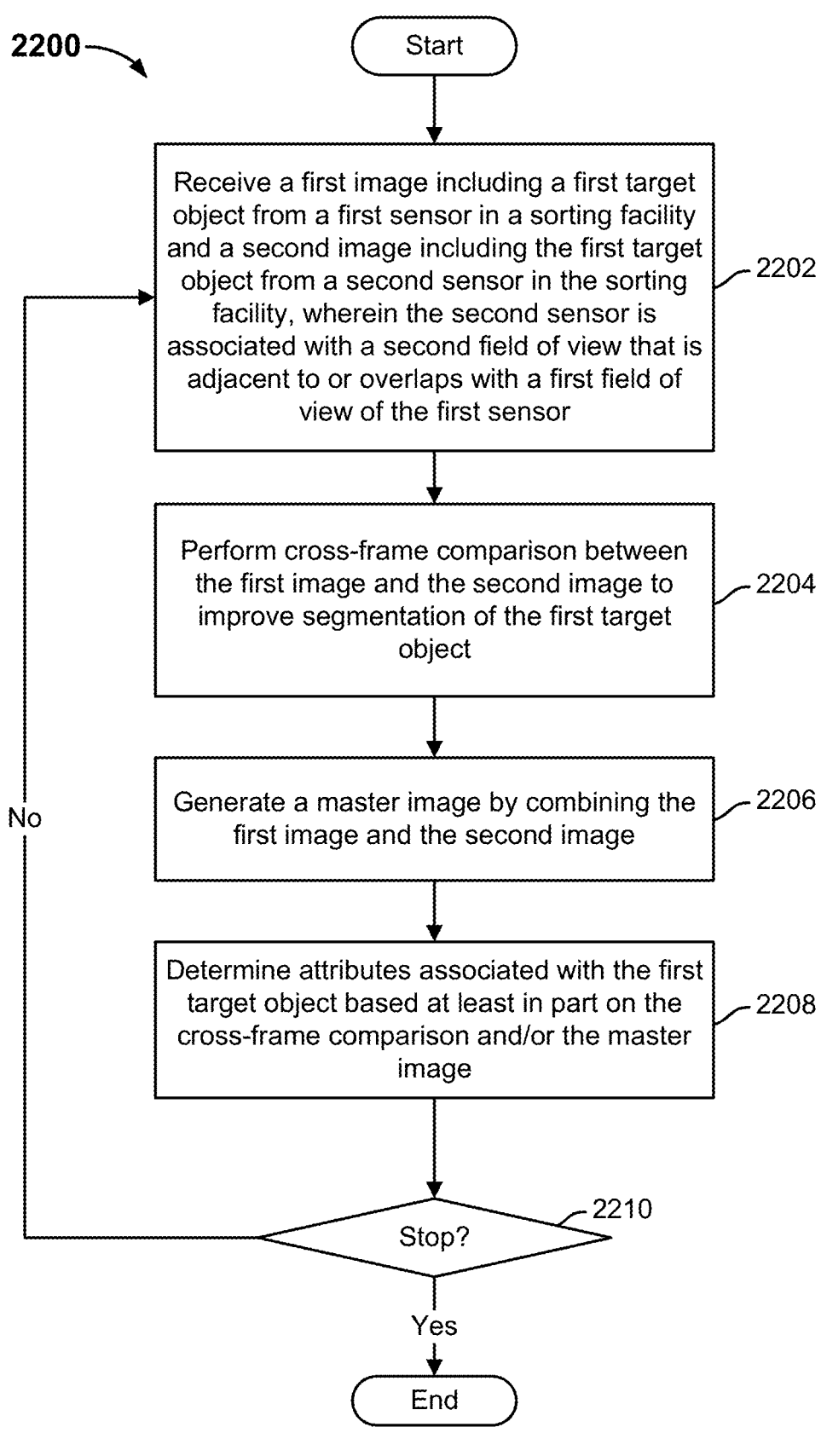
FIG. 22 is a flow diagram showing an example process for evaluating images captured by co-located sensors in accordance with some embodiments.

FIG. 22 is a flow diagram showing an example process for evaluating images captured by co-located sensors in accordance with some embodiments. In some embodiments, process 2200 may be implemented at an MCS such as the example MCS described in FIG. 6. In some embodiments, process 1900 of FIG. 19 may be implemented using process 2200.

At 2202, a first image including a first target object is received from a first sensor in a sorting facility and a second image including the first target object including the first target object is received from a second sensor in the sorting facility, wherein the second sensor is associated with a second field of view that is adjacent to or overlaps with a first field of view of the first sensor. In some embodiments, the sensors are vision sensors. In some embodiments, the sensors are arranged in a row like an array. In some embodiments, the sensors are not arranged in an array but in different positions so as to capture at least some of the same objects but from different angles. For example, a first co-located sensor can be placed overhead a conveyor belt and pointed downwards, a second co-located sensor can be placed on one side of the conveyor belt and pointed towards the opposite side of the belt, and a third co-located sensor can be placed on the other side of the conveyor belt and pointed towards the opposite side of the belt. When the co-located sensors capture images close to them, the resulting images are likely to include overlapping objects but with each image showing a different view of each overlapping object depending on the angle of the respective sensor.

At 2204, cross-frame comparison is performed between the first image and the second image to improve segmentation of the first target object. One example technique to distinguish objects from each other is to perform cross-frame comparison between the images obtained from co-located sensors to refine object segmentation (more effectively differentiate highly overlapped/occluded objects from one another). This cross-frame comparison may come in many embodiments. In one such embodiment, the images of two adjacent cameras are stitched together to provide a larger effective field of view, enabling better identification of partially out of frame or occluded items. In another embodiment, the two sensors are placed at different locations, and the movement of the material allows for different imaging of the same object, improving identity resolution of the item in question. In another embodiment, multiple successive frames from the same sensor may show the target object with varying levels of occlusion, lighting, or other environmental differences, enabling better identity resolution. In another embodiment, the sensors in question may have different imaging qualities, such as additional spectra, resolution, or latencies, allowing for comparisons of the target object with different amounts of information, leading to more accurate identity resolution.

At 2206, a master image is generated by combining the first image and the second image. The first image and the second image can be stitched together to form a panorama master image. Where the first and second sensors are arranged linearly across the width of the conveyor belt (e.g., as shown in FIGS. 20A and 20B), the images from the sensors can be stitched together to provide a high-resolution panorama image of the objects across the entire width of the belt. Where the first and second sensors are pointing at the objects on the conveyor belt at different angles, the images from the sensors can be stitched together to provide a multidimensional (e.g., three-dimensional (3D)) panorama image. One advantage of a 3D panorama image is the ability to provide depth information such as, for example, the height of each recognized object on the conveyor belt. Another advantage of the 3D panorama image is to provide more visibility to an object for which a portion may have been occluded by a different object in the first image but that portion was visible (not occluded) in the second image and as such, the resulting stitched together master image may show the object without the occlusion that would have been present in the first image alone.

At 2208, attributes associated with the first target object are determined based at least in part on the cross-frame comparison and/or the master image.

In some embodiments, the machine learning (e.g., neural network) models that are used by the MCS have been trained on master (e.g., high resolution and/or 3D panorama) images that have been stitched together from images captured close in time by co-located sensors. In some embodiments, the machine learning models have also been trained on cross-frame comparisons between images captured close in time by co-located sensors. Put another way, the machine learning models that are used by the MCS are configured to recognize objects within master images and/or based on cross-frame comparisons. For example, given the master images' higher resolution and/or removal of former occlusions that were present in individual images, the MCS can perform more robust object detection and characterization using master images than from the individual images prior to their combination into the master images. As a result, the MCS can use the master image to better identify the attributes (e.g., location, material type, object type, mass, condition, etc.) of an object that is present within the master image, which would enable the MCS to instruct a downstream sorting device to perform a potentially more effective sorting operation on the object. For example, the more accurate that the MCS can determine the attributes of the object, the more accurate that the MCS can instruct a downstream sorting device to perform a sorting operation with sorting parameters (e.g., the surface of the object to engage, the number of air jets to fire, etc.) that is customized for capturing that particular object. In a specific example, where a master image or a cross-frame comparison reveals a portion of an object that was previously occluded in one of the individual images that was stitched to form the master image, the MCS can evaluate the formerly occluded surface/portion of the object as a possible surface along which the sorting device should engage (e.g., emit a suction force or a positive airflow) with the object to improve the probability of its capture.

At 2210, it is determined whether images from the first sensor and the second sensor are to be continued to be evaluated. In the event that images from the first sensor and the second sensor are to be continued to be evaluated, control returns to 2202. Otherwise, in the event that images from the first sensor and the second sensor are not to be continued to be evaluated, process 2200 ends.

While the examples described above provide examples of co-located sensors as vision sensors, in other examples, co-located sensors may include non-vision sensors such as x-ray, radar, or infrared (or any other hyperspectral technique) sensors for sensing through occluded objects to detect density and material properties behind visually detected objects.

In some embodiments, the success or failure of sorting operations that are performed by sorting devices that were instructed based on the MCS's (e.g., an ML visions subsystem's) analysis of the master image can be determined using the auditing/QC systems described above (e.g., with FIG. 3, for example). For example, if the capture success rate associated with sorting operations that were performed based on the machine learning determined object characterization from master images that were generated from individual images captured by a set of co-located sensors falls below a threshold, then an action can be performed. A first example of such an action is to retrain the machine learning model that was used to detect objects within the master images (e.g., using training data comprising master images that are annotated with object locations and attributes). A second example of such an action is to update the techniques that are used to stitch two or more images captured by co-located sensors into master images (e.g., to better improve cross-frame comparisons).

Figure 23:
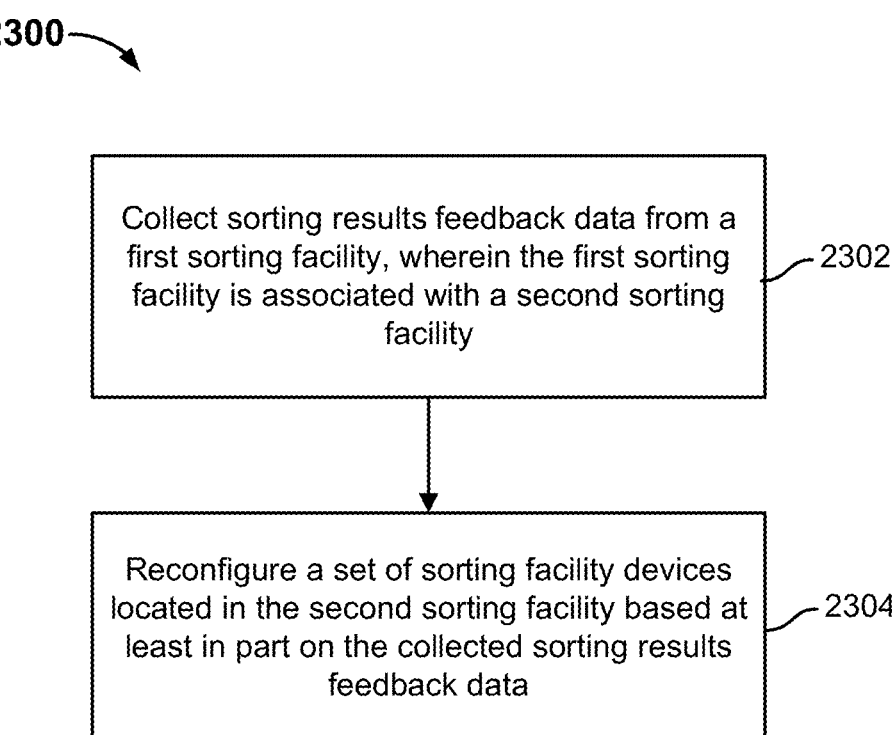
FIG. 23 is a flow diagram showing an embodiment of a process for using sorting results feedback data collected from a first sorting facility to reconfigure the devices of a second sorting facility.

FIG. 23 is a flow diagram showing an embodiment of a process for using sorting results feedback data collected from a first sorting facility to reconfigure the devices of a second sorting facility. In some embodiments, process 2300 may be implemented at central MCS 102 of FIG. 1. In some embodiments, process 2300 may be implemented at an MCS such as the example MCS described in FIG. 6.

At 2302, sorting results feedback data is collected from a first sorting facility, wherein the first sorting facility is associated with a second sorting facility. In some embodiments, two or more sorting facilities may be part of one logical set, in that the sorting results (e.g., performance) of one sorting facility in the set could prompt the reconfiguration of the sorting facility devices of another sorting facility within the same logical set. For example, the two or more sorting facilities of one logical set are controlled by the same central MCS. In some embodiments, each of the first and second sorting facilities can be implemented using the example sorting facility described in FIG. 2.

In one example configuration, the logical set comprises sorting facilities that operate in parallel but could benefit from the performance/sorting results data that is collected at another sorting facility. For example, parallel sorting facilities that are part of one logical set may share a common attribute such as, for example, being located within the same geographical region, sharing similar facility layouts, and receiving input materials from at least some of the same sources (e.g., suppliers). In this parallel sorting facilities configuration, the central MCS could aggregate performance/sorting results data received from one or more sorting facilities in the logical set and then use the aggregated performance/sorting results data to reconfigure the devices in another sorting facility in the set.

In some embodiments, the logical set comprises sorting facilities that operate in serial or in a "hub and spoke" architecture in which one or more sorting facilities each performs the role of a "satellite" (or also sometimes referred to as a "spoke" or "pre-sorting" facility) and another sorting facility performs the role of the "main" (or also sometimes referred to as a "hub") sorting facility. In some embodiments, each satellite sorting facility is configured to perform a coarse sort through a material stream to remove as much of the residue (non-target objects) from the material stream and the resulting pre-sorted materials (pre-sorted bales) from the satellite sorting facility will include mostly desirable (target) objects that will then be transported to a main sorting facility, which is configured to perform additional sorting on the bales (e.g., to separate different material types of target objects into different bunkers) from the satellite sorting facility. The output bales/sorting results from a satellite facility become high-quality infeed to the main sorting facility and results in both an overall efficiency improvement and reduction in the cost of baling target materials. In this serial sorting facilities configuration, the central MCS could obtain performance/sorting results data provided by a satellite sorting facility and use it to reconfigure the devices in the main sorting facility or vice versa.

At 2304, a set of sorting facility devices located in the second sorting facility is reconfigured based at least in part on the collected sorting results feedback data. Examples of aggregated performance/sorting results data in this parallel sorting facilities configuration may include the optimized bale material compositions associated with materials from a particular source, the optimal device configurations that have been determined via stochastic analysis, the historical device configurations that were used to achieve the target sorting metrics prescribed by a bale recipe, and/or the characteristics of historical bale output. For example, in the parallel facilities configuration, the aggregated performance/sorting results data from one or more source sorting facilities can be used to reconfigure the components (e.g., ML vision subsystems and corresponding sorting devices, the conveyor devices, the baler system) of a destination facility to match the device configurations associated with the aggregated performance/sorting results data to match the desirable (e.g., optimized) performance at the source sorting facilities.

Examples of performance/sorting results data in this serial ("hub and spoke" architecture) sorting facilities configuration may include the detected material compositions with bales that are produced by a satellite sorting facility and detected material compositions with bales that are produced by a main sorting facility. For example, in the serial facilities configuration, the aggregated performance/sorting results data from a satellite sorting facility can be used to reconfigure the components (e.g., ML vision subsystems and corresponding sorting devices, the conveyor devices, the baler system) of a main sorting facility so that the devices of the main sorting facility can be optimized to sort through the material characteristics of the infeed material that is anticipated from the satellite sorting facility.

In process 2300, the devices of the second (e.g., destination) sorting facility can be reconfigured based on the performance/sorting results data received from the first (e.g., source) sorting facility using any of the reconfiguration techniques described herein. Some specific examples of reconfiguration of devices at the second sorting facility may include the updating of the parameters (e.g., target object criteria, suppression criteria) used by sorting facilities and the allocation of which and how many bunkers to hold captured materials of which material type.

Figure 24:
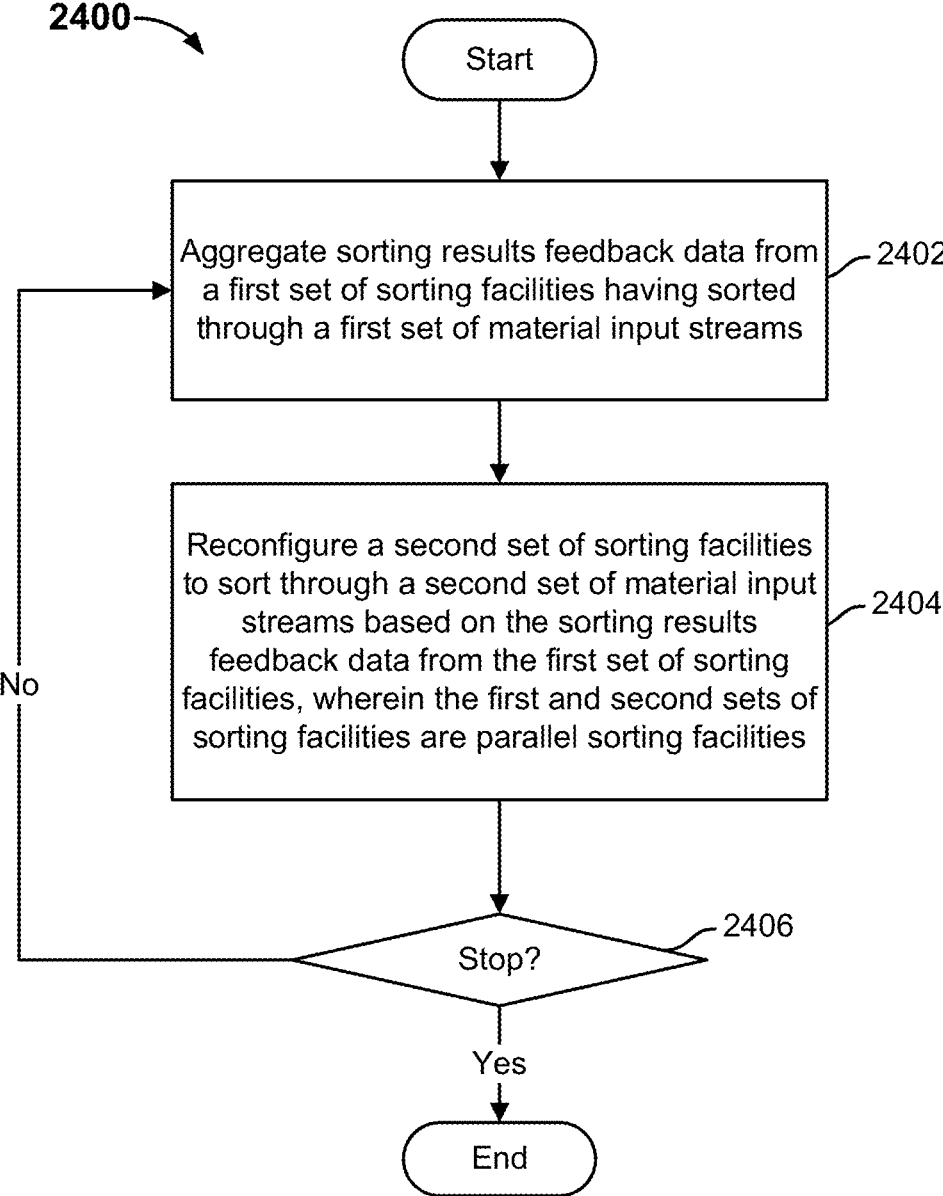
FIG. 24 is a flow diagram showing an example process for using sorting results feedback data aggregated from a first set of sorting facilities to reconfigure the devices of a second set of sorting facilities in accordance with some embodiments.

FIG. 24 is a flow diagram showing an example process for using sorting results feedback data aggregated from a first set of sorting facilities to reconfigure the devices of a second set of sorting facilities in accordance with some embodiments. In some embodiments, process 2400 may be implemented at central MCS 102 of FIG. 1. In some embodiments, process 2400 may be implemented at an MCS such as the example MCS described in FIG. 6.

Process 2400 describes an example process in which the sorting results feedback data aggregated from a first set of sorting facilities can be used to reconfigure another set of sorting facilities that operate in parallel to the first set of sorting facilities.

In some embodiments, Sorting Facilities 1 through N of FIG. 1 provide an example configuration of parallel sorting facilities that may logically be part of a set and may be physically remote to each other but collectively managed by central MCS 102 in the cloud.

At 2402, sorting results feedback data is aggregated from a first set of sorting facilities having sorted through a first set of material input streams. As mentioned above, in some embodiments, a set of sorting facilities may be physically remote from each other but included in a logical set. In some embodiments, the sorting facilities in the logical set are parallel to each other in that they can concurrently sort through different input material streams. However, given that the parallel sorting facilities can be collectively managed by a central MCS (e.g., central MCS 102 of FIG. 1), the central MCS has a multi-facility awareness and can share the sorting results/performance feedback data from some of the sorting facilities in the set to the benefit of some other sorting facilities in the set.

In a first example, the sorting results feedback data that is aggregated from the first set of sorting facilities may include the device configurations that have been determined by a facility to optimize the sorting results associated with sorting the input materials obtained from a particular source (e.g., using a process such as process 1300 of FIG. 13). In a second example, the sorting results feedback data that is aggregated from the first set of sorting facilities may include the jam remediation actions that have been determined by a facility to remove a detected jam within a facility (e.g., using a process such as process 800 of FIG. 8). In a third example, the sorting results feedback data that are aggregated from the first set of sorting facilities may include the device configurations that have been determined by a facility to generate bales that meet a particular bale recipe.

At 2404, a second set of sorting facilities to sort through a second set of material input streams is reconfigured based on the sorting results feedback data from the first set of sorting facilities, wherein the first and second sets of sorting facilities are parallel sorting facilities. The aggregated sorting results feedback data are used to reconfigure the second set of sorting facilities immediately or in response to a relevant event that is detected at the second set of sorting facilities. Returning to the first example described above, if the sorting results feedback data includes the device configurations that have been determined by a facility to optimize the sorting results associated with sorting the input materials obtained from a particular source, then the second set of sorting facilities can be reconfigured to match those device configurations in response to a detected event indicating that input material is to be received from the source. Returning to the second example described above, if the sorting results feedback data includes the jam remediation actions that have been determined by a facility to remove a detected jam within a facility, then the second set of sorting facilities can be reconfigured to employ those jam remediation actions in response to a detected jam. Returning to the third example described above, if the sorting results feedback data includes the device configurations that have been determined by a facility to generate bales that meet a bale recipe, then the second set of sorting facilities can be reconfigured to employ those device configurations in response to a (e.g., operator input) selection to implement that bale recipe.

At 2406, it is determined that at least some sorting facilities are to be reconfigured based on the sorting results feedback data from some other parallel sorting facilities. In the event that at least some sorting facilities are to be reconfigured based on the sorting results feedback data from some other parallel sorting facilities, control returns to 2402. Otherwise, in the event that at least some sorting facilities are not to be reconfigured based on the sorting results feedback data from some other parallel sorting facilities, process 2400 ends.

Figure 25:
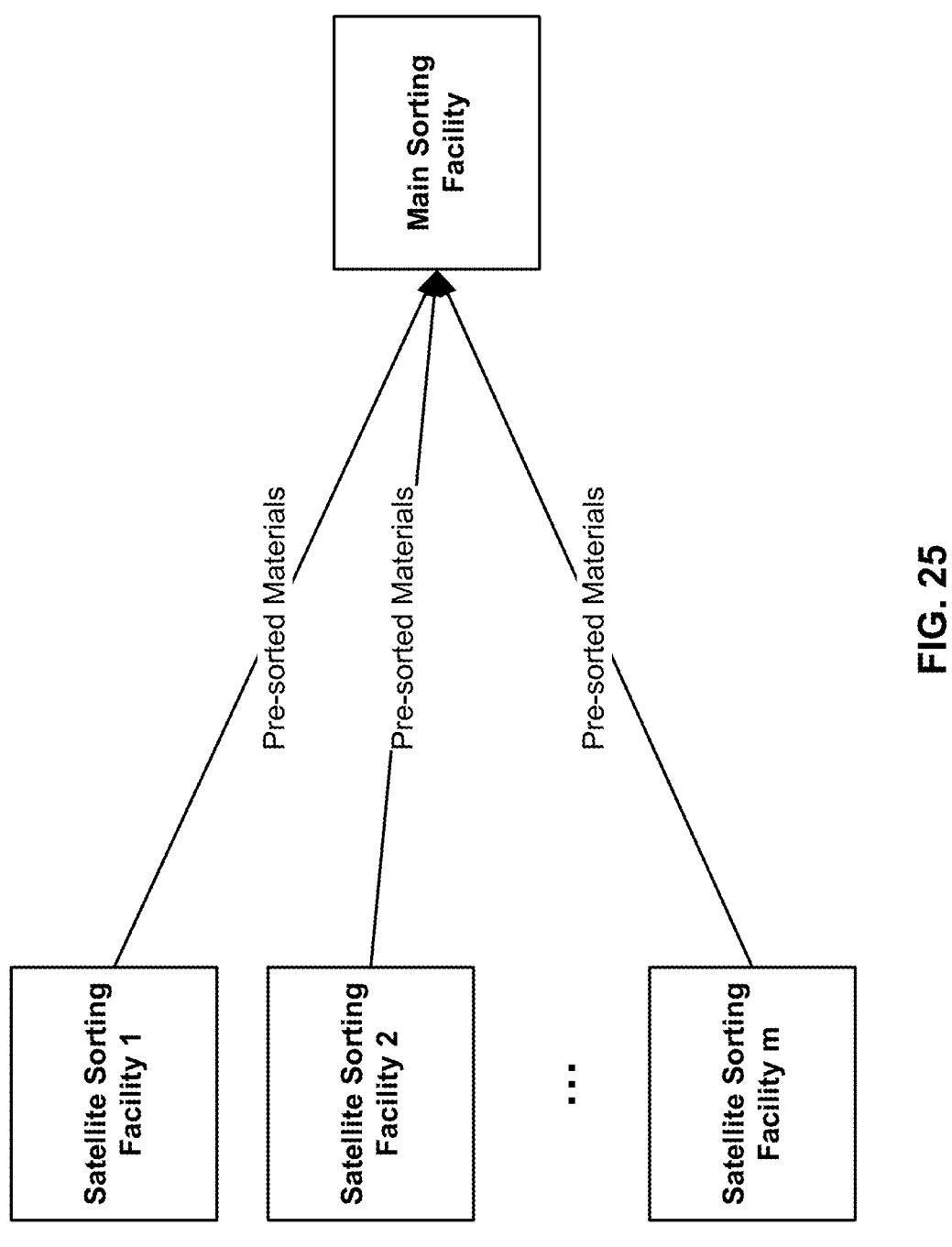
FIG. 25 is a diagram showing an example configuration of serial sorting facilities arranged in a "hub-and-spoke" architecture in accordance with some embodiments.

FIG. 25 is a diagram showing an example configuration of serial sorting facilities arranged in a "hub-and-spoke" architecture in accordance with some embodiments. In some embodiments, a main ("hub") sorting facility as described herein is complemented with one or more separate pre-sorting ("spoke" or "satellite") facilities. Relying on less sophisticated pre-sorting components (e.g., legacy systems) often results in infeed material of varying quality levels, combined with potentially excessive amounts of undesirable material. Further, the cost of shipping the undesirable material to the main facility decreases the value of the desirable commodities (e.g., with x % undesirable material the shipping cost per unit of target commodity is increased by x %) that it is shipped with. As such, in some embodiments, each of one or more satellite sorting facilities is configured to provide a preliminary sort through a set of raw input materials and then, the pre-sorted output from each satellite facility is transported (e.g., by one or more trucks) to a main sorting facility for a subsequent, more refined sorting process. For example, the preliminary sort will remove at least some of the residue from the raw input materials and, optionally, separate the one or more desired/target material types into separate bales. A first advantage of pre-sorting the material at a satellite facility is to reduce the amount of residue that is needed to be transported to the main facility and therefore, reduces the cost of shipping/transporting the desirable commodities from the satellite facility to the main facility. A second advantage of pre-sorting the material at a satellite facility is to improve the quality of the infeed at the main facility, which increases the efficiency of the sorting at the main facility by providing the main facility with infeed that has a higher purity rate than if the material had not been pre-sorted.

In some embodiments, each of the main sorting facility and the satellite facilities may implement an intelligent, reconfigurable sorting facility such as the example sorting facility as described in FIG. 2. In some embodiments, while the main sorting facility may implement as an intelligent, reconfigurable sorting facility such as the example sorting facility as described in FIG. 2, at least some of the satellite facilities may implement a reduced functionality version of the reconfigurable sorting facility (e.g., to reduce the cost associated with setting up each of such satellite facilities). Also, due to the lower cost of the setting up and/or operating each satellite facility in comparison to setting up and/or operating each main facility, multiple satellite facilities could be set up to pre-sort materials that will be transported to the same main facility. In various embodiments, each of the satellite sorting facilities is configured to perform a relatively coarser sort on input materials than the type of sorting that the main sorting facility is to perform on the already pre-sorted materials. For example, one way for a satellite facility to perform a less refined sort than the main facility is to have the sorting devices at the satellite facility use more tolerant suppression criteria (which will result in a higher risk of non-target objects also being captured) for firing on target objects than what is used by the sorting devices at the main facility. Furthermore, in some embodiments, each satellite may be physically located proximate to the source of the raw input materials. Examples of sources of raw input materials include a landfill or a plant for receiving Municipal Solid Waste. The main facility may be physically implemented at a location that is remote from the respective locations of the satellite facilities whose outputs are fed into the main facility.

In the example of FIG. 25, each of Satellite Sorting Facilities 1 through M processes raw input materials (e.g., waste). For example, each of Satellite Sorting Facility 1 through M performs preliminary sorting through raw waste and outputs pre-sorted bales containing individual target materials (e.g., each bale includes only one material type) or bales of combinations of all desired target materials (e.g., each bale includes a combination of multiple target material types such as paper, plastic, glass, etc.), which are then transported (e.g., via one or more trucks) to Main Sorting Facility. As a result, this "hub-and-spoke architecture" creates a high-quality infeed comprising the pre-sorted materials to Main Sorting Facility, and results in both an overall efficiency improvement and reduction in the cost of baling target materials.

While not shown in FIG. 25, a central MCS (e.g., central MCS 102 of FIG. 1) is in communication with Satellite Sorting Facilities 1 through M and Main Sorting Facility over a network (e.g., Internet) and is able to collectively manage the sorting facilities. In some embodiments, Sorting Facility 1 through M and Main Sorting Facility of FIG. 25 may be implemented by Sorting Facilities 1 through N of FIG. 1. The central MCS can collectively manage the logical set of multiple satellite sorting facilities and a main sorting facility by, for example, aggregating sorting results feedback data from a satellite sorting facility and using that to reconfigure the devices at the main sorting facility, or by obtaining sorting results feedback data from the main sorting facility and using that to reconfigure the devices at one or more sorting facilities, as will be described in FIG. 26 below.

Figure 26:
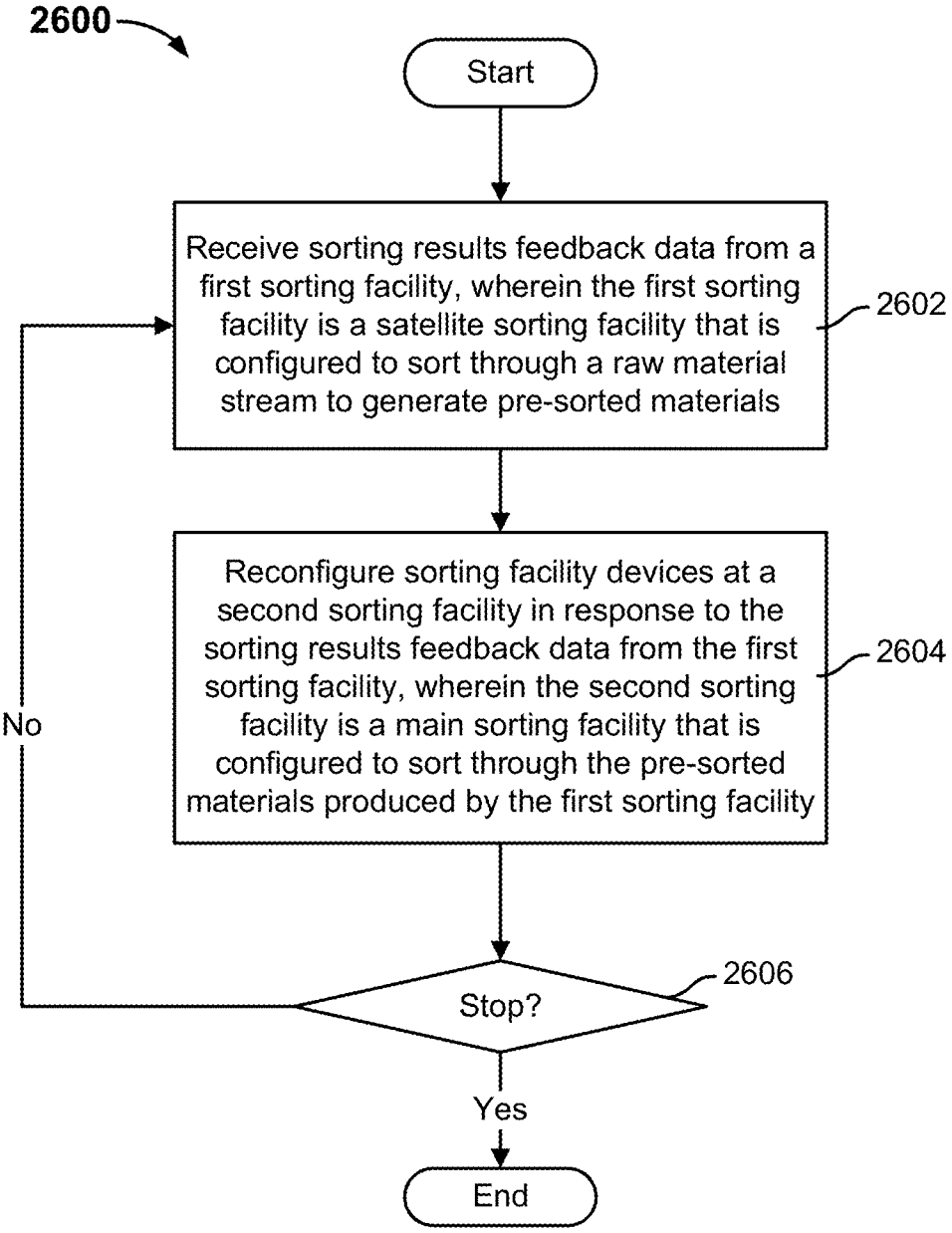
FIG. 26 is a flow diagram showing an example process for using sorting results feedback data from a satellite sorting facility to reconfigure the devices of a main sorting facility in accordance with some embodiments.

FIG. 26 is a flow diagram showing an example process for using sorting results feedback data from a satellite sorting facility to reconfigure the devices of a main sorting facility in accordance with some embodiments. In some embodiments, process 2600 may be implemented at central MCS 102 of FIG. 1. In some embodiments, process 2600 may be implemented at an MCS such as the example MCS described in FIG. 6. In some embodiments, process 2500 of FIG. 25 may be implemented using process 2600.

At 2602, sorting results feedback data is received from a first sorting facility, wherein the first sorting facility is a satellite sorting facility that is configured to sort through a raw material stream to generate pre-sorted materials. In some embodiments, the satellite facility is located near the source of the raw material stream. For example, the satellite facility may be located at a landfill or a location at which Municipal Solid Waste is received. In some embodiments, the satellite facility employs the control algorithms, flow calculations, ML vision subsystems, and sensors, etc., as the example sorting facility as described in FIG. 2, above. In some embodiments, the satellite facility includes fewer sorting devices and other components than the example sorting facility as described in FIG. 2 and therefore fits inside a much smaller enclosure/area footprint than that of a full main sorting facility. In some embodiments, specifically, because the satellite facility includes fewer series of sorting devices and/or potentially has no last chance sorting device and related recirculation conveyor device(s), the satellite facility is not able to make repeated (e.g., downstream) attempts at capturing the same target object in the material stream if the target object is not successfully captured by an upstream sorting operation and as a result, the satellite facility performs a coarser sort on its received raw input materials than compared to the main facility (e.g., the pre-sorting outputs have a lower purity rate than what could have been accomplished by the main facility had it sorted through the same materials). In some embodiments, the satellite facility includes preprocessing machinery (e.g., a reducer for shredding the raw input material and screens to filter out smaller objects/residue) that removes residue from the raw input materials. In some embodiments, the satellite facility includes preprocessing machinery (e.g., a reducer for shredding the raw input material and screens to filters out smaller objects/residue) in addition to sorting device(s) that perform "negative sorting" to remove residue from the raw input materials. In some embodiments, the satellite facility performs a coarser sorting through the raw materials by using less stringent suppression criteria in determining when a sorting operation should be performed to capture a target object. The result of using less stringent suppression criteria in determining when a sorting operation should be performed to capture a target object is that while more target objects may be successfully captured, more non-target objects/residue may also be inadvertently collected into a bunker as well.

Due to the object tracking, sorting operation auditing, and monitoring of objects that enter into a bunker or baler that is determined at the satellite facility (e.g., using techniques described herein), the sorting results/performance data of the sorting through raw input materials can be determined by the MCS. In one example, the sorting results/performance data of the sorting through raw input materials at the satellite facilities may include the material type composition of object bales produced by the satellite facility. In another example, the sorting results/performance data of the sorting through raw input materials at the satellite facilities may include the purity rate of target material types within a bale produced by the satellite facility.

At 2604, sorting facility devices at a second sorting facility are reconfigured in response to the sorting results feedback data from the first sorting facility, wherein the second sorting facility is a main sorting facility that is configured to sort through the pre-sorted materials produced by the first sorting facility. The pre-sorted bale(s) that the satellite facility has generated are physically shipped/transported to the main facility. In some embodiments, the main facility receives pre-sorted bales from one or more satellite facilities. In some embodiments, the main facility is configured to perform a more refined sort (e.g., than any of the satellite facilities) due to its sort design parameters as compared to the sort design parameters of any of the satellite facilities. For example, the sort design parameters of the main sorting facility as compared to a satellite facility include more sorting devices in series, more efficient facility layout, reversible conveyor belt directions, the addition of last chance sorting devices that help enable recirculation at the main facility, more effective sorting parameters, and/or more robust stringent sorting parameters (e.g., suppression criteria). Furthermore, in some embodiments, the main facility has more sorting devices in general (e.g., multiple sorting lines) than a satellite facility and can therefore provide greater sorting throughput.

Given the sorting results/performance data associated with the pre-sorted bale(s) that were produced by the satellite facility, the components of the main facility that physically receive the pre-sorted bale(s) can be correspondingly reconfigured to optimize or accommodate the sorting results/performance data associated with the pre-sorted bale(s).

In a first example, if the sorting results/performance data associated with the pre-sorted bale(s) indicates that the pre-sorted bale(s) include more material type 1 than the next most present material, then the (e.g., sorting parameters of) main facility can be reconfigured such that a greater proportion of its sorting devices are targeting material type 1 and that also, a greater proportion of its ML vision subsystems and sorting devices are configured to target material type 1, and bunkers are assigned to storing objects that are made of or otherwise chemically compatible with material type 1. In a second example, if the sorting results/performance data associated with the pre-sorted bale(s) specifies a particular purity rate that is lower than a target purity rate, then the main facility can be reconfigured such that its sorting devices are using more stringent suppression parameters in performing sorting operations in an effort to improve the purity rate of the bales that are produced at the main facility. In a third example, if the sorting results/performance data associated with the pre-sorted bale(s) from each satellite facility that feeds into a main facility specifies a particular material type breakdown, then a run schedule at the main facility can be generated for each given time (e.g., at which pre-sorted bale(s) from a particular satellite facility are expected to arrive at the main facility), which sorting parameters are to be used on which pre-sorted bales (e.g., produced by a corresponding satellite facility), etc.

At 2606, it is determined whether the sorting facility devices at the second sorting facility are to be continued to be reconfigured based on the sorting results feedback data from the first sorting facility. In the event that the sorting facility devices at the second sorting facility are to be continued to be reconfigured based on the sorting results feedback data from the first sorting facility, control returns to 2602. Otherwise, in the event the sorting facility devices at the second sorting facility are not to be continued to be reconfigured based on the sorting results feedback data from the first sorting facility, process 2600 ends.

While process 2600 describes an example process in which the sorting results feedback data from a satellite sorting facility is used to reconfigure devices at the main sorting facility, the reverse can be true as well. Put another way, in some embodiments, the sorting results feedback data from the main sorting facility can be used to reconfigure devices at the one or more satellite sorting facilities that feed pre-sorted materials to the main sorting facility. In some embodiments, the satellite facility is managed by a remote MCS, and all control algorithms, flow calculations, and ML vision subsystems provide similar capabilities as described herein. The MCS manages change control and software as described herein and may also dynamically alter the sorting parameters of the satellite facility. Such alterations may be selected, for example, at least in part based upon the operating status of a destination main sorting facility (for the sorted output of the satellite), and/or the operating status of other parallel satellite facilities. For example, a main sorting facility may be focusing its sorting efforts on a specific type of paper or cardboard. In the event that its production rates fall below a desired threshold, the MCS may instruct one or more satellite facilities to refine their target object parameters to prioritize the targeting of the desired material type (e.g., paper/cardboard). Alternatively, in the event that a first satellite sorting facility bales an excess (e.g., a greater than desired amount) of a desired material (e.g., PET plastics), a second satellite sorting facility may be instructed to reduce its targeting of such material (plastics). As described above, one advantage to this "hub and spoke" arrangement of sorting facilities is the ability to provide two-way feedback between a satellite and the main sorting facility via the cloud-centralized MCS and the ability to reconfigure a sorting facility in response to the received feedback. For example, the main facility can be better informed on the material types that are included in the objects that are received from the satellite facility and can therefore optimize its sorting parameters accordingly (such as described in process 2600 of FIG. 26). In a second example, the satellite facility can also adjust its sorting parameters in response to material types that are requested by the main facility.

Figure 27A:
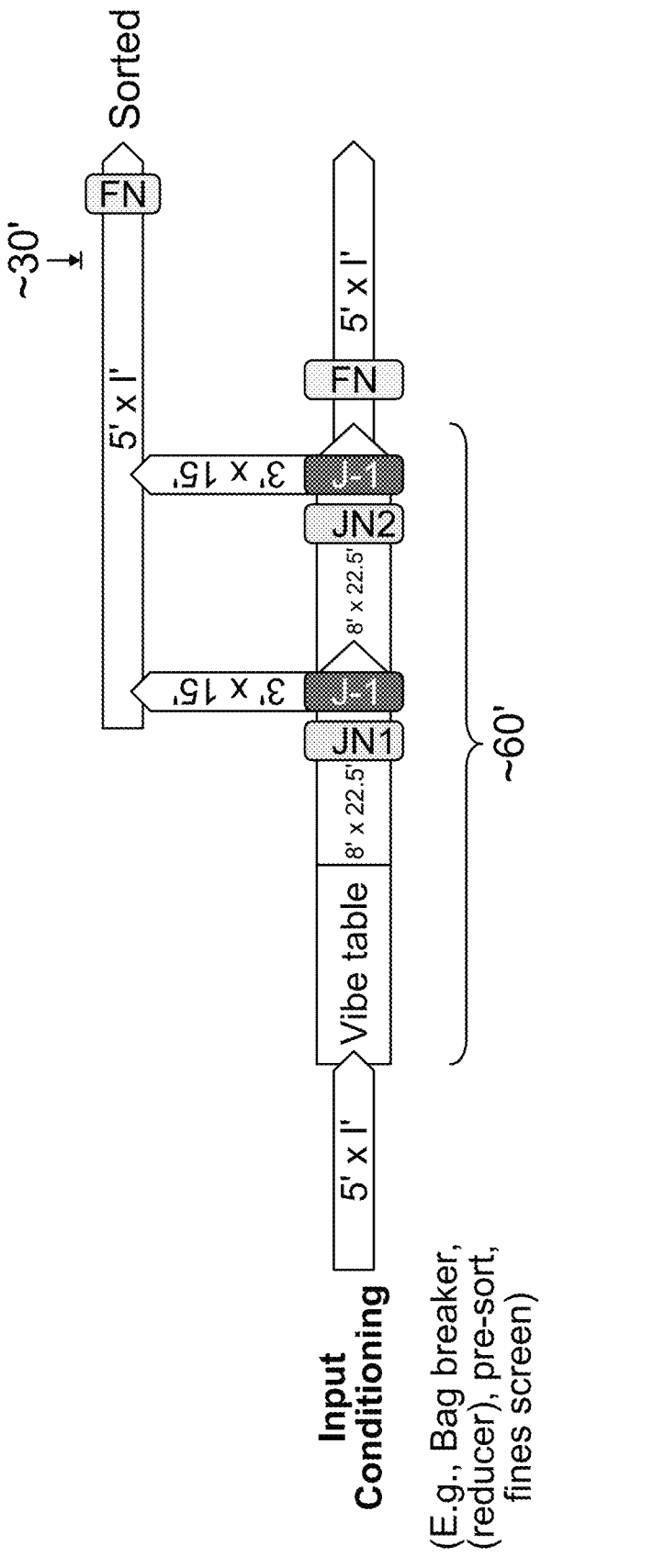
FIGS. 27A and 27B describe different example layouts of devices at a satellite sorting facility.
Figure 27B:
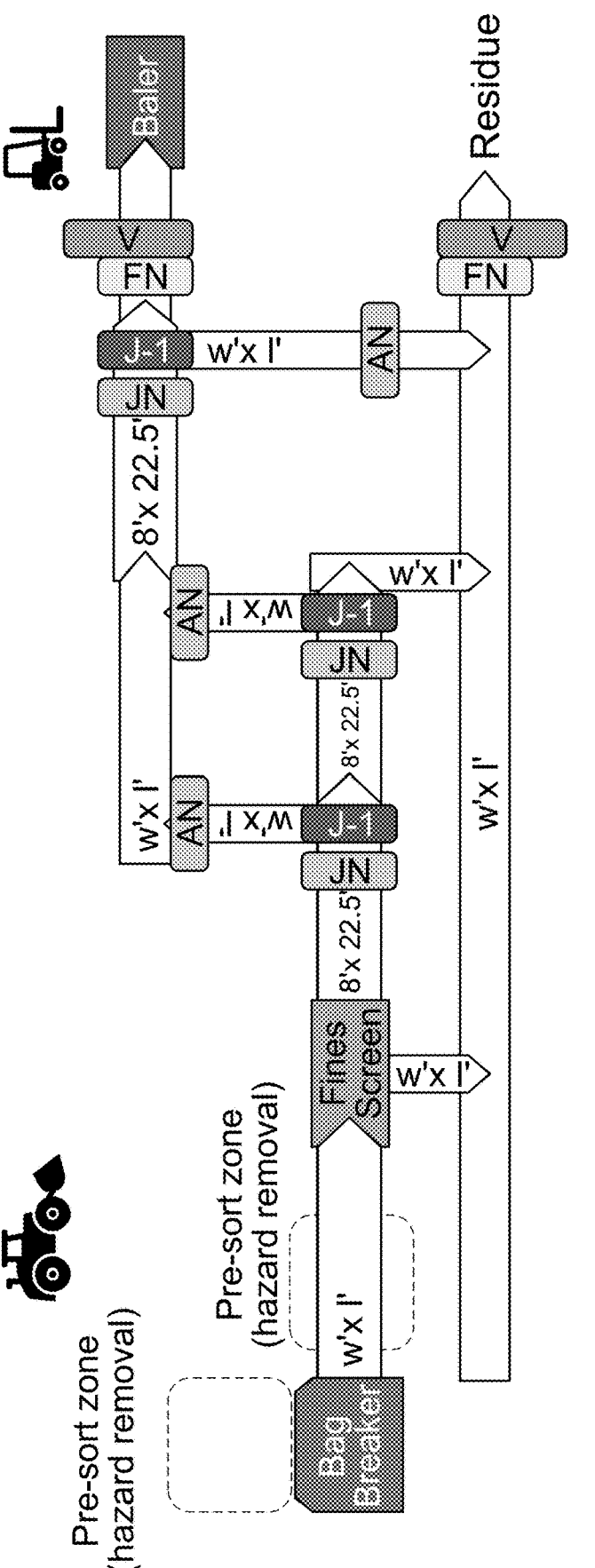

FIGS. 27A and 27B describe different example layouts of devices at a satellite sorting facility. FIG. 27A shows an example layout at a first example satellite sorting facility. Because the satellite facility is located at or near the source of raw input material (e.g., a landfill), little prior material sorting has been performed on the infeed material. At a first stage, the infeed material is preconditioned to remove obvious contaminants (e.g., fines, glass, metal) as shown in "Input Conditioning." An input conveyor (of any length) feeds the incoming material to a vibration table "Vibe Table" as shown in FIG. 27A. The vibration table causes the infeed material to be distributed uniformly across the width of a second conveyance device (shown as 8' wide by 22.5' long in the example of FIG. 27A). An ML vision subsystem is coupled to the sorting line, and comprises at least two ML vision cameras and associated ML processors. A first camera (JN1) is positioned above or alongside the belt to identify target objects, enabling a control system (coupled to the camera and air jet array sorting device, which are not shown) to command air jet array J-1 to sort specific objects as described above. The first camera JN1 is also coupled to a second control system, air jet array sorting, and ML camera (JN2) is located downstream of the first camera JN1 along the same sorting line. The second camera (JN2) identifies target objects missed by the first camera and/or the air jet array, but also may be alerted to target objects that cannot be targeted by the first air jet array. For example, an object may be identified by JN1, but cannot be targeted by the first air jet array (e.g., due to air jet limitations or neighbor suppression parameters, etc.). In this case, second camera JN2 may be provided with trajectory information to assist in relocating this missed target object and may then cause the second control system to fire upon that object using the second air jet array. Successfully sorted objects are diverted to a "sorted" belt, and proceed directly to a baling process (not shown). Residue objects (i.e., undesirable objects) remain on the main conveyor belt and proceed to the refuse area. In both cases, additional ML vision camera subsystems may be positioned along these conveyor belts, and used to audit the flow of mass. In some embodiments, mass flow is audited on the "sorted" line to provide the MCS with performance metrics regarding successful captures. Similarly, the mass flow of the refuse line is also recorded to validate throughput and success rates. The sorting system of the example of FIG. 27A is designed to be compact and to fit into a much smaller enclosure than that of a full sorting facility such as a main facility. For example, the entire satellite sorting system that is shown in FIG. 27A may fit in a facility that is less than 120'×60'. Multiple of the sorting line shown in FIG. 27A may be installed in bigger facilities.

In some embodiments, the satellite facility comprises modules that can be physically or logically altered to facilitate different sorting needs. In a modular satellite facility, the sorting devices (e.g., jets or other diverting mechanisms such as a robotic manipulator or "pushing" diverter) may be physically repositioned to change the sorting line flow. This may be facilitated with a track-mounted sorting device (i.e., it slides into a slot on the sorting line) or other detachable options including wheel mounted units. Similarly, conveyance devices may be movable, and the operator may choose to reposition the sorting devices or conveyances, or add or remove them from the sorting line. By way of example, a sorting line in a satellite facility may need to support more throughput, as it has a high proportion of desirable objects. In this case the operator may adjust the conveyance device and add a third vision camera and air jet array sorting device into the system, resulting in a higher number of captured objects. Alternatively, a facility may have consistently poor infeed material, and the operator may remove a sorting device and utilize it in a different facility.

As described elsewhere, the MCS may also dynamically reconfigure a satellite sorting facility by changing software configurations to achieve similar goals. For example, after a time period of operation the MCS may utilize mass flow measurements to alter ML vision and/or sorting parameters to increase the mass flow of desired objects.

FIG. 27B shows an example layout at a second example of a satellite sorting facility. As compared to the example satellite sorting facility that is shown in FIG. 27A, the example satellite facility of FIG. 27B includes more components to accomplish additional tasks focused on improving purity and throughput of desired materials. In this instantiation, material flows through an input screening process to tear large plastic films, remove hazardous materials, and screen fine materials (e.g., broken glass, metal, etc.). The "Residue line" is expanded to encompass the refuse from these new screening actions. Additional ML vision subsystems are also added to this system. Three additional ML vision subsystems (labeled "AN") are added to audit the effectiveness of the three sorting systems (performing Quality Control, as described above). These auditing systems measure sorting performance and provide feedback to the MCS, enabling the MCS to generate reports, alert the operator regarding performance issues, or dynamically adjust sorting parameters within the satellite facility to meet overall objectives.

FIG. 27B also shows the addition of two air blower units (labeled "V" in the diagram). The air blowers are used to further sort/remove lightweight materials (e.g., plastic film, newspaper) from the line, either for collection purposes or to discard as refuse. In FIG. 27B, such a blower is positioned prior to the baler, enabling the lightweight materials to be captured separately. One is also positioned before the output of the "Residue line," allowing these lightweight materials to be sorted out of the other refuse before discarding.

FIGS. 28 through 49 show example user interfaces that the MCS can present to a sorting facility operator.

Figure 28:
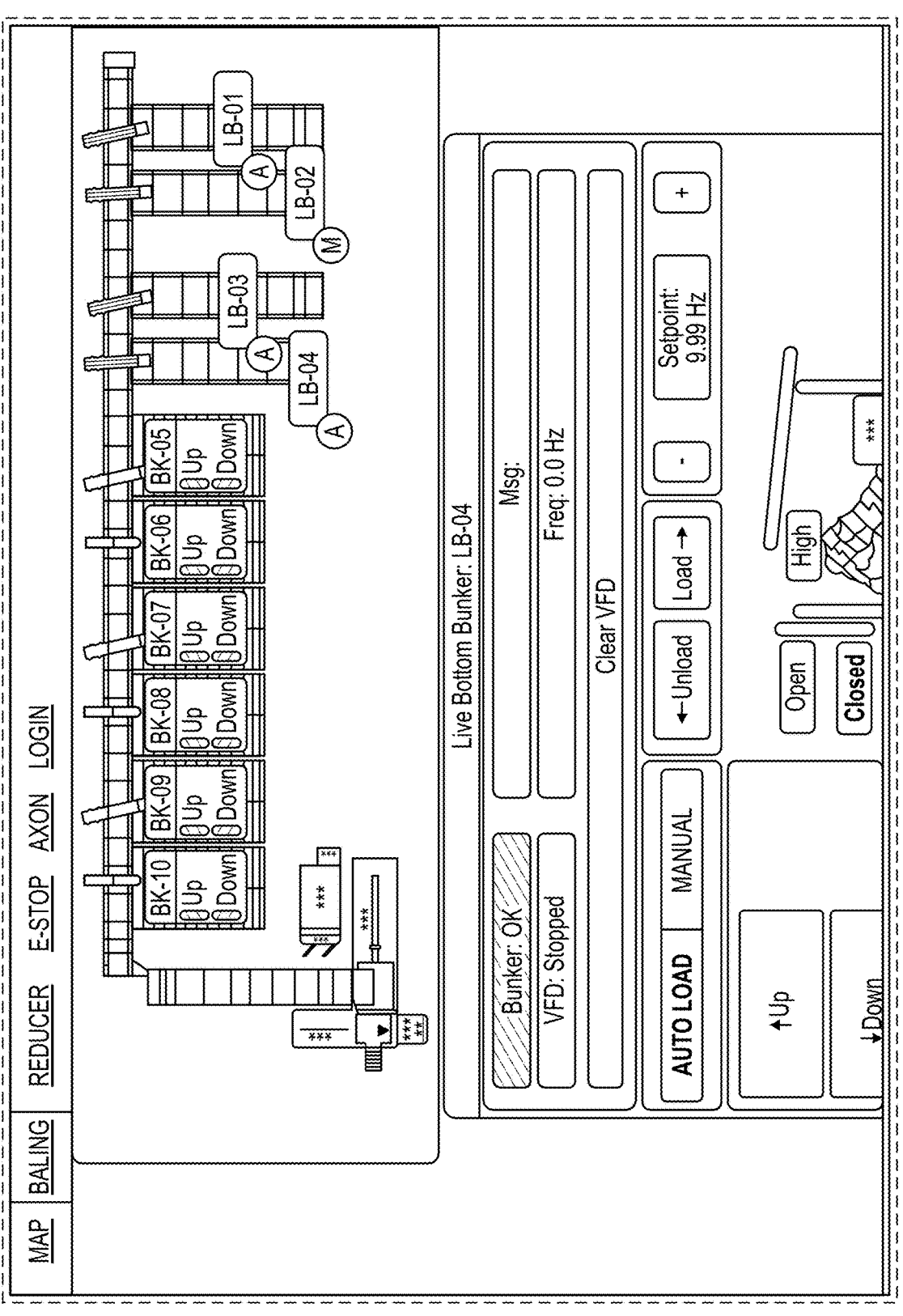
FIG. 28 is a diagram showing an example user interface that presents information related to baling at a sorting facility.

FIG. 28 is a diagram showing an example user interface that presents information related to baling at a sorting facility. The example user interface of FIG. 28 shows the status (e.g., such as whether the door was open or closed) of different bunkers (e.g. BK-10, BK-09, BK-08, BK-07, BK-06, BK-05, LB-04, LB-03, LB-02, and LB-01) within the facility and presents controls that an operator can use to trigger the emptying of a selected bunker such that the emptied contents would then be conveyed to a baler at the facility.

FIG. 29 is a diagram showing an example user interface that presents information related to a reducer at a sorting facility. In some embodiments, a "reducer" can be a device that is employed to reduce the size of infeed (e.g., by shredding the material into smaller pieces). The example user interface of FIG. 29 shows the status of different features of the reducer and presents controls that an operator can use to modify/view the configurations of the reducer (e.g., changing the operating speed, rotation pattern).

FIG. 30 is a diagram showing an example user interface that presents information related to the status of cords within a sorting facility. The example user interface of FIG. 30 shows the status of different cords associated with different locations within the facility. Each cord can be pulled to stop the processing within the facility (e.g., due to an emergency) and the example user interface of FIG. 30 shows for an operator whether any of such cords have been pulled and if so, where. In the specific example of FIG. 30, no cords have been pulled to stop the processing at the facility.

Figure 31:
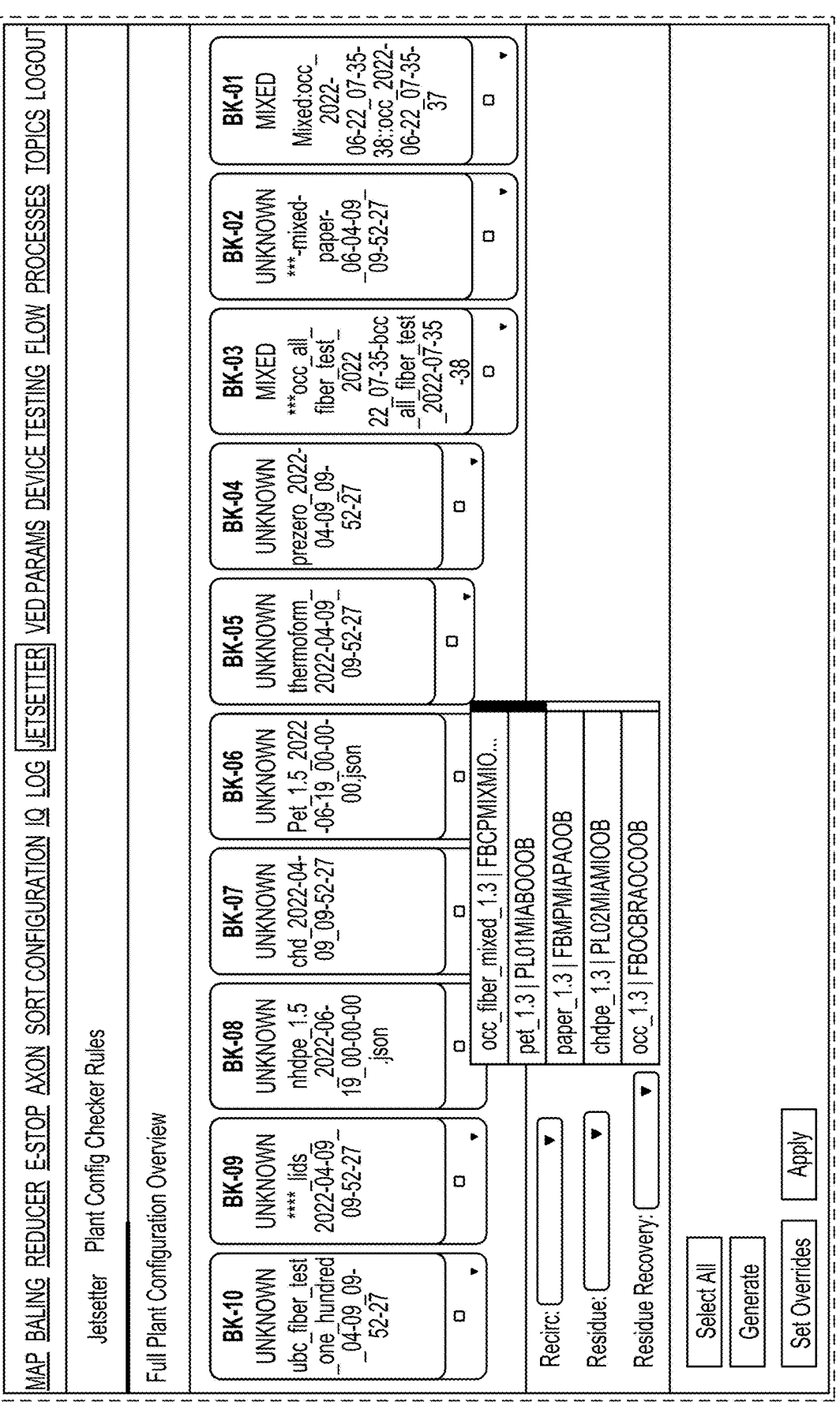
FIG. 31 is a diagram showing an example user interface that presents information related to configurations of bunkers within a sorting facility.

FIG. 31 is a diagram showing an example user interface that presents information related to configurations of bunkers within a sorting facility. The example user interface of FIG. 31 shows the one or more material types (identified by respective stock keeping units (SKUs)) of target objects that are configured to be deposited at each of several bunkers (BK-10, BK-09, BK-08, BK-07, BK-06, BK-05, BK-04, BK-03, BK-02, and BK-01). As shown in FIG. 31, bunker BK-10 is currently configured to receive target objects of SKU "ubc_fiber_test_one_hundred_04-09_09-52-27." An operator can use a user interface such as the example user interface of FIG. 31 to modify the material types/SKUs of captured target objects that are collected at a certain bunker, which would cause the upstream ML vision subsystems, sorting devices, and audit subsystems that capture target objects to be deposited into that bunker to be reconfigured to match the new target material types/SKUs. For example, if bunker BK-10 is reconfigured to instead receive target objects of SKU "mixed-paper," then the upstream ML vision subsystems, sorting devices, and audit subsystems that capture target objects that are deposited into bunker BK-10 would stop targeting target objects of SKU "ubc_fiber_test_one_hundred_04-09_09-52-27" and instead target objects of SKU "mixed-paper."

In another user interface that is not shown, the (e.g., reconfigurable) sorting configurations applied to each sorting device targeting the various bunkers can be provided. Note that each sorting device (e.g., air jet array) may target multiple object types (e.g., based on the desired bale recipe). In yet another user interface that is not shown, target object priorities can be displayed. For example, the target object priorities may display a corresponding priority (e.g., that is indicated as a numerical or text value) for each material type.

Figure 32A:
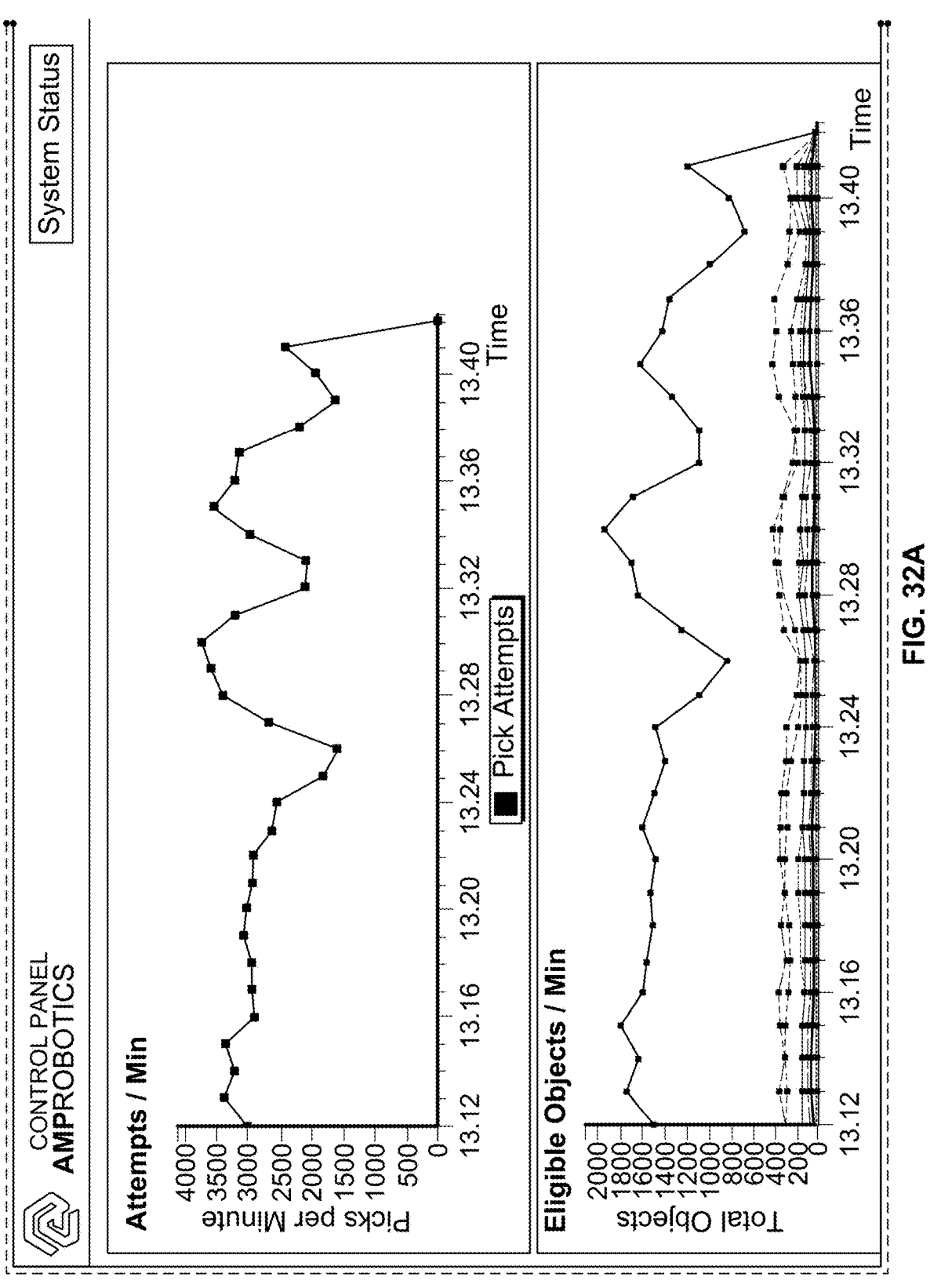
FIG. 32A is a diagram showing an example user interface that presents a first set of analytics at a sorting facility.

FIG. 32A is a diagram showing an example user interface that presents a first set of analytics at a sorting facility. The example user interface of FIG. 32A shows in the top plot, the number of sorting operation attempts ("picks") per minute over time, and shows in the bottom plot, the number of eligible target objects to be sorted per minute over time.

Figure 32B:
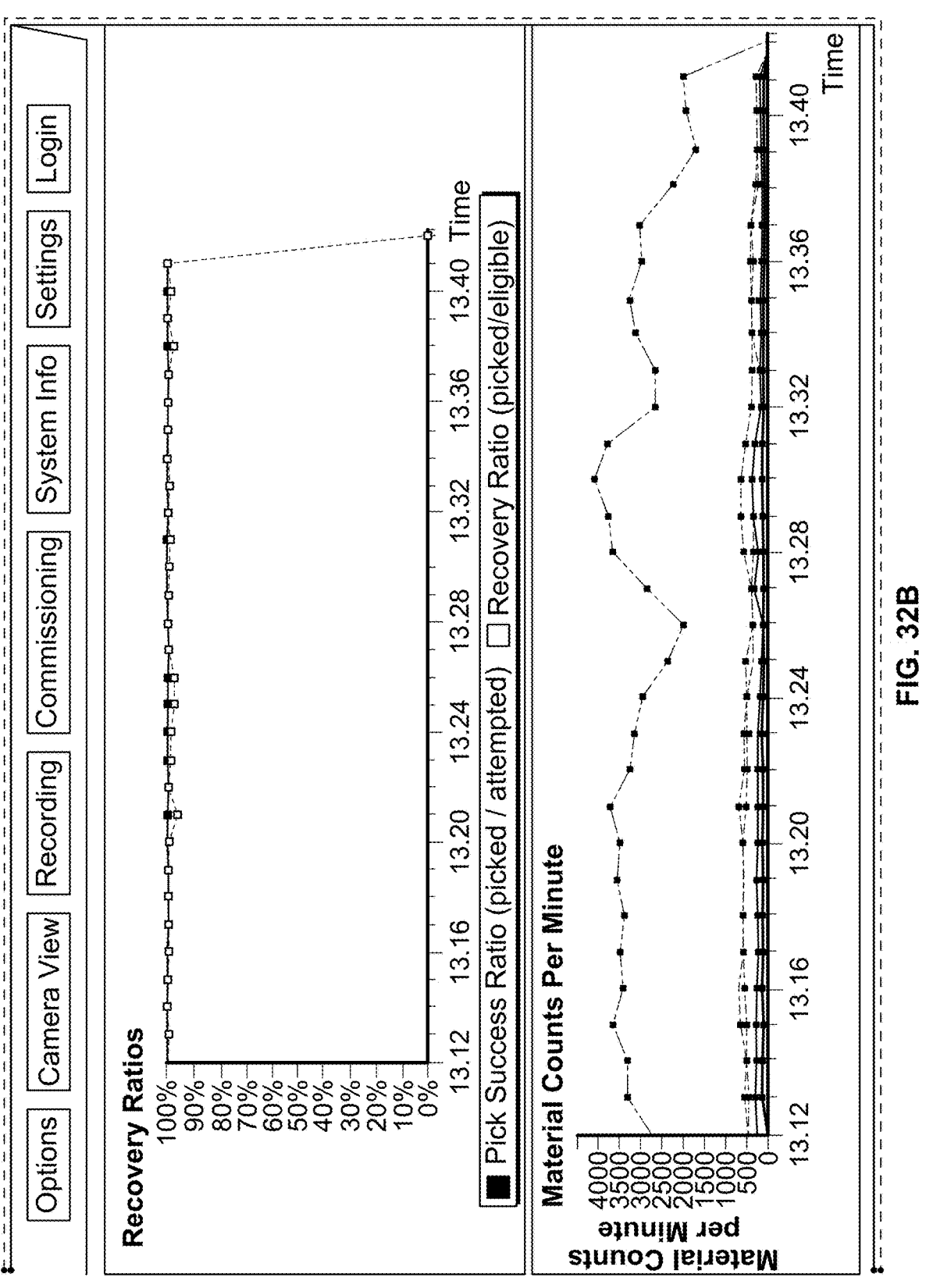
FIG. 32B is a diagram showing another example user interface that presents a second set of analytics at a sorting facility.

FIG. 32B is a diagram showing another example user interface that presents a second set of analytics at a sorting facility. The example user interface of FIG. 32B shows in the top plot, the sorting operation ("pick") success ratio and the recovery ratio over time, and shows in the bottom plot, the material counts per minute over time.

While not shown in FIGS. 32A and 32B, the detailed performance report for a single facility can also indicate overall baled value for a given period of time, recovery rate, uptime, infeed tons, baled tons, bunker tons, ferrous tons, and residue tons.

Figure 33:
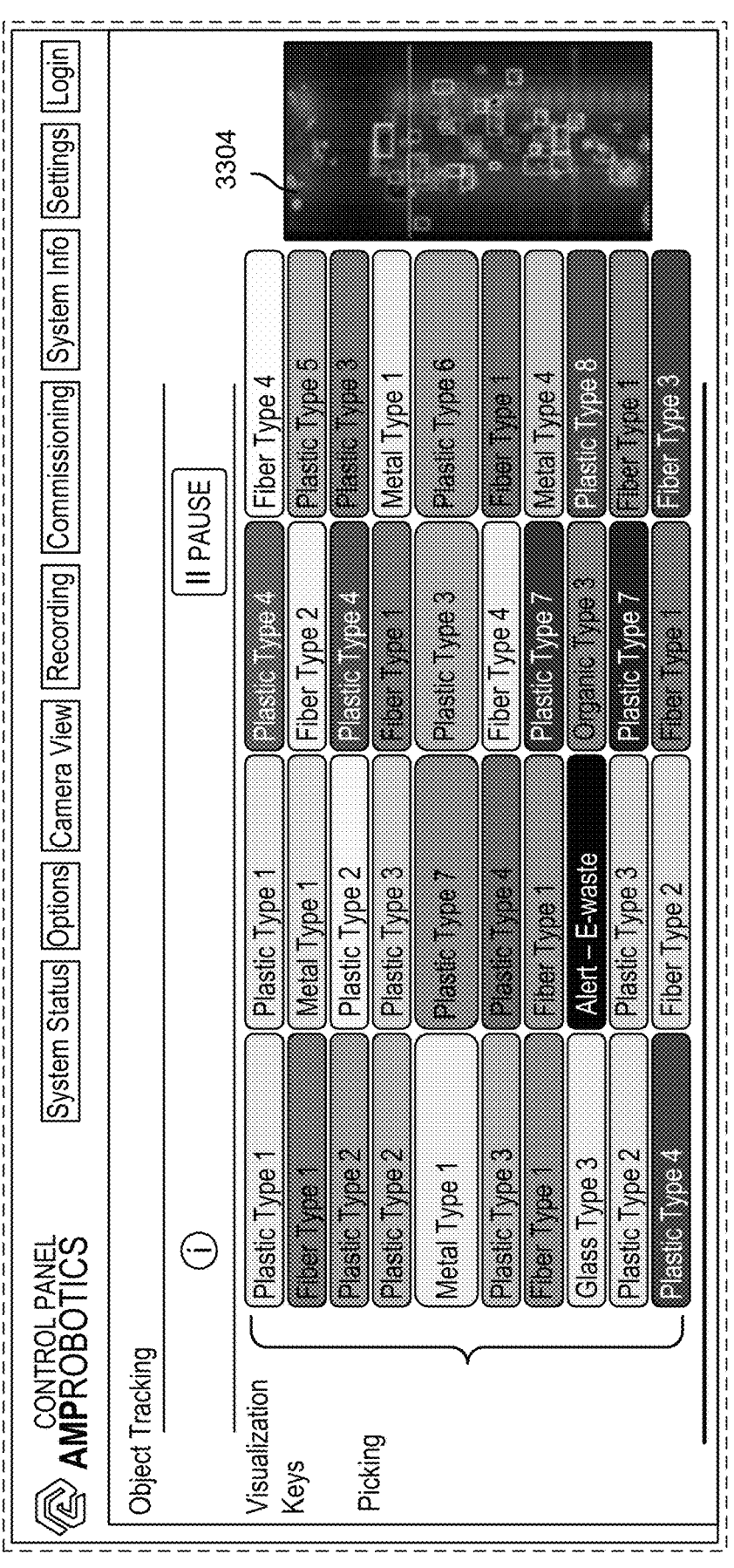
FIG. 33 is a diagram showing another example user interface that presents a real-time detection of objects within an image captured by a vision sensor.

FIG. 33 is a diagram showing another example user interface that presents a real-time detection of objects within an image captured by a vision sensor. The example user interface of FIG. 33 includes image 3304, which is an overhead image of objects on a conveyor device and that is captured by a vision sensor (e.g., camera) that is placed over the conveyor device. Image 3304 is evaluated by machine learning models that are trained to identify bounding boxes around each detected object that appears within image 3304 and also characterize each detected object into a corresponding material type. Each material type is associated with a different color ("visualization key"). Image 3304 is annotated with the determined bounding box around each detected object and where the bounding box is in the color corresponding to the respective object's determined material type.

Figure 34:
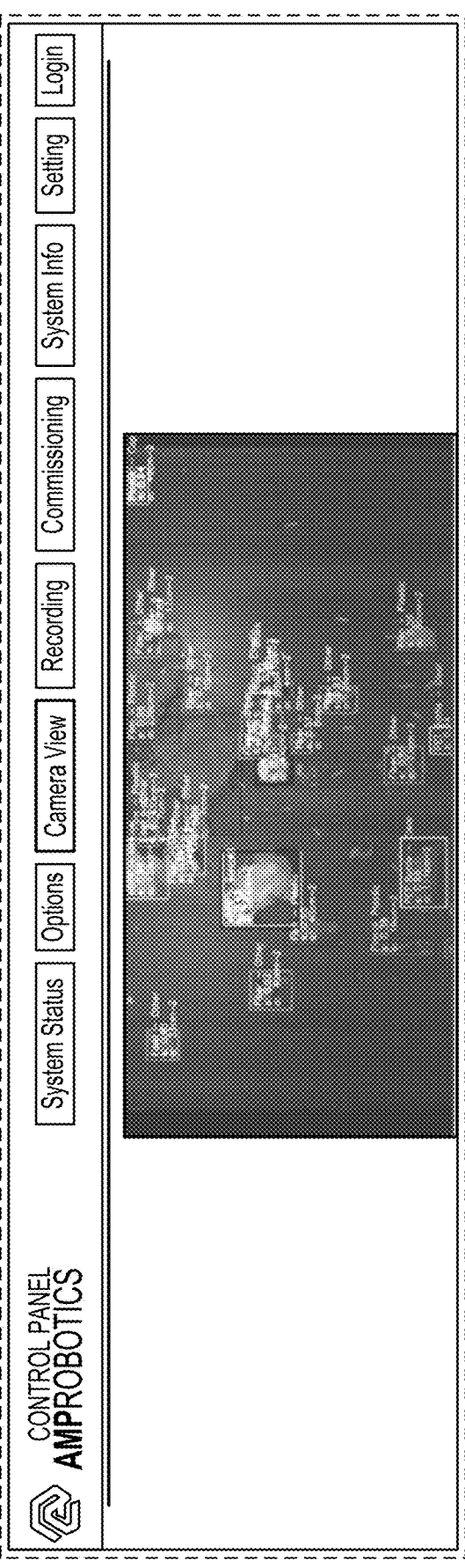
FIG. 34 is a diagram showing another example user interface that presents a real-time detection of objects within an image captured by a vision sensor.

FIG. 34 is a diagram showing another example user interface that presents a real-time detection of objects within an image captured by a vision sensor. Similar to image 3304 of FIG. 33, the example image of FIG. 34 has also been evaluated using machine learning and annotated with the determined bounding box around each detected object and where the bounding box is in the color corresponding to the respective object's determined material type.

Figure 35:
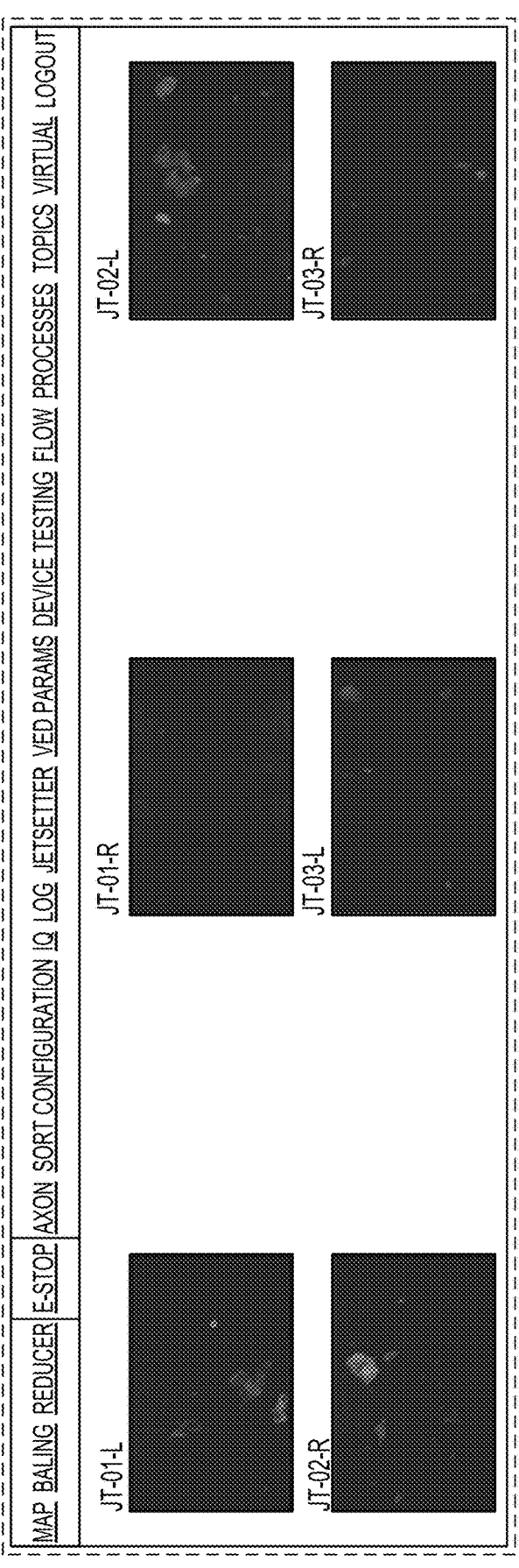
FIG. 35 is a diagram showing an example user interface that presents the current view/feed of six vision sensors that are placed in different locations within a sorting facility.

FIG. 35 is a diagram showing an example user interface that presents the current view/feed of six vision sensors that are placed in different locations within a sorting facility. An operator can evaluate the health and view of multiple cameras at a glance using a user interface such as the example one of FIG. 35. While the example user interface of FIG. 35 shows the current view/feed from six vision sensors, a user interface can show the current view/feed from more or fewer vision sensors at a facility.

Figure 36:
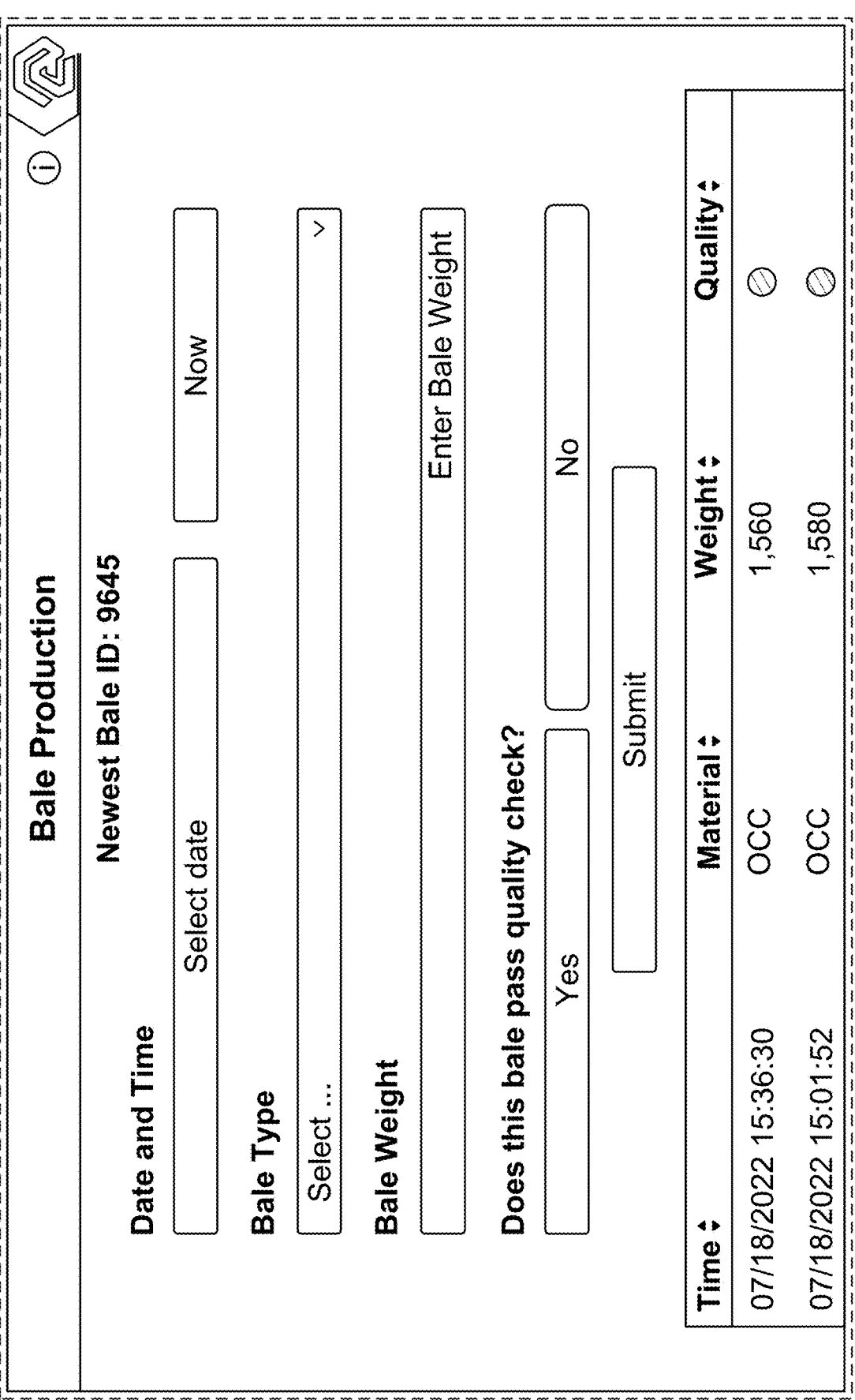
FIG. 36 is a diagram showing an example user interface through which a bale operator can input the attributes of a bale that is produced by a baler of a sorting facility.

FIG. 36 is a diagram showing an example user interface through which a bale operator can input the attributes of a bale that is produced by a baler of a sorting facility. Example attributes of a bale that can be input by an operator include the type(s) of materials that are included in the bale, the weight to the bale, and whether the bale passes a quality check. In some embodiments, instead of requiring a bale operator to input the attributes of a bale, the MCS can programmatically track what material type(s) go into a bale, estimate the weight of the bale, and compare the determined attributes of the bale (e.g., purity rate, material type breakdown) to a set of bale quality check criteria to record whether the bale meets the bale quality check criteria.

FIG. 37 is a diagram showing an example user interface that shows a consolidated view of current sorting statistics across three different sorting facilities. The example user interface of FIG. 37 comprises a multi-facility dashboard that shows a consolidated view of the current sorting statistics (e.g., current bunker contents) at three different sorting facilities that are located in three different cities (Atlanta, Cleveland, and Denver). An operator can use a user interface such as the example user interface of FIG. 37 to receive a holistic summary of multiple sorting facilities, compare the configurations across different facilities, and/or reconfigure the parameters across different facilities.

FIG. 38 is a diagram showing an example user interface that presents the operation overview of a sorting facility. The top portion of the example user interface of FIG. 38 is a portion of a histogram that shows the amount of infeed, baled output, downtime, and compacted across different times at the facility. The bottom portion of the example user interface of FIG. 38 shows a first table of material types baled at the facility as well as the value of bales of each material type at the current rate and a second table of the compacted residue on different dates at the facility.

Figure 39:
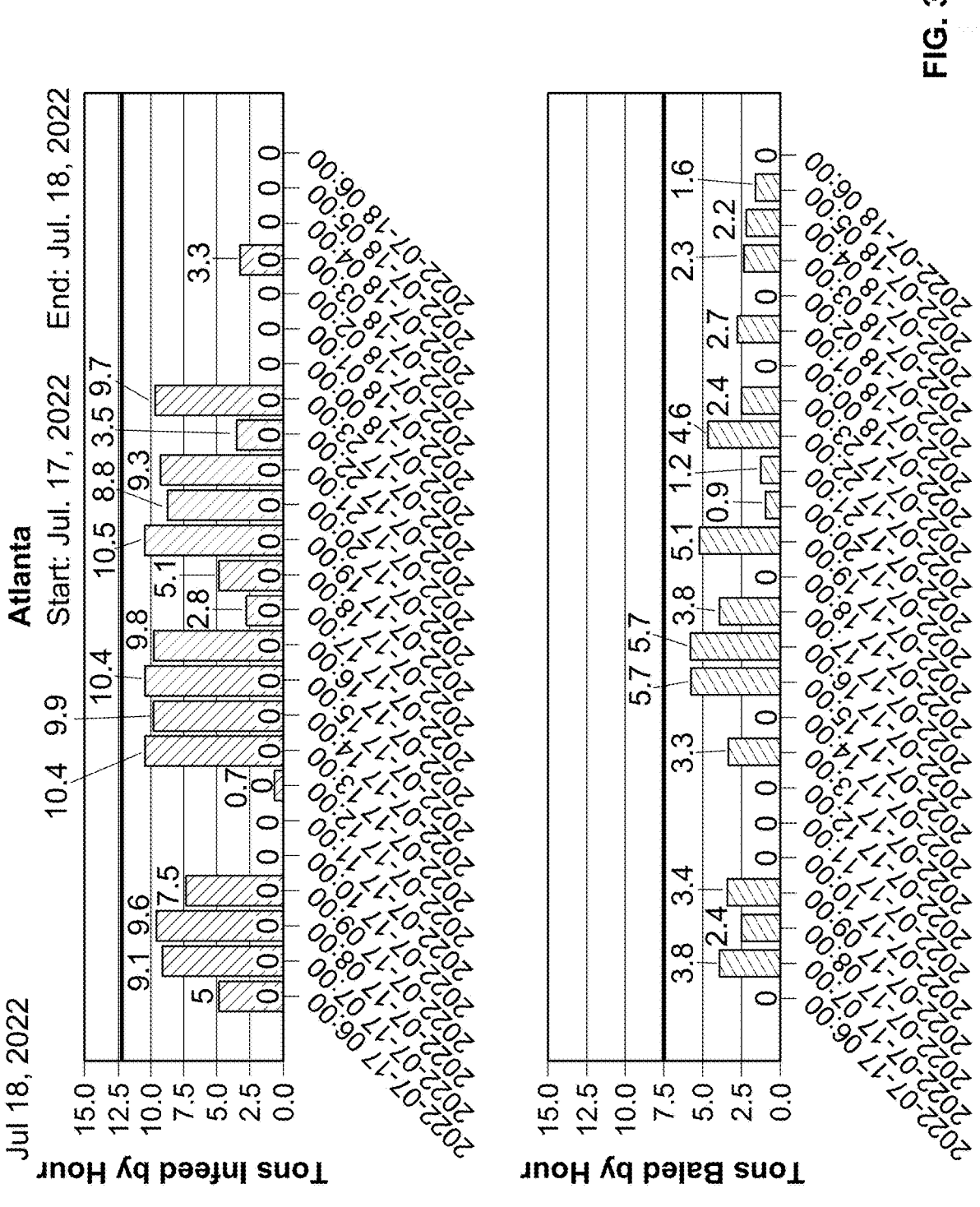
FIG. 39 is a diagram showing an example user interface that presents infeed and output statistics at a sorting facility.

FIG. 39 is a diagram showing an example user interface that presents infeed and output statistics at a sorting facility. The top histogram of the example user interface of FIG. 39 shows the tons of infeed that are received at a facility (located in Atlanta) per hour over a window of time. The bottom histogram of the example user interface of FIG. 39 shows the tons of bales that are output by the facility (located in Atlanta) per hour over a window of time. While not shown in FIG. 39, the detailed performance report for a single facility can indicate an overall baled value for a given period of time, recovery rate, uptime, infeed tons, baled tons, bunker tons, ferrous tons, and residue tons.

Figure 40:
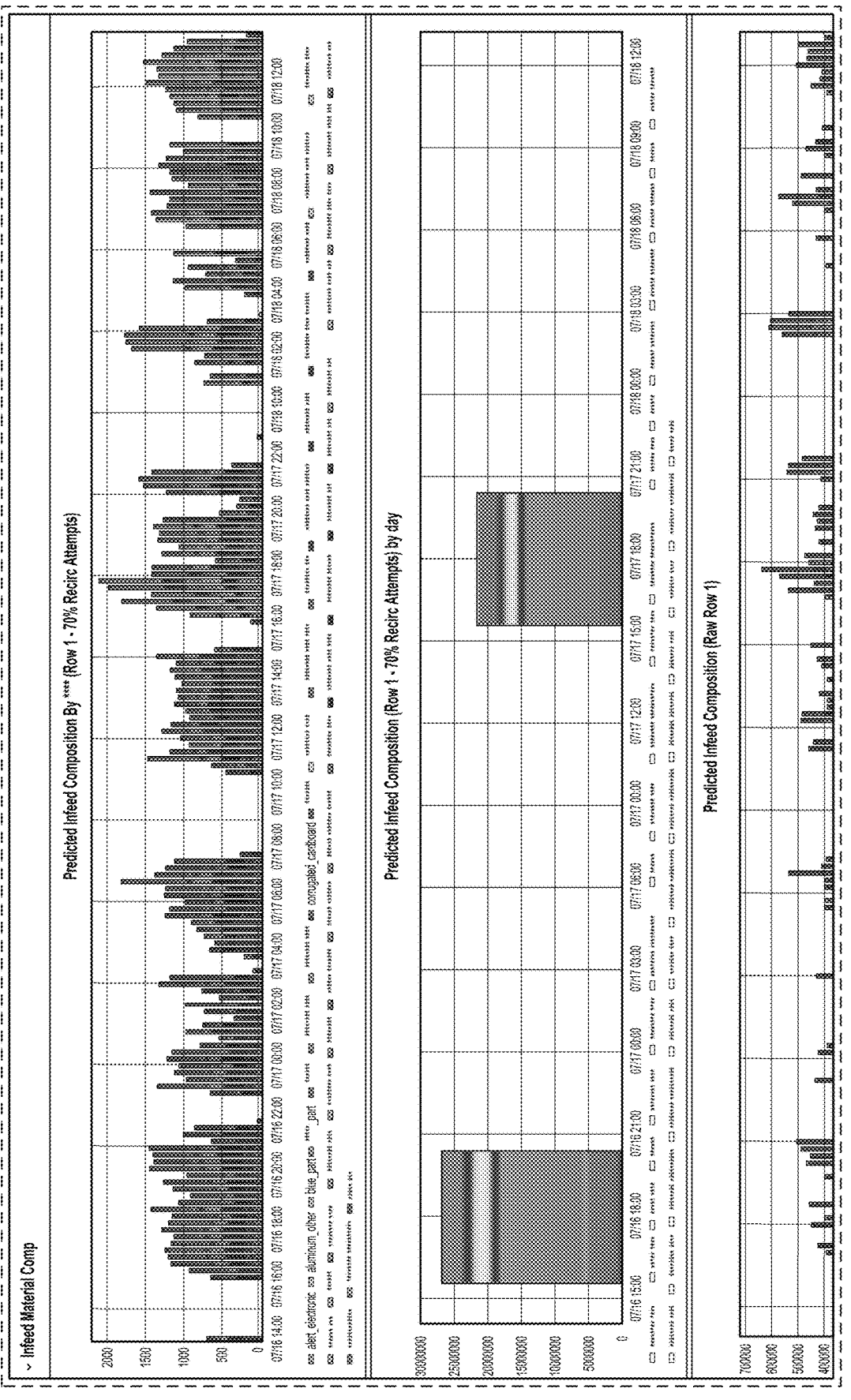
FIG. 40 is a diagram showing an example user interface that presents the predicted infeed composition over time at a sorting facility.

FIG. 40 is a diagram showing an example user interface that presents the predicted infeed composition over time at a sorting facility.

Figure 41:
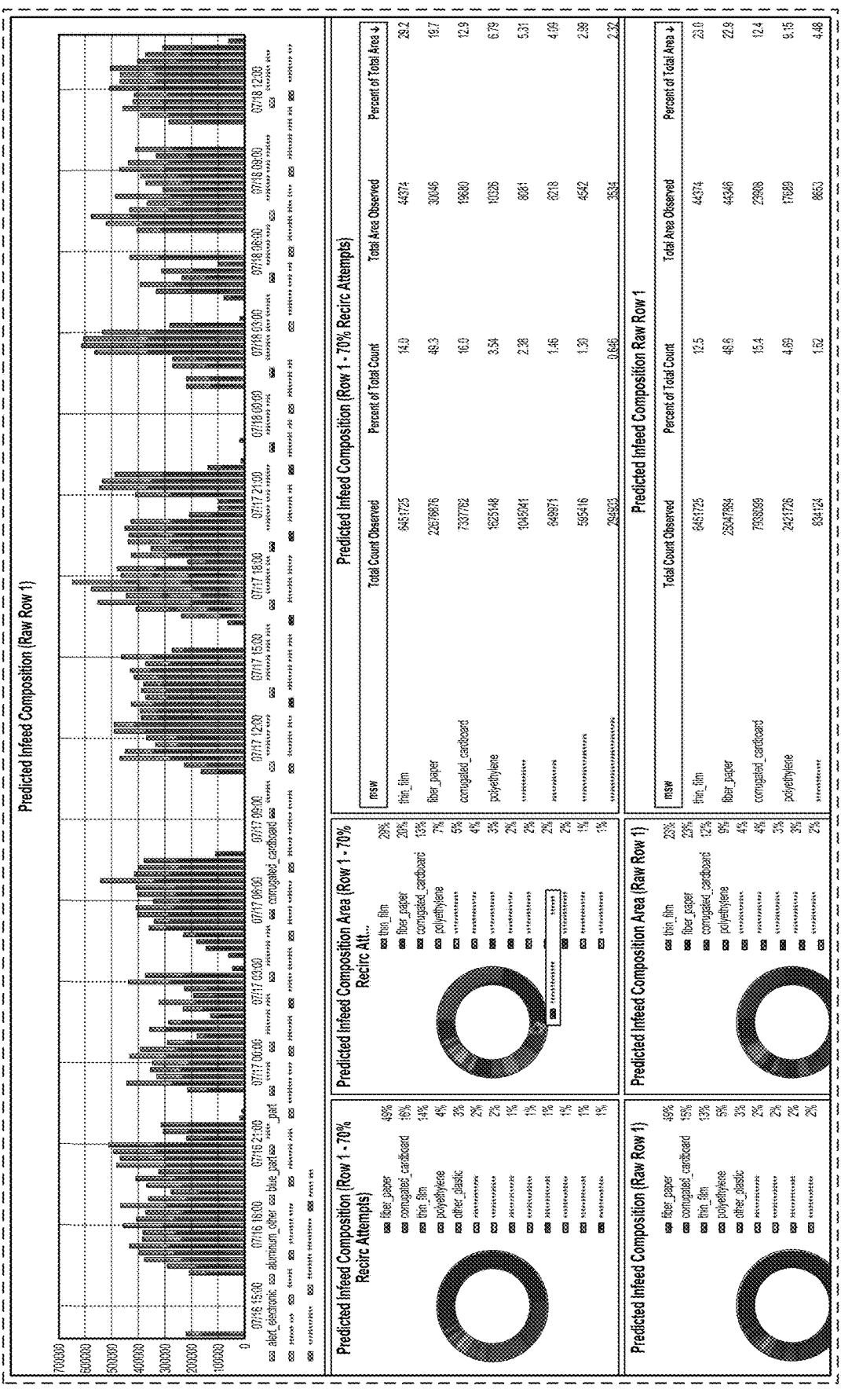
FIG. 41 is a diagram showing another example user interface that presents the predicted infeed composition by material types over time at a sorting facility.

FIG. 41 is a diagram showing another example user interface that presents the predicted infeed composition by material types over time at a sorting facility.

Figure 42:
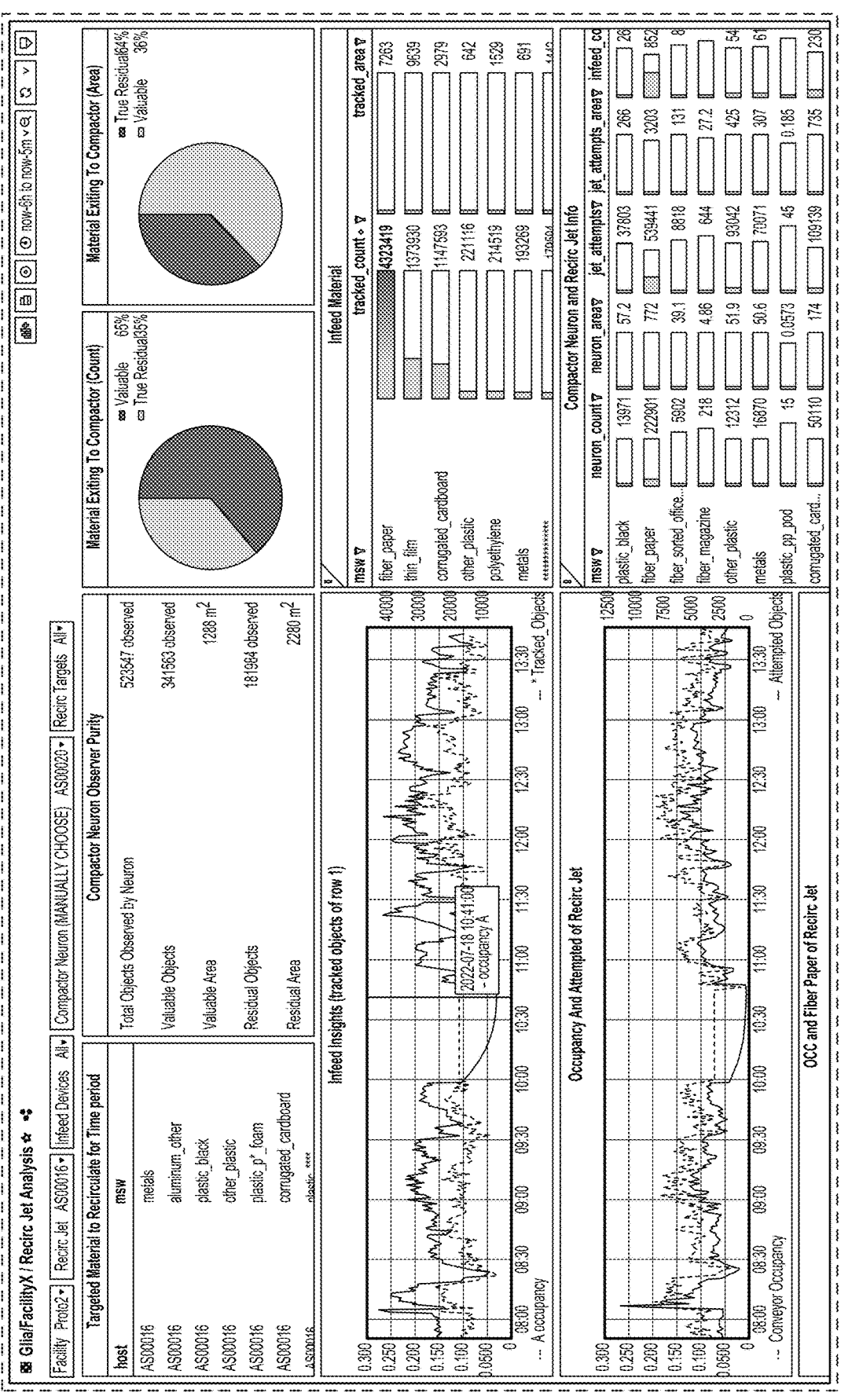
FIG. 42 is a diagram showing an example user interface that presents information related to selectable recirculation at a sorting facility.

FIG. 42 is a diagram showing an example user interface that presents information related to selectable recirculation at a sorting facility. The example user interface of FIG. 42 tracks the material types to target (e.g., by a last chance sorting device) for recirculation, the number of residual objects (pieces of residue) that are detected at the facility, the percentage breakdown of objects that are not being recirculated (e.g., the percentage of detected objects that are valuable and being recirculated and the percentage of detected objects that are residue and therefore not recirculated), and performance statistics with respect to a last chance sorting device (e.g., "recirc jet").

Figure 43:
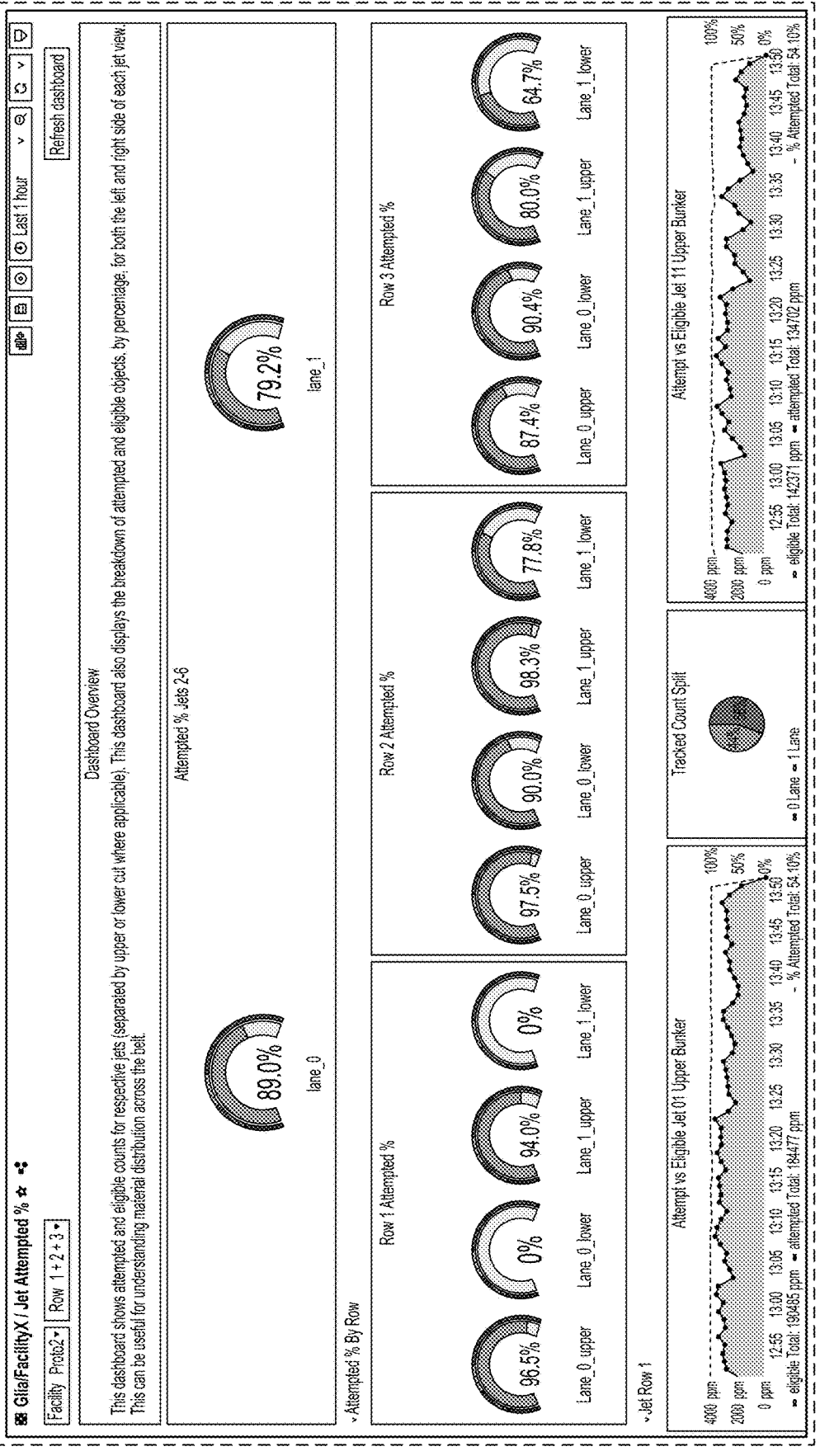
FIG. 43 is a diagram showing an example user interface that presents information related to the performance of various air jet array sorting devices at a sorting facility.

FIG. 43 is a diagram showing an example user interface that presents information related to the performance of various air jet array sorting devices at a sorting facility. The example user interface of FIG. 43 shows the capture success percentage of each of several air jet array sorting devices at the facility. Put another way, the example user interface shows how aggressive each air jet array is. The pie chart labeled "Attempted % Jets 2-6" shows the balance of material across Lanes 0 and 1 because in this case, the facility is a parallel lane plant.

Figure 44:
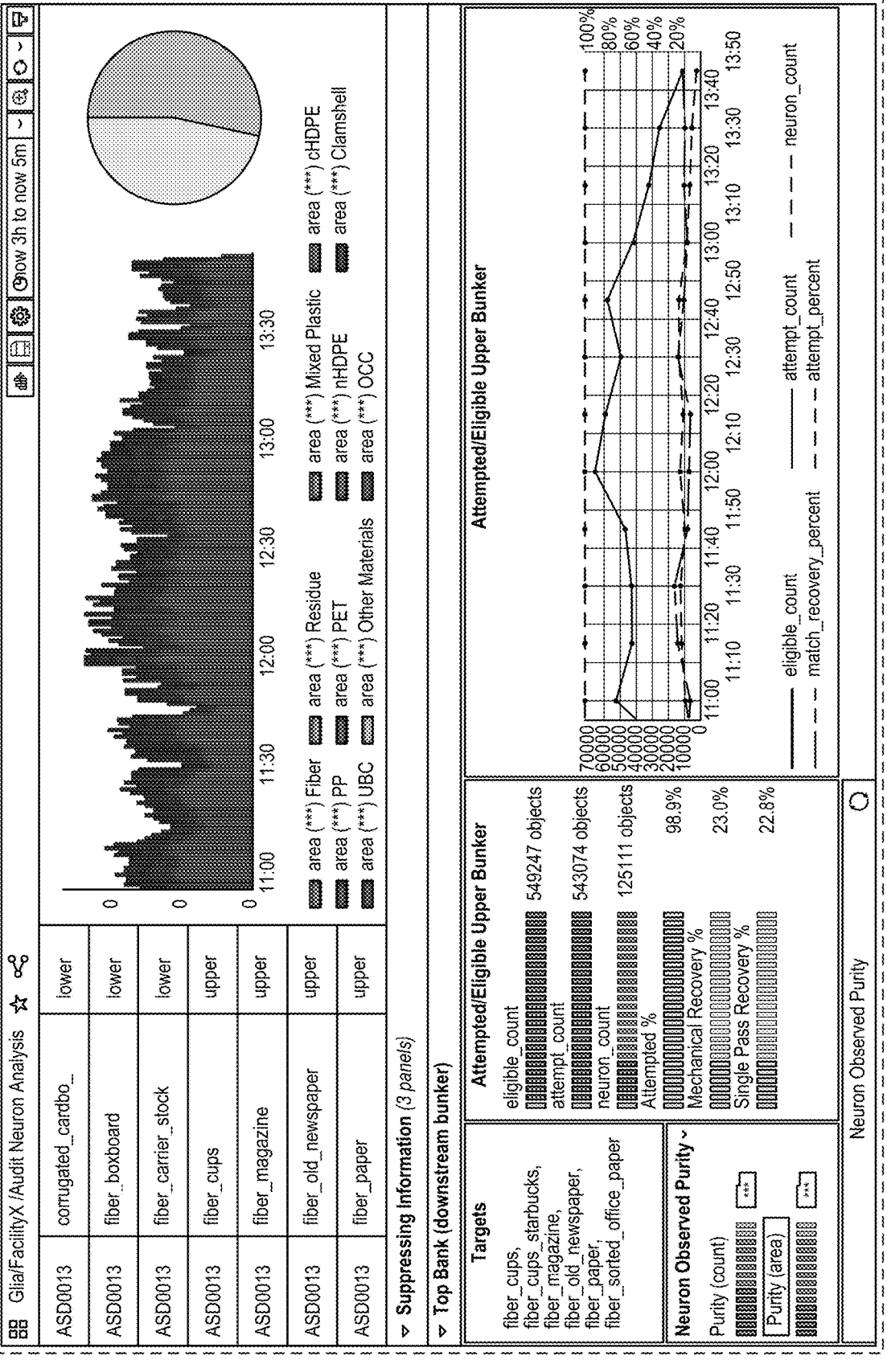
FIG. 44 is a diagram showing an example user interface that presents information related to audit results of sorting performance by one or more sorting devices within a portion of a sorting facility.

FIG. 44 is a diagram showing an example user interface that presents information related to audit results of sorting performance by one or more sorting devices within a portion of a sorting facility. For example, the audit results include the distribution of detected material types, the purity rate of the captured objects, and recovery rate of objects at the portion of the facility. Also, for example, the audit results include the capture success rate of the one or more sorting devices. As mentioned above, whether a sorting device's sorting operation is successful or not can be determined from an image captured downstream of the operation, for example. As shown in the example user interface of FIG. 44, the one or more sorting devices associated with the audit have a 98.9% capture success rate due to its ratio of (attempt_count)/(eligible_count)=543,074/549,247.

Figure 45:
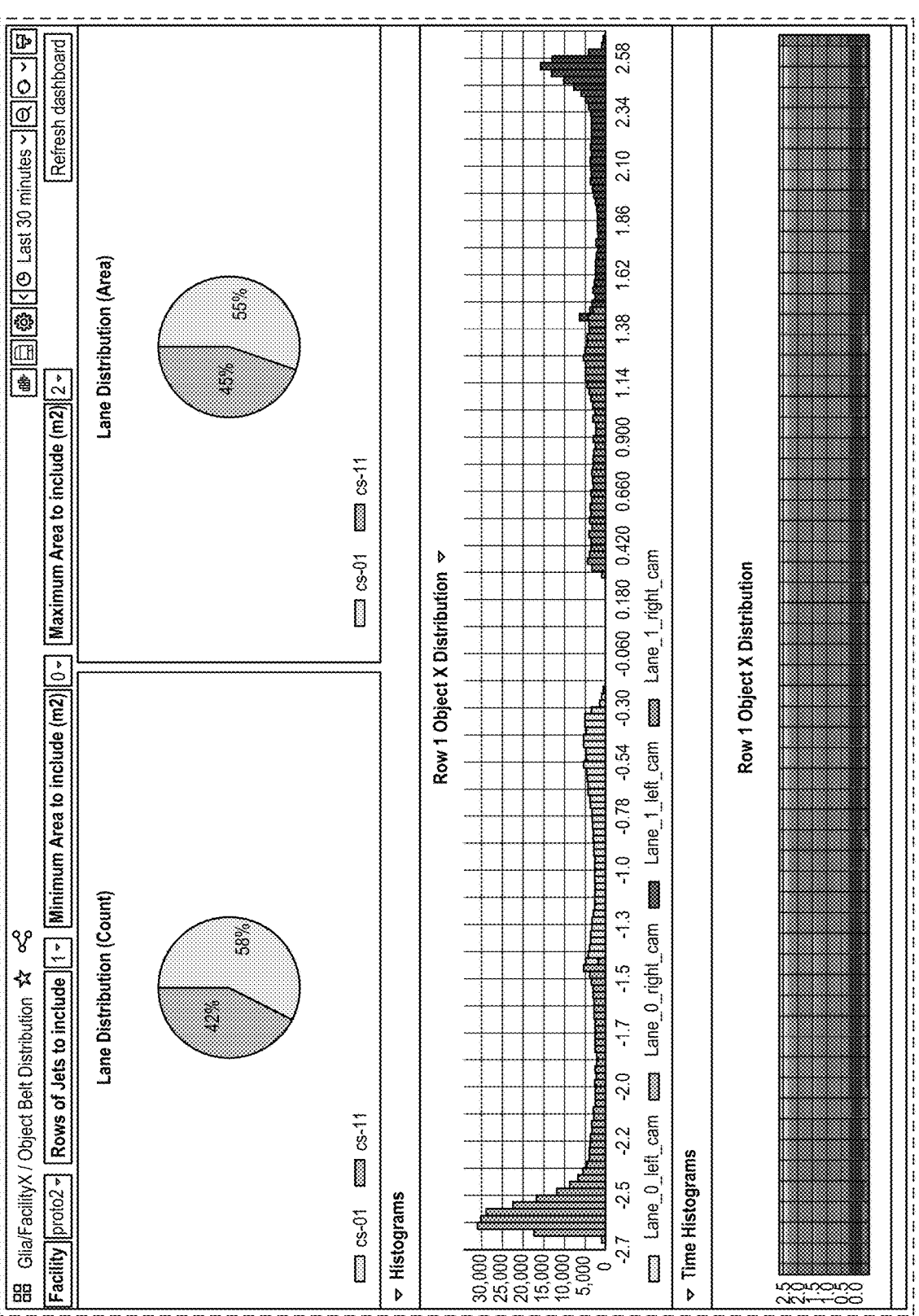
FIG. 45 is a diagram showing an example user interface that presents the distribution of materials across two different sorting lines ("lanes") within a sorting facility.

FIG. 45 is a diagram showing an example user interface that presents the distribution of materials across two different sorting lines ("lanes") within a sorting facility. The example user interface of FIG. 45 shows the distribution of materials across each conveyor belt. Because the example facility is a parallel plant that includes parallel sorting lines, each pie chart represents the distribution across the conveyor belts associated with the two sorting lines (e.g., the "left" and "right" belts). The distributions of objects across the left and right belts provide a heat map of how well-balanced, how well singulated material that is to be sorted is spread across the two sorting lines. The lack of balance between material count/area across the two sorting lines indicates that the upstream material singulation could be improved to provide a better distribution of materials between the sorting lines.

Figure 46:
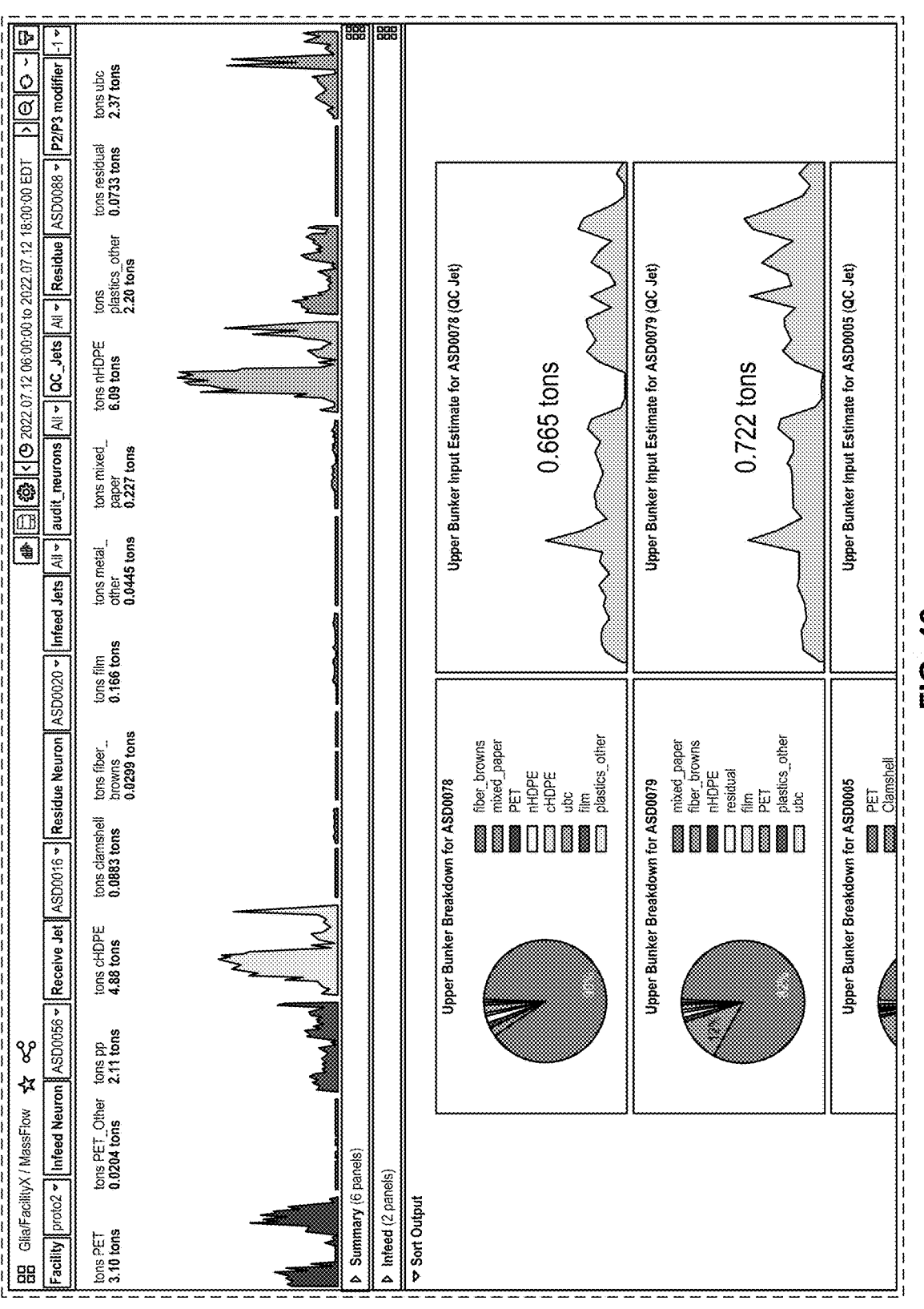
FIG. 46 is a diagram showing an example user interface that presents the material type composition of captured objects within different bunkers within a sorting facility.

FIG. 46 is a diagram showing an example user interface that presents the material type composition of captured objects within different bunkers within a sorting facility. The example user interface of FIG. 46 shows the real-time distribution of the material types of the captured objects that have been deposited into each of multiple bunkers at the facility. As described above, the characteristics of captured objects that are deposited into a bunker can be determined based on auditing the success or failure of sorting operations on objects and/or a quality control camera that is pointed at captured objects that are to be deposited into a bunker.

Figure 47:
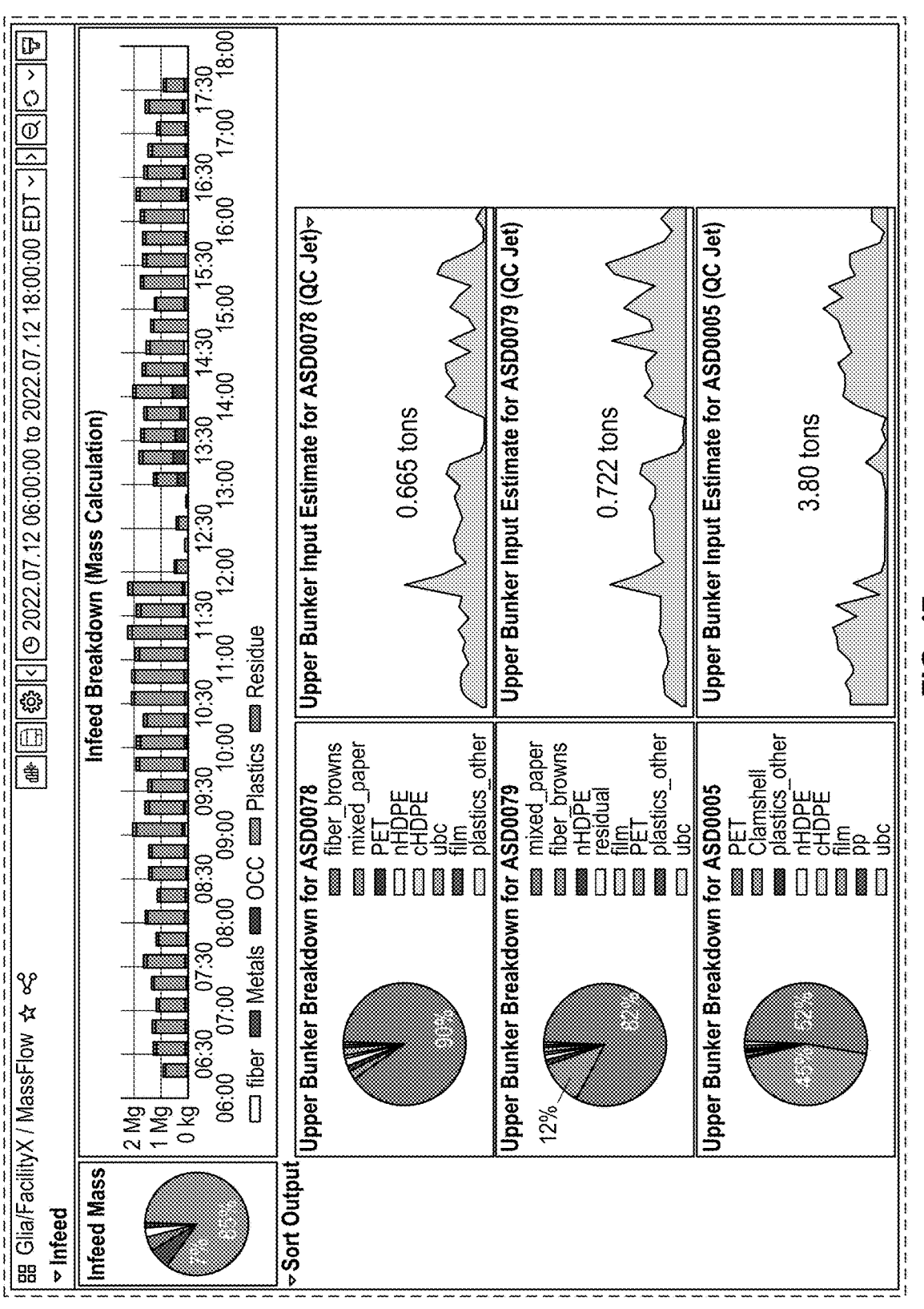
FIG. 47 is a diagram showing another example user interface that presents the material type composition of captured objects within different bunkers within a sorting facility.

FIG. 47 is a diagram showing another example user interface that presents the material type composition of captured objects within different bunkers within a sorting facility. The example user interface of FIG. 47 is similar to that of FIG. 46 but FIG. 47 additionally shows a histogram of the categories of infeed general material (e.g., fiber, metals, OCC, plastics, residue) that is received at the facility over time.

A significant output from the detailed measurement analysis embodied in the graphs of FIGS. 46 and 47 is the ability to analyze overall plant mass flow by object type.

Figure 48:
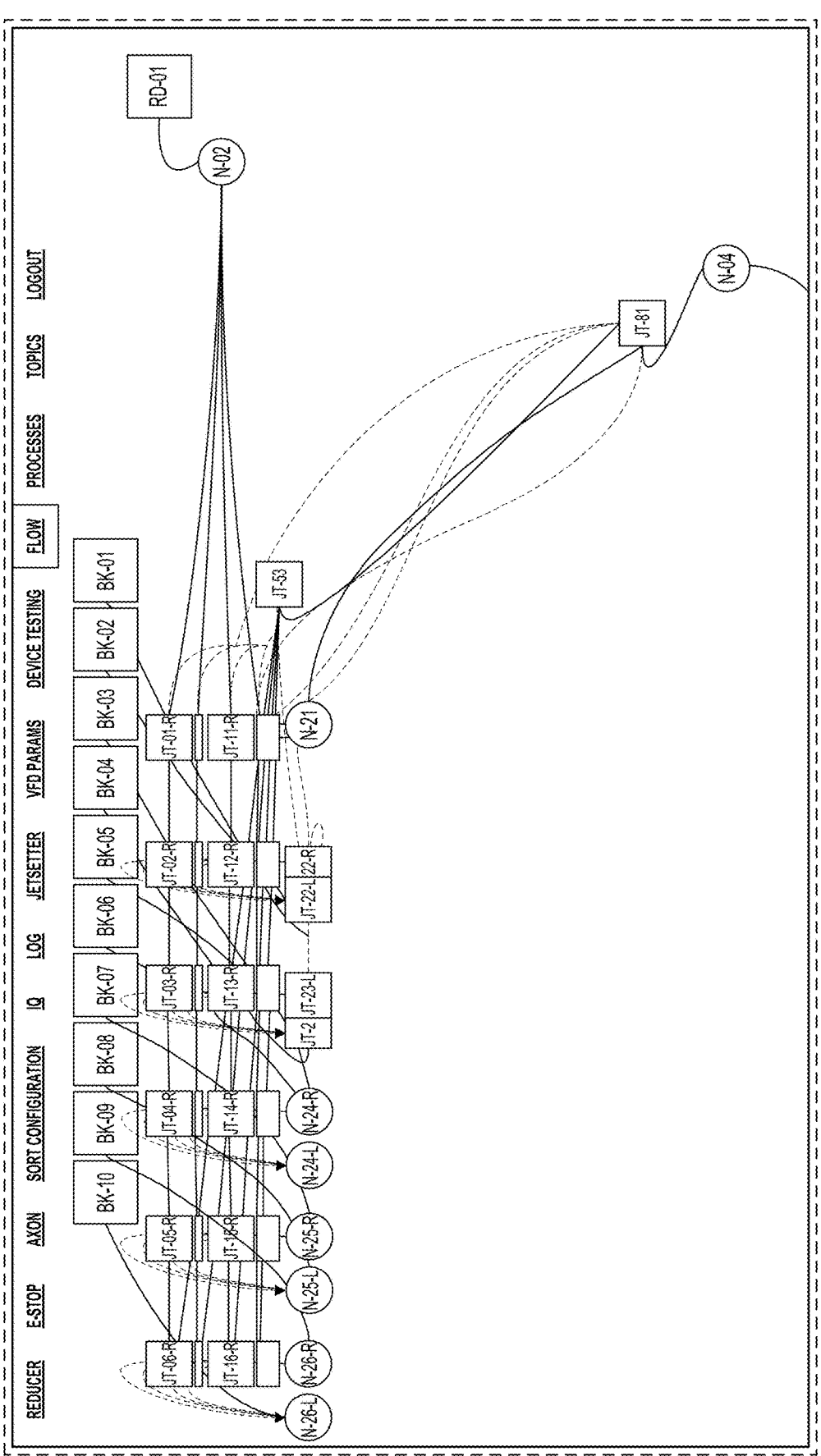
FIG. 48 is a diagram showing an example user interface that presents the flow of materials within a sorting facility.

FIG. 48 is a diagram showing an example user interface that presents the flow of materials within a sorting facility. The example user interface of FIG. 48 shows the flow of materials from the input of the facility to 10 bunkers, which may be used to collect the target objects that are captured from the material stream. The example user interface of FIG. 48 also illustrates the physical layout of the components of the facility that is maintained by the MCS.

Figure 49:
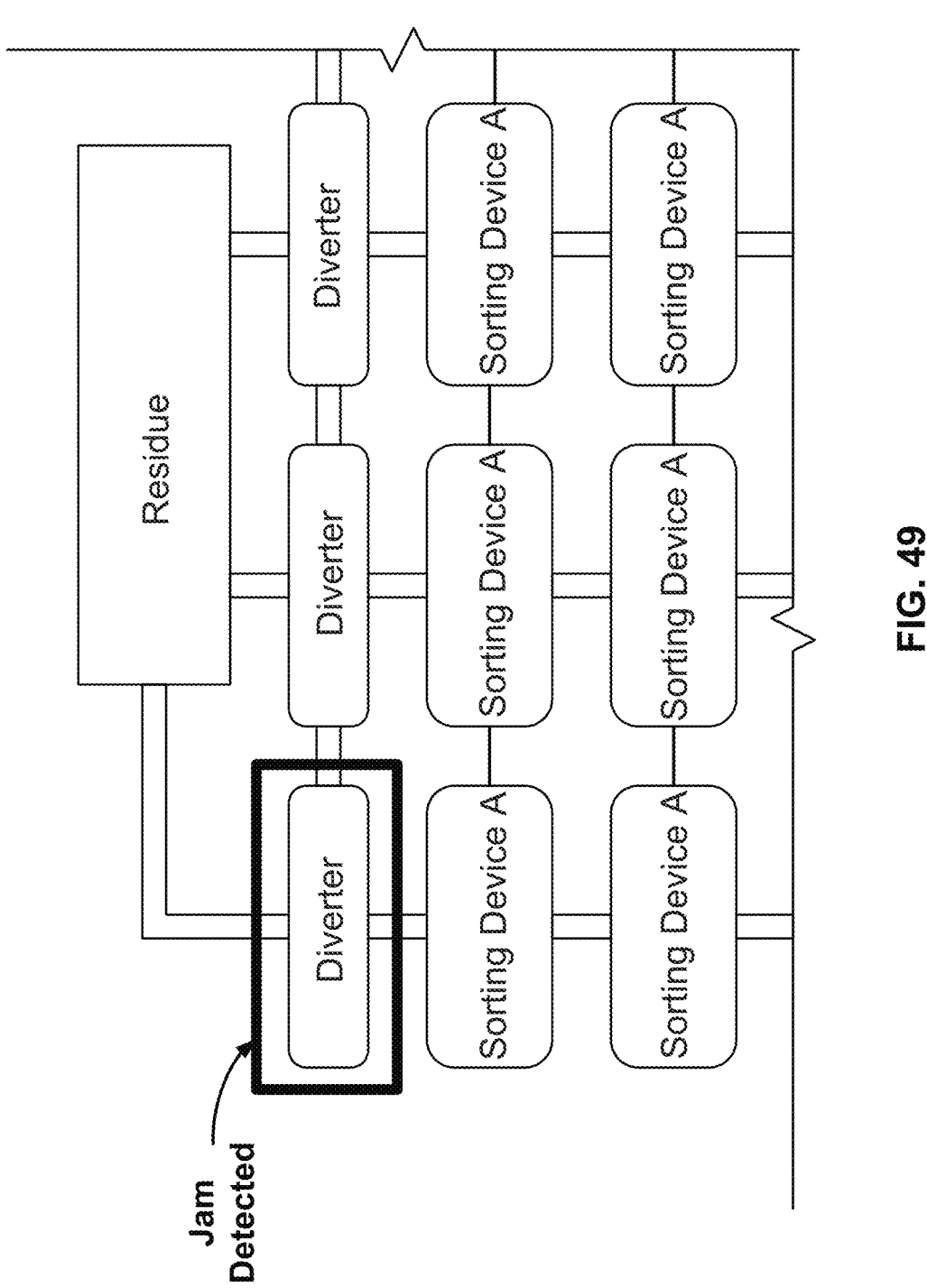
FIG. 49 is a diagram showing an example user interface that presents information related to a detected jam at a sorting facility.

FIG. 49 is a diagram showing an example user interface that presents information related to a detected jam at a sorting facility. As mentioned above, a jam can be detected at a portion of a facility using different techniques. By surfacing where the jam was detected at a specified location within a facility at a user interface such as the example shown in FIG. 49, the operator can initiate remediation to the appropriate location/affected devices within the facility without needing to manually identify the affected portion of the facility.

While not shown in a figure, a user interface can present a plant control screen. Sorting and Baling zones can be segmented in an example plant control screen, and an interactive view of the sorting facility can be provided. Operators may execute basic control functions (e.g., stop or start various zones), or implement more detailed functions by selecting individual components in the system (e.g., by selecting a particular jet array at the user interface and modifying its parameters or monitoring its performance). The plant control screen can also show the physical layout of devices within the facility, such as the topological location of each device within the sorting facility.

Furthermore, at the plant control screen, the operator can monitor and adjust the Variable Frequency Drive (VFD) control for a conveyance belt. Any relevant parameters to a selected device can be presented (e.g., frequency, amperage, etc.), and the operator can control the direction and speed of the conveyance belt. Moreover, the plant control screen may include a detailed view of the state of the compactor, including controls for conveyance between compactors and internal settings (e.g., photo eye delay).

While not shown in a figure, a user interface can provide the operator with an overview of sorting device configurations throughout the facility. Each can be targeted to examine and modify the mix of one or more material types that each sorting device is targeting. For example, the configurations of a particular sorting device can show the material types that the sorting device will be activated to capture as well as the sensitivity that the sorting device will use to suppress performing a capture action to avoid the risk of capturing a non-target object.

As described above, the sorting facility is managed by a control system application that provides the ability for operators to dynamically reconfigure and manage the facility. This "management plane" enables operators to configure software settings and updates, discover and install new components (e.g., sorting devices, machine learning (ML) vision cameras, conveyance lines, bunkers, etc.), gain awareness of real-time operating states and parameters, and dynamically modify the operating parameters of the plant and any controllable devices within it, among other things.

As described above, in some embodiments, the MCS receives inputs to manage versions and software updates for system components, integrated subsystems (e.g., an individual sorting line), or for the facility as a whole. The MCS in some embodiments also measures and provides user feedback relevant to the status of elements in the facility. For example, the MCS may measure equipment status, pick success rates, bunker and compactor levels, baling status, and any alert or warnings generated by components in the facility (e.g., low vacuum pressure or line blockage alerts). In some embodiments, the MCS control inputs may be set through the use of an external or internal optimization algorithm utilizing one or more cost functions based on any of the above parameters. The MCS may also monitor and present information relevant to the material characteristics within the facility as determined by the ML vision sensors within the system. For example, the MCS may present a dynamic display or upload data indicating the relative, cumulative, or instantaneous mixes of materials on one or more sorting lines. The MCS may also present information relevant to the success of material sorting across the facility (e.g., recovery status, failed attempts, etc.) and provide input to enable the operator to adjust settings to improve recovery.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a first sensor associated with a first field of view, and wherein the first sensor is located in a sorting facility;
a second sensor associated with a second field of view, wherein the second field of view is adjacent to or overlaps with the first field of view, and wherein the second sensor is located in the sorting facility, wherein a combination of the first field of view and the second field of view covers at least a width of a conveyor device; and one or more processors configured to:
receive a first image including a first set of objects from the first sensor, wherein the first set of objects is located on the conveyor device;
receive a second image including a second set of objects from the second sensor, wherein the second set of objects is located on the conveyor device;
generate a master image by combining the first image and the second image, wherein the first image shows a target object with an occluded portion, wherein the occluded portion of the target object is visible within the master image;
determine a set of attributes associated with the target object based at least in part on using a machine learning model to evaluate the master image, wherein the machine learning model has been trained on master images that have been stitched together from images captured by individual sensors;
determine a sorting operation to be performed on the target object based at least in part on the set of attributes associated with the target object, wherein the sorting operation to be executed by a set of sorting devices that is located downstream from the first sensor and the second sensor in the sorting facility;
obtain, by an audit sensor, a third image depicting an execution of the sorting operation on the target object to divert the target object towards a desired destination, wherein the audit sensor comprises a third sensor located downstream from the first sensor and the second sensor in the sorting facility;
determine an audit result based on whether the sorting operation was successful or not based on the third image by programmatically determining whether the target object appears to be successfully directed towards the desired destination in the third image;
determine a capture success rate associated with the set of sorting devices based at least in part on the audit result; and
determine whether to retrain the machine learning model used to detect the set of attributes associated with the target object based at least in part on the capture success rate.

2. The system of claim 1, wherein the first sensor and the second sensor are vision sensors.

3. The system of claim 1, wherein the first image is captured by the first sensor at a first time and the second image is captured by the second sensor at a second time, and wherein the first time and the second time are within a threshold window of time.

4. The system of claim 1, wherein the first image and the second image both show the target object.

5. The system of claim 1, wherein the first sensor and the second sensor are placed over a conveyor belt.

6. The system of claim 1, wherein the first sensor is placed at a first angle relative to the target object and the second sensor is placed at a second angle relative to the target object, and wherein the first angle is different from the second angle.

7. The system of claim 1, wherein the set of sorting devices includes a first sorting device that uses a first sorting mechanism type and a second sorting device that uses a second sorting mechanism type.

8. The system of claim 7, wherein the first sorting mechanism type and the second sorting mechanism type are the same.

9. The system of claim 8, wherein the first sorting mechanism type and the second sorting mechanism type are different.

10. The system of claim 1, wherein the set of sorting devices includes a first sorting device and a second sorting device in a dual cut sorting arrangement.

11. The system of claim 1, wherein to determine the sorting operation comprises to determine a surface of the target object with which a sorting device should engage during the sorting operation.

12. The system of claim 1, wherein to evaluate the first image and the second image comprises to:

perform cross-frame comparison between the first image and the second image to improve segmentation of the target object; and wherein to determine the set of attributes associated with the target object is further based at least in part on the cross-frame comparison.

13. The system of claim 1, wherein the master image comprises a three-dimensional image.

14. The system of claim 1, wherein to generate the master image comprises to stitch together the first image and the second image.

15. The system of claim 1, wherein to retrain the machine learning model comprises to retrain the machine learning model with new master images that are annotated with object locations and attributes.

16. The system of claim 1, wherein the one or more processors are further configured to reconfigure a sorting parameter associated with a sorting device that had performed the sorting operation based at least in part on the capture success rate.

\* \* \* \* \*